United States Patent
Yamakami et al.

(10) Patent No.: US 8,083,341 B2
(45) Date of Patent: Dec. 27, 2011

(54) THERMAL INK-JET INK AND INK CARTRIDGE USING THE INK

(75) Inventors: Hideki Yamakami, Yokohama (JP); Hiroshi Tomioka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 286 days.

(21) Appl. No.: 11/951,954

(22) Filed: Dec. 6, 2007

(65) Prior Publication Data

US 2008/0151028 A1      Jun. 26, 2008

(30) Foreign Application Priority Data

Dec. 22, 2006    (JP) ................................ 2006-346189

(51) Int. Cl.
*G01D 11/00*    (2006.01)
(52) U.S. Cl. .......................................... 347/100; 347/86
(58) Field of Classification Search .................. 347/100, 347/102, 86; 106/31.27, 31.47, 31.48, 31.13; 523/160
See application file for complete search history.

(56) References Cited

U.S. PATENT DOCUMENTS

| | | | |
|---|---|---|---|
| 5,380,358 A | 1/1995 | Aoki et al. | 106/20 R |
| 6,221,141 B1 | 4/2001 | Takada et al. | |
| 6,398,355 B1* | 6/2002 | Shirota et al. | 347/100 |
| 6,435,660 B1 | 8/2002 | Ozaki et al. | |
| 6,682,588 B2 | 1/2004 | Shioya et al. | 106/31.43 |
| 6,918,662 B2* | 7/2005 | Arita et al. | 347/100 |
| 7,087,107 B2 | 8/2006 | Tateishi et al. | 106/31.49 |
| 7,208,033 B2 | 4/2007 | Kawabe et al. | 106/31.48 |
| 7,244,299 B2 | 7/2007 | Tsuji et al. | 106/31.48 |
| 7,578,585 B2* | 8/2009 | Yamakami et al. | 347/100 |
| 2004/0017441 A1 | 1/2004 | Shin et al. | 347/68 |
| 2004/0045478 A1* | 3/2004 | Tateishi et al. | 106/31.49 |
| 2006/0055737 A1* | 3/2006 | Giovanola et al. | 347/64 |
| 2006/0268086 A1* | 11/2006 | Kawakami et al. | 347/100 |
| 2007/0109372 A1* | 5/2007 | Tomioka et al. | 347/86 |

(Continued)

FOREIGN PATENT DOCUMENTS

EP    0 969 054 A1    1/2000

(Continued)

OTHER PUBLICATIONS

Jun. 11, 2010 European Search Report in European Patent Appln. No. 07122103.0.

(Continued)

*Primary Examiner* — Matthew Luu
*Assistant Examiner* — Rut Patel
(74) *Attorney, Agent, or Firm* — Fitzpatrick, Cella, Harper & Scinto

(57) ABSTRACT

An ink cartridge for storing ink includes a thermal ink-jet head provided with a heating portion that generates thermal energy for discharging the ink. The heating portion has, on its surface in contact with the ink, a protective layer containing at least one of a silicon oxide, a silicon nitride, and a silicon carbide. The ink contains a substance that dissolves the protective layer and a compound represented by the following formula (1), and the content X (% by mass) of the compound of the formula (1) satisfies a relationship of $1 \leq X \leq 30$: Formula (1) $R_1$-A-$R_2$, wherein A represents one selected from —S—, —S(=O)—, and —S(=O)$_2$—, and $R_1$ and $R_2$ each independently represent a group selected from a hydrogen atom, a hydroxyl group, an alkyl group, a hydroxyalkyl group, an alkenyl group, an acyl group, a carbamoyl group, a carboxyl group, and a sulfonyl group.

10 Claims, 7 Drawing Sheets

U.S. PATENT DOCUMENTS

2007/0148376 A1    6/2007    Tomioka et al. ............. 428/32.1

FOREIGN PATENT DOCUMENTS

| | | |
|---|---|---|
| EP | 1 090 763 A2 | 4/2001 |
| JP | 5-330048 | 12/1993 |
| JP | 5330048 A | 12/1993 |
| JP | 6-93218 | 4/1994 |
| JP | 2002-12803 | 1/2002 |
| JP | 2002-226030 | 8/2002 |
| JP | 2002-249677 | 9/2002 |
| JP | 2002-294097 | 10/2002 |
| JP | 2002-302623 | 10/2002 |
| WO | WO 99/43754 | 9/1999 |
| WO | WO 02/081580 | 10/2002 |
| WO | WO 2006082669 A1 * | 8/2006 |

OTHER PUBLICATIONS

XP002477655 Database WPI Week 199403 Derwent Publications Ltd., London, GB; AN 1994-022439 (JP-A 05-330048).

* cited by examiner

H1001

THERMAL INK-JET INK AND INK CARTRIDGE USING THE INK

BACKGROUND OF THE INVENTION

1. Field of the Invention

The present invention relates to a thermal ink-jet ink having excellent storage stability and an ink cartridge for containing the ink.

2. Description of the Related Art

An ink-jet recording method is a recording method involving causing small ink droplets to fly onto plain paper or onto a dedicated glossy medium to form an image. The method has rapidly become widespread in association with the advancement of reduction in price of recording apparatuses and an increase in recording rate of such apparatuses. In particular, there has been a growing need for photographic quality because digital cameras have become widespread, so further improvements in image quality and printing speed have been requested. Accordingly, techniques more sophisticated than the conventional ones have been requested, and examples of the techniques include a reduction in size of ink droplets, an increase in density of nozzle arrangement, an increase in length of a head in association with an increase in number of nozzles, and control of discharge of ink droplets.

On the other hand, a thermal ink-jet recording mode is a mode involving foaming ink by utilizing thermal energy, and discharging the ink to a recording medium. The mode enables high-speed, high-density, high-definition, high-quality recording, and is suitable for colorization and a reduction in size of a recording apparatus. A general head to be used in the recording mode includes a substrate for an ink-jet recording head on which a heating resistor for foaming ink and wiring, electrically connected to the heating resistor, are formed, and a passage for discharging the ink on the substrate.

In addition, the substrate for an ink-jet recording head is modified in various ways in order to save electrical energy input and prevent a reduction in lifetime of the substrate resulting from destruction of a heating portion in association with foaming of ink. In particular, a protective layer for protecting a heating resistor disposed between a pair of wiring patterns from ink is modified in many ways.

It is advantageous for the protective layer to have a high thermal conductivity or a small thickness from the viewpoint of thermal efficiency. However, it is advantageous for the protective layer to have a large thickness from the viewpoint of protection from ink of wiring connected to the heating resistor. Accordingly, the thickness of the protective layer must be set to an optimum thickness from the viewpoints of energy efficiency and reliability. In particular, a layer in contact with ink is affected by both cavitation damage due to the foaming of the ink, that is, mechanical damage, and damage due to a chemical reaction with an ink component at a high temperature, that is, chemical damage, so the influences of the mechanical damage and the chemical damage need to be sufficiently taken into consideration.

Therefore, the protective layer of an ink-jet substrate generally includes an upper layer (i.e., a layer in contact with ink) having high stability against mechanical damage and chemical damage, and a lower insulating layer for protecting wiring. Specifically, in general, a Ta layer, which is extremely stable both mechanically and chemically, is formed as the upper layer, and an SiN layer, SiO layer, or SiC layer, which can be easily formed by an existing semiconductor manufacturing apparatus and is stable, is formed as the lower layer.

More specifically, an SiN layer having a thickness in the range of 0.2 μm to 1 μm is formed as a protective layer on wiring, and then an upper protective layer is formed. A Ta layer having a thickness in the range of 0.2 μm to 0.5 μm is formed as the upper layer, which is referred to as a "cavitation-resistant layer" because the layer serves as a layer resistant to cavitation damage. With this constitution, both the lifetime and reliability requirements of a heating resistor of an ink-jet substrate are satisfied.

Japanese Patent Laid-Open No. 05-330048 discloses, as an ink-jet technique using a thermal head, an ink-jet head using a material containing Si, N, or Ir at a specific ratio for a heating resistor in order to improve durability and thermal conversion efficiency. There is also disclosed ink containing a chelating reagent at a specific concentration from the viewpoints of improvement in discharge durability of a thermal head and improvement in suppression of kogation in a heating portion due to discharge (see Japanese Patent Laid-Open No. 06-093218). There is also disclosed ink containing an ammonium salt of an acid having a methyl group or a methylene group, and a carboxyl group (see Japanese Patent Laid-Open No. 2002-012803). These conventional techniques relate to suppression of corrosion of a Ta layer in association with discharge duration or suppression of kogation on the Ta layer when the Ta layer is disposed as a surface layer of the protective layer of a heating portion. In addition, ink contains a specific compound at a specific concentration, whereby a balance between the deposition of kogation and the corrosion of the Ta layer due to discharge duration is optimized for lengthening the lifetime of the ink.

In an ink cartridge in which an ink-jet head is directly mounted on an ink tank so that the head and the ink tank are integrated with each other, in view of cost and production, the head needs to be directly mounted on a plastic casing which constitutes the ink cartridge. Accordingly, the use of such a thermal-mode ink-jet head as described above easily causes heat accumulation due to foaming in association with increases in number of nozzles and in density of nozzle arrangement, thereby decreasing thermal efficiency in some cases. In addition, a constitution having high thermal efficiency is demanded from the viewpoint of saving of electrical energy input.

Therefore, the inventors of the present invention have examined constituting the protective layer using only a lower insulating layer mainly composed of a silicon nitride, a silicon oxide, or a silicon carbide, such as SiN, SiO, or SiC, without using the upper layer in the above-described protective layer including the upper layer and the lower layer. Such a constitution provides advantages in thermal efficiency and is also advantageous, because the layer constitution is simplified, in that it can minimize or avoid an increase in cost as well as minimize or avoid a reduction in yield due to a defect of the layer. Further, the constitution provides advantages in durability against cavitation damage because the thermal efficiency is improved and electrical energy input can therefore be reduced. That is, the constitution of the protective layer using only the insulating layer that has been conventionally a lower layer as described above is suitable for an integrated ink cartridge including a thermal-mode ink-jet head.

However, as a result of further detailed investigation, the inventors of the present invention have found that a thermal-mode ink-jet head with the constitution described above involves the following new problems. That is, the inventors have newly found that an insulating protective layer composed of a silicon nitride, a silicon oxide, or a silicon carbide as a main component dissolves in ink, and thus decreases in thickness during long-term storage not involving foaming, for example, assuming physical distribution. In addition, the reduction in thickness of the protective layer increases the foaming energy that will be applied to the ink, thereby easily causing image deterioration in association with a discharge failure due to abnormal foaming and a reduction in printing durability due to an abnormal increase in temperature of a heating portion when a driving pulse is applied to the head. This is a first problem addressed by the inventors of the present invention.

Without intending to be bound by theory, the inventors consider the above-mentioned phenomenon to occur via a mechanism different from a thermal shock at high temperature and high pressure due to a conventionally known foaming phenomenon and corrosion of a heating portion due to cavitation or the like. Investigation conducted by the inventors of the present invention shows that there is no correlation between the durability of a heating portion for foaming and the dissolution of an insulating protective layer due to the above-mentioned physical distribution storage not involving foaming. Even in a combination of ink and a head each having sufficient discharge durability for foaming, the storage stability of the ink deteriorates owing to the above-mentioned dissolution phenomenon in some cases.

On the other hand, ink may contain impurities of a constituent material of the ink and a polyvalent metal eluted from a member that contacts the ink. The inventors of the present invention have confirmed that the polyvalent metal precipitates at a nozzle portion of an ink-jet head to cause a discharge failure of the ink. In particular, an improvement in image quality is currently advanced, and thus, the number of nozzles and the density of nozzle arrangement are being further increased in an ink-jet head. Particularly in such a head, a discharge failure of ink greatly affects the formation of an image, so the discharge failure of the ink must be prevented as much as possible. The inventors of the present invention have defined the prevention of the discharge failure of the ink as a second concern of the present invention.

Further, the inventors of the present invention have found that ink containing a specific coloring material dissolves the above-mentioned insulating protective layer. A coloring material in ink is selected with the emphasis on its weatherability and color developability because the coloring material is an important factor having a significant influence on the image properties of a printer. Accordingly, a coloring material credited with an ability to improve the quality of an ink-jet recorded image can cause dissolution of the insulating protective layer to reduce the thickness of the protective layer in some cases. In addition, the reduction in thickness of the protective layer increases foaming energy that will be applied to the ink, so image deterioration in association with a discharge failure due to abnormal foaming and a reduction in printing durability due to an abnormal increase in temperature of a heating portion easily occur upon application of a driving pulse to a head. This is a third problem addressed by the inventors of the present invention.

SUMMARY OF THE INVENTION

The present invention provides an ink cartridge for storing ink including a thermal ink-jet head provided with a heating portion that generates thermal energy for discharging the ink from an ejection orifice, in which the heating portion has, on its surface in contact with the ink, a protective layer containing at least one selected from the group consisting of a silicon oxide, a silicon nitride, and a silicon carbide, the ink contains a substance that dissolves the protective layer and a compound represented by the following general formula (1), and the content X (% by mass) of the compound represented by the general formula (1) in the ink satisfies the relationship of $1 \leq X \leq 30$:

$$R_1\text{-A-}R_2 \quad \text{General Formula (1)}$$

wherein A represents one selected from the group consisting of —S—, —S(=O)—, and —S(=O)$_2$—, and $R_1$ and $R_2$ each independently represent a group selected from the group consisting a hydrogen atom, a hydroxyl group, an alkyl group, a hydroxyalkyl group, an alkenyl group, an acyl group, a carbamoyl group, a carboxyl group, and a sulfonyl group.

The present invention further provides an ink for a thermal ink-jet head provided with a heating portion that generates thermal energy for discharging the ink from an ejection orifice, the heating portion having, on its surface in contact with the ink, a protective layer containing at least one selected from the group consisting of a silicon oxide, a silicon nitride, and a silicon carbide, the ink including a substance that dissolves the protective layer and a compound represented by the following general formula (1), wherein the content X (% by mass) of the compound represented by the general formula (1) in the ink satisfies the relationship of $1 \leq X \leq 30$:

$$R_1\text{-A-}R_2 \quad \text{General Formula (1)}$$

wherein A represents one selected from the group consisting of —S—, —S(=O)—, and —S(=O)$_2$—, and $R_1$ and $R_2$ each independently represent a group selected from the group consisting a hydrogen atom, a hydroxyl group, an alkyl group, a hydroxyalkyl group, an alkenyl group, an acyl group, a carbamoyl group, a carboxyl group, and a sulfonyl group.

According to the present invention, there are provided an ink-jet ink which shows a small change in driving pulse and a small change in an image to be output, shows sufficient discharge properties and sufficient printing durability, shows a small temperature increase in association with printing, and is capable of stably forming a good image even after physical distribution or long-term storage in, for example, a state where the ink is mounted on a recording apparatus when the ink is applied to a thermal-mode ink-jet head in which a protective layer provided on a surface in contact with the ink includes only an insulating protective layer containing any one of a silicon oxide, a silicon nitride, and a silicon carbide; and an ink cartridge.

Further features of the present invention will become apparent from the following description of exemplary embodiments with reference to the attached drawings.

DESCRIPTION OF THE EMBODIMENTS

Figure 1:
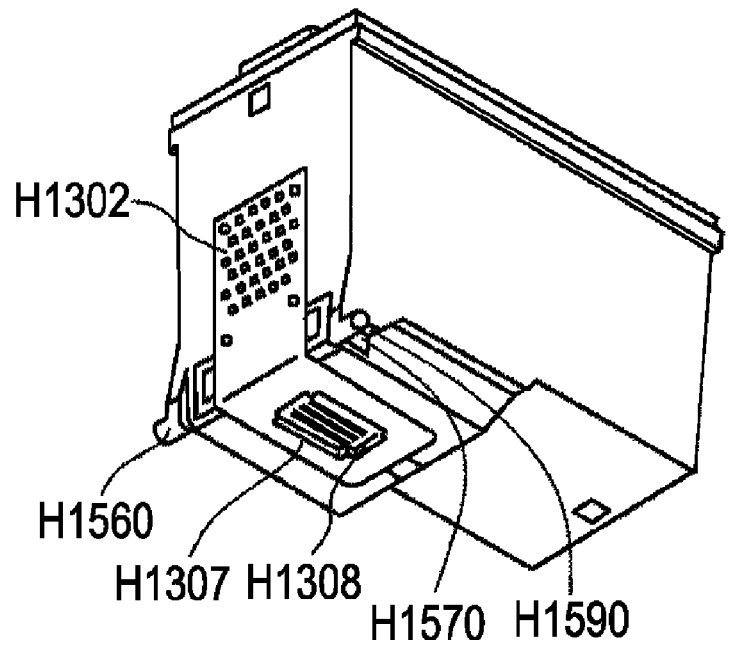
FIG. 1 is a perspective view of a recording head (ink cartridge).
Figure 1:
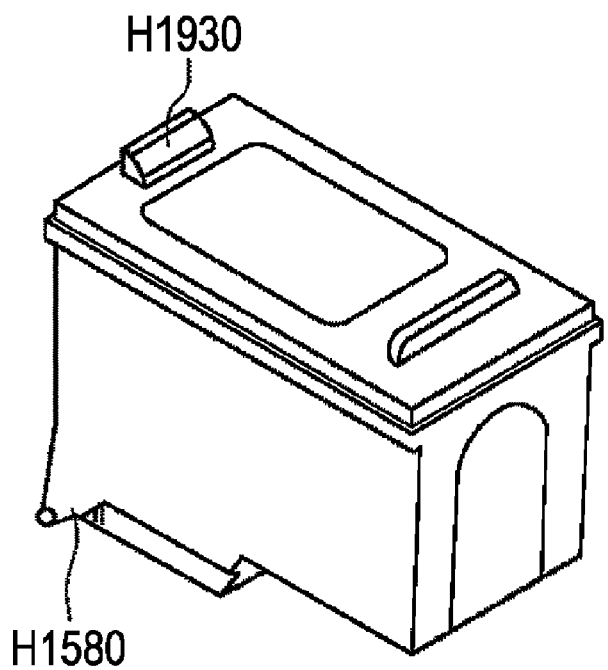

The inventors of the present invention have found a specific compound that suppresses the dissolution of a protective layer very well. Also, it has been found that the coexistence of the specific compound and a substance that dissolves the protective layer in ink can prevent image deterioration due to a reduction in thickness of the protective layer and a reduction in printing durability and also can maintain discharge reliability, resulting in the completion of the present invention.

Hereinafter, the present invention will be described in further detail with reference to a preferred embodiment.

(Ink)

An ink of the present invention can effectively suppress the dissolution of a protective layer made of a material containing a silicon nitride, a silicon oxide, or a silicon carbide even when the ink contacts the protective layer for a long time. Further, the ink is excellent because it can suppress even a negative effect due to the elution of a polyvalent metal, and, at the same time, the ink maintains a high level of discharge reliability. Hereinafter, components of the ink according to the present invention will be described in detail.

(Substance that Dissolves Protective Layer)

Whether or not a certain substance corresponds to a "substance that dissolves a protective layer" of the present invention is decided as described below. First, an SiN layer having a thickness of 400 nm is formed on the surface of a silicon wafer of 11 mm by 5 mm. Next, the silicon wafer having the SiN layer is immersed in a 50 mmol/l solution of a substance to be judged in a closed vessel at a temperature of 60° C. One week after, the silicon wafer having the SiN layer is taken out, washed with pure water, and dried, and then the thickness of the SiN layer is measured. As a result of the measurement, a substance that is found to reduce the thickness of the SiN layer by 5% or more after the immersion is defined as a "substance that dissolves a protective layer" of the present invention. It should be noted that the thickness of the SiN layer can be measured by an ordinary method. For example, the thickness can be measured using a non-contact type thickness measuring apparatus (trade name: NANOSPEC/AFT Model 210, manufactured by Nanometorics Japan, Ltd.).

The inventors of the present invention have experimentally confirmed that the above-mentioned test conditions substantially correspond to a state where an ink cartridge holding ink is stationarily kept for about 2 years. In addition, the inventors have confirmed that the above-mentioned test conditions are substantially identical to the conditions of 60° C. for 30 days, which are the storage conditions of an ink cartridge in each of the examples below. Accordingly, 1 week, which is the immersion period of the silicon wafer under the above-mentioned test conditions, is shorter than 30 days in the storage test of an ink cartridge performed in any one of the examples. The inventors of the present invention consider a reason for the difference between the periods to be as described below. In the above-mentioned test conditions, the volume of the above-mentioned solution containing a substance that dissolves a protective layer is not specified because the volume is increased in such a manner that the dissolution of the SiN layer is not affected by an increase in concentration of chemical species in the solution due to the dissolution. Meanwhile, the volume of ink in contact with a protective layer in an actual ink cartridge is finite and extremely small compared to the volume of the solution under the test conditions, so the concentration of chemical species dissolved increases. As a result, the dissolution rate of the protective layer is low, so it is assumed that the period in the storage test must be set to be longer than the immersion period of the silicon wafer under the above-mentioned test conditions.

The substance that dissolves the protective layer is not particularly limited as long as the substance satisfies the above-mentioned conditions. Specific examples of the substance found by the inventors of the present invention include the following compounds (1) and (2) and compounds represented by general formulae (2) and (3), which may be contained as a coloring material in ink. Details about the mechanism via which those coloring materials each dissolve a protective layer are unclear. However, without intending to be bound by theory, the inventors of the present invention assume that a specific site at each of the above-mentioned coloring materials chelates with silicon serving as a component of the protective layer to cause a reduction in thickness of the layer.

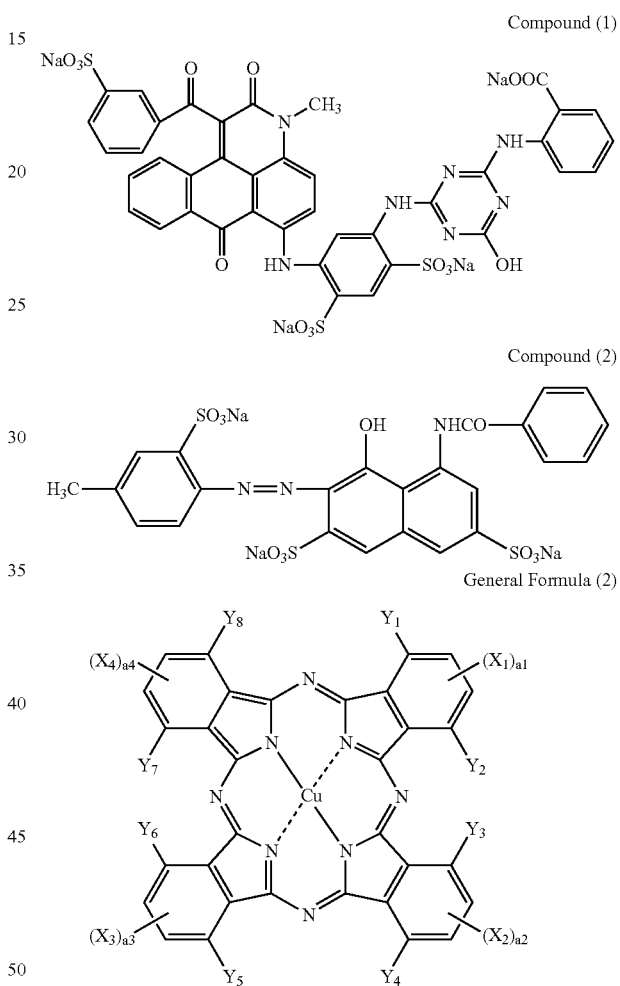

wherein $X_1$, $X_2$, $X_3$, and $X_4$ each independently represent —SO—Z, —SO$_2$—Z, —SO$_2$NR$_1$R$_2$, a sulfonic acid group, —CONR$_2$R$_2$, or —CO$_2$R$_1$, wherein Z is a substituted or unsubstituted alkyl group, a substituted or unsubstituted cycloalkyl group, a substituted or unsubstituted alkenyl group, a substituted or unsubstituted aralkyl group, a substituted or unsubstituted aryl, or a substituted or unsubstituted heterocyclic group, and $R_1$ and $R_2$ are each independently a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl, or a substituted or unsubstituted heterocyclic group; $Y_1$, $Y_2$, $Y_3$, $Y_4$, $Y_5$, $Y_6$, $Y_7$, and $Y_8$ are each independently a hydrogen atom, a halogen atom, a substituted or unsubstituted alkyl group, a substituted or unsubstituted aryl group, a cyano group, a substituted or unsubstituted alkoxy group, an amide group, a ureido group, a sulfonamide group, a substituted or unsubstituted carbamoyl group, a substituted or unsubstituted sulfamoyl group, a substituted or unsubstituted alkoxycarbonyl group, a carboxyl group, or a sulfonic acid group; and $a_1$, $a_2$, $a_3$, and $a_4$ represent the numbers of substituents of $X_1$, $X_2$, $X_3$, and $X_4$, respectively, and are each independently 1 or 2.

General Formula (3)

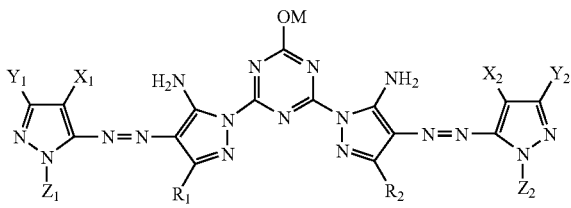

wherein $R_1$, $R_2$, $Y_1$, and $Y_2$ are each independently a monovalent group, $X_1$ and $X_2$ each independently an electron-withdrawing group having a Hammett σp value of 0.20 or more, $Z_1$ and $Z_2$ are each independently a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, and M is a hydrogen atom, an alkali metal, ammonium, or organic ammonium.

Further, the inventors of the present invention have extensively studied the mechanism of dissolution of the protective layer with respect to a substance other than the coloring material among the components contained in ink. As a result, the inventors have found that a substance that forms a chelate compound with silicon ionizes silicon contained in the protective layer to dissolve silicon in the ink, so the protective layer is corroded, and so the thickness of the layer is reduced.

Accordingly, the inventors of the present invention have investigated the dissolution mechanism of the protective layer with respect to a compound that easily forms a chelate compound with silicon that is a component of the protective layer. As a result, the inventors have discovered that the protective layer is significantly dissolved during physical distribution storage when ink contains a polyvalent carboxylic acid or a salt thereof. Specific examples of the polyvalent carboxylic acid or the salt thereof include citric acid, oxalic acid, malonic acid, maleic acid, succinic acid, fumaric acid, itaconic acid, phthalic acid, isophthalic acid, terephthalic acid, adipic acid, sebacic acid, dimer acid, pyromellitic acid, trimellitic acid, gluconic acid, and EDTA, and salts thereof. Specific examples of the salts include salts of alkali metals or alkaline-earth metals, ammonium salts, and primary, secondary, and tertiary amine salts. Of these compounds, citric acid and salts thereof are particularly preferable.

It should be noted that, in the present invention, although a coloring material, part of a carboxylic acid, or a salt is present in an ionic state in ink, this state is represented by the phrase "contains a coloring material", "contains an acid", or "contains a salt" for convenience.

(Compound that Suppresses Dissolution of Protective Layer)

The inventors of the present invention have extensively studied a compound that suppresses the dissolution of a protective layer provided on a surface where a heating portion contacts ink. As a result, it has been found that the compound represented by the above-mentioned general formula (1) can effectively suppress the dissolution of the protective layer. The mechanism via which the compound suppresses the dissolution of the protective layer is unknown. However, without intending to be bound by theory, the inventors of the present invention assume the mechanism to be as follows: the polarity possessed by the compound represented by the general formula (1) has such an appropriate value that the compound interacts with silicon in the protective layer without chelating with silicon in the protective layer, so the compound is attracted toward the vicinity of the surface of the protective layer to protect the surface of the protective layer. As a result, the substance that dissolves the protective layer can be effectively prevented from chelating with silicon.

Preferred examples of the compound represented by the general formula (1) include sulfine, sulfinic acid, dimethyl sulfine, dimethyl sulfoxide, dimethyl sulfone, (2-hydroxyethyl)methyl sulfone, thiodiglycol, bis(2-hydroxyethyl) sulfoxide, 1-(2-hydroxyethylthio)-2-propanol, and bis(2-hydroxyethyl) sulfone.

As a result of further investigation, the inventors of the present invention have found that when $R_1$ and $R_2$ are each independently a hydroxyalkyl group, the dissolution of the protective layer can be further suppressed. The mechanism via which the compound suppresses the dissolution of the protective layer is unknown. However, without intending to be bound by theory, the inventors of the present invention assume the mechanism to be as follows: When a compound has a hydroxyl group at an end of its carbon chain as in the compound represented by the general formula (1) in which $R_1$ and $R_2$ are each a hydroxyalkyl group, the compound is easily attracted to the vicinity of the surface of the protective layer to more closely protect the surface of the protective layer. As a result, the substance that dissolves the protective layer can be effectively prevented from chelating with silicon.

In the present invention, preferably, $R_1$ and $R_2$ are each a hydroxyethyl group among hydroxyalkyl groups. The mechanism via which the compound suppresses the dissolution of the protective layer is unknown. However, without intending to be bound by theory, the inventors of the present invention assume the mechanism to be as follows: When $R_1$ and $R_2$ are each a hydroxyethyl group, not only do single molecules adsorb on the protective layer, but also the molecules aggregate with each other to easily form a planar network, thereby more closely protecting the surface of the protective layer. As a result, the substance that dissolves the protective layer can be effectively prevented from chelating with silicon. Therefore, among the preferred compounds, thiodiglycol, bis(2-hydroxyethyl) sulfoxide, 1-(2-hydroxyethylthio)-2-propanol, and bis(2-hydroxyethyl) sulfone are particularly preferred, and bis(2-hydroxyethyl) sulfone is more preferred.

It is difficult to suppress the dissolution of the protective layer when each of the above-exemplified substances to be used in the present invention, each of which suppresses the dissolution of the protective layer, is added in an extremely small amount. In contrast, when each of the substances is added in an extremely large amount, it becomes difficult to maintain a high level of discharge reliability through a combination with a coloring material or the like. Therefore, the concentration of the substance that is contained in ink and suppresses the dissolution of the protective layer must be controlled to fall within a certain range in order to maintain the discharge reliability of the ink and effectively suppress the dissolution of the protective layer. Specifically, when ink contains the substance that dissolves the protective layer, the content X (% by mass) of the compound represented by the general formula (1) in the ink satisfies the relationship of $1 \leq X \leq 30$. When the content of the compound represented by the general formula (1) is smaller than 1% by mass relative to the total amount of the ink, it becomes difficult to suppress the dissolution of the protective layer effectively. When the content is larger than 30% by mass relative to the total amount of the ink, it becomes difficult to maintain the discharge reliability of the ink.

On the other hand, the inventors have discovered that a polycarboxylic acid or a salt thereof which is a substance that dissolves the protective layer significantly dissolves the protective layer during physical distribution storage. However, the polycarboxylic acid and the salt thereof each act to capture a trace amount of a metal ion or the like eluted from a member in contact with ink upon charging and storage of the ink in an ink tank and to dissolve the metal ion or the like in the ink stably. This action has the effect of suppressing the precipitation of an insolubilized hydroxide or oxide of a metal at a nozzle ejection orifice when a head is mounted on a printer main body and left for a long period of time to bring a nozzle into a dry state or when a state in which an unused nozzle is dried is repeated at the time of continuous printing.

Figure 8:
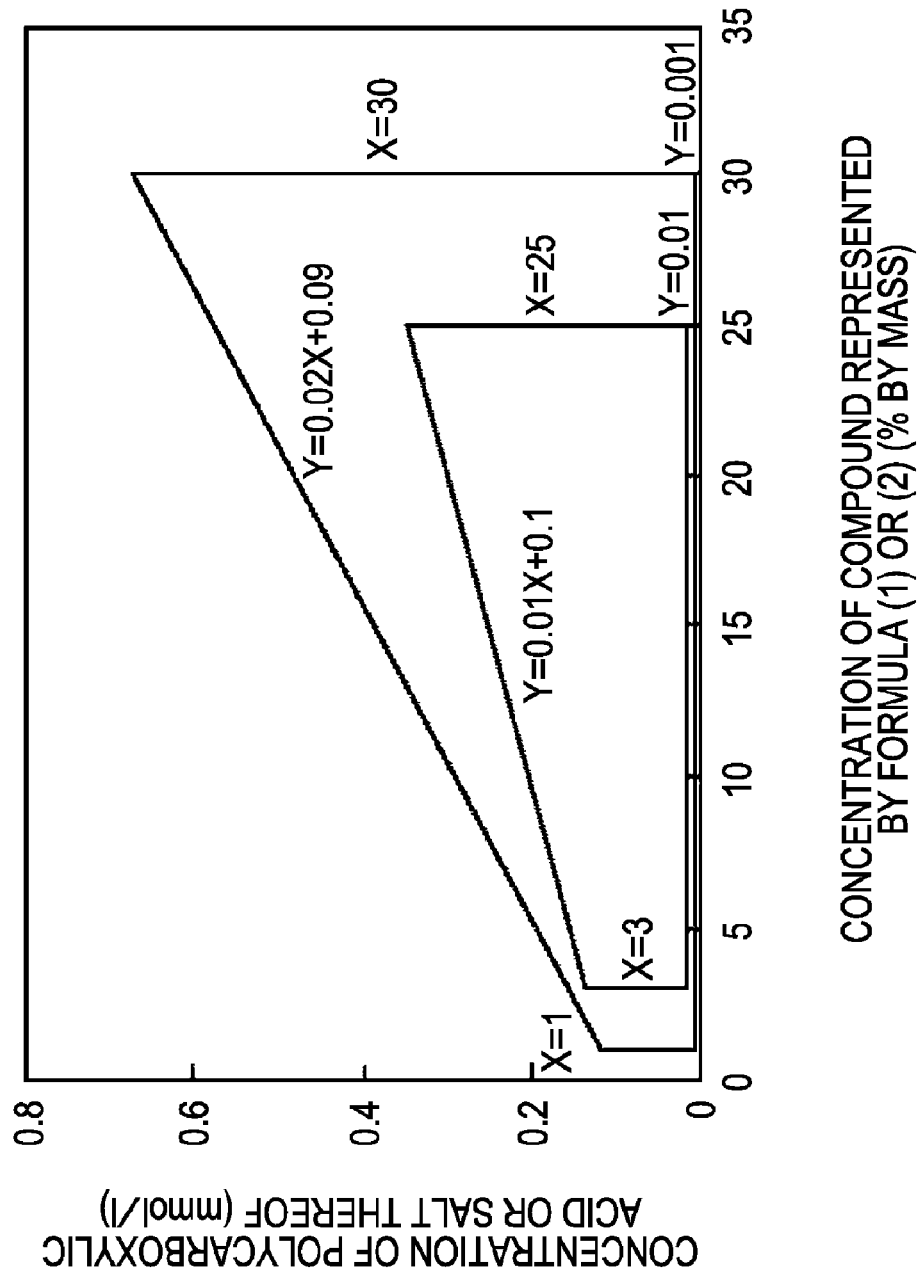
FIG. 8 is a graph showing the concentration of a compound represented by a general formula (1) and the concentration of a polycarboxylic acid suitably used.

The inventors of the prevent invention have found that, when a polycarboxylic acid or a salt thereof serving as the substance that dissolves the protective layer is contained in ink, it is necessary to achieve both the suppression of the dissolution of the protective layer due to long-term storage and a reduction in deterioration of discharge stability resulting from an impurity eluted from the ink tank. Also, the inventors of the present invention have found that, in order to achieve both, there is a preferable relationship between the concentration of the substance that dissolves the protective layer in the ink and the concentration of the compound that suppresses the dissolution of the protective layer in the ink. Specifically, it is preferable to satisfy the relationship of $0.001 \leq Y \leq 0.02X + 0.09$ between the content X (% by mass) of the compound represented by the general formula (1) serving as a compound that suppresses the dissolution of the protective layer in the ink and the content Y (mmol/l) of the polycarboxylic acid and the salt thereof. The range corresponds to the range of an outer trapezoid in FIG. 8.

Further, the thickness of the protective layer containing a silicon oxide, a silicon nitride, or a silicon carbide and that is in direct contact with the ink of a head heating portion, which will be described later, is preferably 50 nm to 500 nm from the viewpoints of thermal conversion efficiency and durability. In the thickness range, thermal conversion efficiency is sensitively susceptible to a reduction in thickness due to the dissolution of the protective layer in the ink. As a result, there easily occur negative effects such as abnormal foaming and a large change in the amount of the ink discharged or in the discharge rate. From this viewpoint, the content X (% by mass) of the compound represented by the general formula (1) described above particularly preferably satisfies the relationship of $3 \leq X \leq 25$. In addition, the content Y (mmol/l) of the polycarboxylic acid and the salt thereof particularly preferably satisfies the relationship of $0.01 \leq Y \leq 0.01X + 0.1$. The range corresponds to the range of an inner trapezoid in FIG. 8.

Hereinafter, the other components contained in the ink of the present invention will be described in detail.

(Coloring Material)

Preferable examples of the coloring material to be contained in the ink according to the present invention are given below, but the coloring material is not limited to these examples.

C. I. Direct Yellow: 8, 11, 12, 27, 28, 33, 39, 44, 50, 58, 85, 86, 87, 88, 89, 98, 100, 110, 132, 173, and the like C. I. Acid Yellow: 1, 3, 7, 11, 17, 23, 25, 29, 36, 38, 40, 42, 44, 76, 98, 99, and the like C. I. Food Yellow: 3 and the like C. I. Pigment Yellow: 1, 2, 3, 12, 13, 14, 15, 16, 17, 73, 74, 75, 83, 93, 95, 97, 98, 114, 128, 138, 180, and the like C. I. Direct Red: 2, 4, 9, 11, 20, 23, 24, 31, 39, 46, 62, 75, 79, 80, 83, 89, 95, 197, 201, 218, 220, 224, 225, 226, 227, 228, 229, 230, and the like C. I. Acid Red: 6, 8, 9, 13, 14, 18, 26, 27, 32, 35, 42, 51, 52, 80, 83, 87, 89, 92, 106, 114, 115, 133, 134, 145, 158, 198, 249, 265, 289, and the like C. I. Food Red: 87, 92, 94, and the like C. I. Direct Violet: 107 and the like C. I. Pigment Red: 2, 5, 7, 12, 48:2, 48:4, 57:1, 112, 122, 123, 168, 184, 202, and the like C. I. Direct Blue: 1, 15, 22, 25, 41, 76, 77, 80, 86, 90, 98, 106, 108, 120, 158, 163, 168, 199, 226, 307, and the like C. I. Acid Blue: 1, 7, 9, 15, 22, 23, 25, 29, 40, 43, 59, 62, 74, 78, 80, 90, 100, 102, 104, 112, 117, 127, 138, 158, 161, 203, 204, 221, 244, and the like C. I. Pigment Blue: 1, 2, 3, 15, 15:2, 15:3, 15:4, 16, 22, 60, and the like C. I. Acid Orange: 7, 8, 10, 12, 24, 33, 56, 67, 74, 88, 94, 116, 142, and the like C. I. Acid Red: 111, 114, 266, 374, and the like C. I. Direct Orange: 26, 29, 34, 39, 57, 102, 118, and the like C. I. Food Orange: 3 and the like C. I. Reactive Orange: 1, 4, 5, 7, 12, 13, 14, 15, 16, 20, 29, 30, 84, 107, and the like C. I. Disperse Orange: 1, 3, 11, 13, 20, 25, 29, 30, 31, 32, 47, 55, 56, and the like C. I. Pigment Orange: 43 and the like C. I. Pigment Red: 122, 170, 177, 194, 209, 224, and the like C. I. Acid Green: 1, 3, 5, 6, 9, 12, 15, 16, 19, 21, 25, 28, 81, 84, and the like C. I. Direct Green: 26, 59, 67, and the like C. I. Food Green: 3 and the like C. I. Reactive Green: 5, 6, 12, 19, 21, and the like C. I. Disperse Green: 6, 9, and the like C. I. Pigment Green: 7, 36, and the like C. I. Acid Blue: 62, 80, 83, 90, 104, 112, 113, 142, 203, 204, 221, 244, and the like C. I. Reactive Blue: 49 and the like C. I. Acid Violet: 17, 19, 48, 49, 54, 129, and the like C. I. Direct Violet: 9, 35, 47, 51, 66, 93, 95, 99, and the like C. I. Reactive Violet: 1, 2, 4, 5, 6, 8, 9, 22, 34, 36, and the like C. I. Disperse Violet: 1, 4, 8, 23, 26, 28, 31, 33, 35, 38, 48, 56, and the like C. I. Pigment Blue: 15:6 and the like C. I. Pigment Violet: 19, 23, 37, and the like C. I. Direct Black: 17, 19, 22, 31, 32, 51, 62, 71, 74, 112, 113, 154, 168, 195, and the like C. I. Acid Black: 2, 48, 51, 52, 110, 115, 156, and the like C. I. Food Black: 1, 2, and the like Carbon Black In addition, examples of other coloring materials that can be preferably used in the present invention include coloring materials represented by the following general formulae (2) to (10):

General Formula (2)

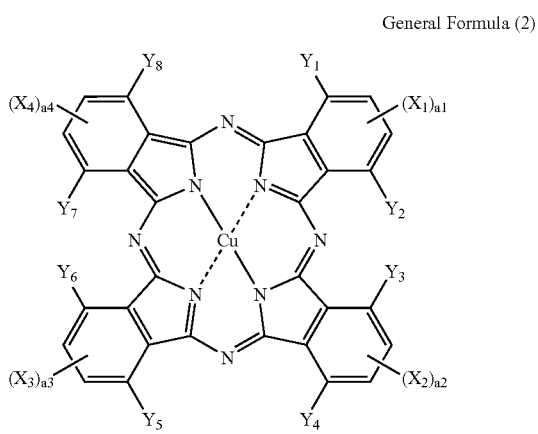

wherein $X_1$, $X_2$, $X_3$, and $X_4$ each independently represent —SO—Z, —SO$_2$—Z, —SO$_2$NR$_1$R$_2$, a sulfonic acid group, —CONR$_2$R$_2$, or —CO$_2$R$_1$, wherein Z is a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, and $R_1$ and $R_2$ are each independently a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl, or a substituted or unsubstituted heterocyclic group; $Y_1$, $Y_2$, $Y_3$, $Y_4$, $Y_5$, $Y_6$, $Y_7$, and $Y_8$ are each independently a hydrogen atom, a halogen atom, a substituted or unsubstituted alkyl group, a substituted or unsubstituted aryl group, a cyano group, a substituted or unsubstituted alkoxy group, an amide group, a ureido group, a sulfonamide group, a substituted or unsubstituted carbamoyl group, a substituted or unsubstituted sulfamoyl group, a substituted or unsubstituted alkoxycarbonyl group, a carboxyl group, or a sulfonic acid group; and $a_1$, $a_2$, $a_3$, and $a_4$ represent the numbers of substituents of $X_1$, $X_2$, $X_3$, and $X_4$, respectively, and are each independently 1 or 2.

In the general formula (2), $X_1$, $X_2$, $X_3$, and $X_4$ each independently represent —SO—Z, —SO$_2$—Z, —SO$_2$NR$_1$R$_2$, a sulfonic acid group, —CONR$_2$R$_2$, or —CO$_2$R$_1$. Among these groups, —SO—Z, —SO$_2$—Z, —SO$_2$NR$_1$R$_2$, and —CONR$_2$R$_2$ are preferred, —SO$_2$—Z and —SO$_2$NR$_1$R$_2$ are more preferred, and —SO—Z is particularly preferred. When any one of $a_1$, $a_2$, $a_3$, and $a_4$ representing the numbers of substituents $X_1$, $X_2$, $X_3$, and $X_4$, respectively, is 2, a plurality of groups of any one of $X_1$, $X_2$, $X_3$, and $X_4$ may be the same or different and are each independently any one of the above-described groups. $X_1$, $X_2$, $X_3$, and $X_4$ may be the same or different. As in the case in which all of $X_1$, $X_2$, $X_3$, and $X_4$ are —SO$_2$—Z— and Z are different from one another, the substituents may be the same type but partially different. Alternatively, as in the case in which $X_1$, $X_2$, $X_3$, and $X_4$ are —SO$_2$—Z— and SO$_2$NR$_1$R$_2$, the substituents may be different from one another.

Z is a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. Among these groups, a substituted or unsubstituted alkyl group, a substituted or unsubstituted aryl group, or a substituted or unsubstituted heterocyclic group is preferred, and a substituted alkyl group, a substituted aryl group, or a substituted heterocyclic group is more preferred.

$R_1$ and $R_2$ are each independently a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl, or a substituted or unsubstituted heterocyclic group. Among these groups, a hydrogen atom, a substituted or unsubstituted alkyl group, a substituted or unsubstituted aryl group, or a substituted or unsubstituted heterocyclic group is preferred, and a hydrogen atom, a substituted alkyl group, a substituted aryl group, or a substituted heterocyclic group is more preferred. However, it is undesirable for both $R_1$ and $R_2$ to be hydrogen atoms.

$R_1$, $R_2$, and Z in the general formula (2) are described in further detail below. It should be noted that the number of carbons in each of the groups described below does not include the number of atoms in a substituent.

Examples of the alkyl group include substituted or unsubstituted alkyl groups having 1 to 30 carbon atoms. In particular, from the viewpoint of solubility of the coloring material and stability of the ink, branched alkyl groups are preferred, and alkyl groups (used as racemic modifications) each having an asymmetric carbon are more preferred. The alkyl group may further contain a substituent. Specific examples of the substituent include the same substituents as in the case in which Z, $R_1$, $R_2$, and $Y_1$ to $Y_8$ may further contain a substituent. In particular, a hydroxyl group, an ether group, an ester group, a cyano group, an amide group, or a sulfonamide group is preferred because the association property and toughness of the coloring material are improved. The alkyl group may contain a halogen atom or an ionic hydrophilic group.

Examples of the cycloalkyl group include substituted or unsubstituted cycloalkyl groups having 5 to 30 carbon atoms. In particular, from the viewpoint of solubility of the coloring material and stability of the ink, cycloalkyl groups (used as racemic modifications) each having an asymmetric carbon are preferred. The cycloalkyl group may further contain a substituent. Specific examples of the substituent include the same substituents as in the case in which Z, $R_1$, $R_2$, and $Y_1$ to $Y_8$ may further contain a substituent. In particular, a hydroxyl group, an ether group, an ester group, a cyano group, an amide group, or a sulfonamide group is preferred because the association property and toughness of the coloring material are improved. The cycloalkyl group may contain a halogen atom or an ionic hydrophilic group.

Examples of the alkenyl group include substituted or unsubstituted alkenyl groups having 2 to 30 carbon atoms. In particular, from the viewpoint of solubility of the coloring material and stability of the ink, branched alkenyl groups are preferred, and alkenyl groups (used as racemic modifications) each having an asymmetric carbon are more preferred. The alkenyl group may further contain a substituent. Specific examples of the substituent include the same substituents as in the case in which Z, $R_1$, $R_2$, and $Y_1$ to $Y_8$ may further contain a substituent. In particular, a hydroxyl group, an ether group, an ester group, a cyano group, an amide group, or a sulfonamide group is preferred because the association property and toughness of the coloring material are improved. The alkenyl group may contain a halogen atom or an ionic hydrophilic group.

Examples of the aralkyl group include substituted or unsubstituted aralkyl groups having 7 to 30 carbon atoms. In particular, from the viewpoint of solubility of the coloring material and stability of the ink, branched aralkyl groups are preferred, and aralkyl groups (used as racemic modifications) each having an asymmetric carbon are more preferred. The aralkyl group may further contain a substituent. Specific examples of the substituent include the same substituents as in the case in which Z, $R_1$, $R_2$, and $Y_1$ to $Y_8$ may further contain a substituent. In particular, a hydroxyl group, an ether group, an ester group, a cyano group, an amide group, or a sulfonamide group is preferred because the association property and toughness of the coloring material are improved. The aralkyl group may contain a halogen atom or an ionic hydrophilic group.

Examples of the aryl group include substituted or unsubstituted aryl groups having 6 to 30 carbon atoms. The aryl group may further contain a substituent. Specific examples of the substituent include the same substituents as in the case in which Z, $R_1$, $R_2$, and $Y_1$ to $Y_8$ may further contain a substituent. In particular, an electron-withdrawing group is preferred because the toughness of the coloring material can be improved due to the electropositive oxidation potential. Examples of the electron-withdrawing group include groups having a positive Hammett substituent constant σp value. In particular, a halogen atom, a heterocyclic group, a cyano group, a carboxyl group, an acylamino group, a sulfonamide group, a sulfamoyl group, a carbamoyl group, a sulfonyl group, an imide group, an acyl group, a sulfonic acid group, or a quaternary ammonium group is preferred. Among these groups, a cyano group, a carboxyl group, a sulfamoyl group, a carbamoyl group, a sulfonyl group, an imide group, an acyl group, a sulfonic acid group, or a quaternary ammonium group is more preferred.

The heterocyclic group is a five- or six-membered substituted or unsubstituted aromatic or non-aromatic heterocyclic group and may be further condensed. Specific examples of the heterocyclic group as each of $R_1$, $R_2$, and Z are given below, but substitution positions are omitted. It should be noted that the substitution positions are not particularly limited, and, for example, pyridine may be substituted at any one of the 2-, 3-, and 4-positions. The examples include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, and thiazoline. Among these groups, aromatic heterocyclic groups are preferred, and pyridine, pyrazine, pyrimidine, pyridazine, triazine, pyrazole, imidazole, benzimidazole, triazole, thiazole, benzothiazole, isothiazole, benzisothiazole, and thiadiazole are more preferred.

These heterocyclic groups may further contain a substituent. Specific examples of the substituent include the same substituents as in the case in which Z, $R_1$, $R_2$, and $Y_1$ to $Y_8$ may further contain a substituent. In particular, an electron-withdrawing group is preferred because the toughness of the coloring material can be improved due to the electropositive oxidation potential. Examples of the electron-withdrawing group include groups having a positive Hammett substituent constant σp value. In particular, a halogen atom, a heterocyclic group, a cyano group, a carboxyl group, an acylamino group, a sulfonamide group, a sulfamoyl group, a carbamoyl group, a sulfonyl group, an imide group, an acyl group, a sulfonic acid group, or a quaternary ammonium group is preferred. Among these groups, a cyano group, a carboxyl group, a sulfamoyl group, a carbamoyl group, a sulfonyl group, an imide group, an acyl group, a sulfonic acid group, or a quaternary ammonium group is more preferred.

In the general formula (2), $Y_1$, $Y_2$, $Y_3$, $Y_4$, $Y_5$, $Y_6$, $Y_7$, and $Y_8$ are each independently a hydrogen atom, a halogen atom, a substituted or unsubstituted alkyl group, a substituted or unsubstituted aryl group, a cyano group, a substituted or unsubstituted alkoxy group, an amide group, a ureido group, a sulfonamide group, a substituted or unsubstituted carbamoyl group, a substituted or unsubstituted sulfamoyl group, a substituted or unsubstituted alkoxycarbonyl group, a carboxyl group, or a sulfonic acid group. Among these groups, a hydrogen atom, a halogen atom, a carboxyl group, or a sulfonic acid group is preferred, and a hydrogen atom is particularly preferred.

Hereinafter, $Y_1$ to $Y_8$ in the general formula (2) are described in further detail. It should be noted that the number of carbons of each of the groups described below does not include the number of carbons of a substituent.

Examples of the halogen atom include a chlorine atom, a bromine atom, and an iodine atom. Among these, a chlorine atom or a bromine atom is preferred, and a chlorine atom is particularly preferred.

Examples of the alkyl group include substituted or unsubstituted alkyl groups having 1 to 30 carbon atoms, such as methyl, ethyl, butyl, tert-butyl, n-octyl, eicosyl, 2-chloroethyl, hydroxyethyl, cyanoethyl, and 4-sulfobutyl.

Examples of the aryl group include substituted or unsubstituted aryl groups having 6 to 30 carbon atoms, such as phenyl, p-tolyl, naphthyl, m-chlorophenyl, and o-hexadecanoylaminophenyl.

Examples of the alkoxy group include substituted or unsubstituted alkoxy groups having 1 to 30 carbon atoms, such as methoxy, ethoxy, isopropoxy, n-octyloxy, methoxyethoxy, hydroxyethoxy, and 3-carboxypropoxy.

Examples of the carbamoyl group include substituted or unsubstituted carbamoyl groups having 1 to 30 carbon atoms, such as carbamoyl, N-methylcarbamoyl, N,N-dimethylcarbamoyl, N,N-di-n-octylcarbamoyl, and N-(methylsulfonyl)carbamoyl.

Examples of the sulfamoyl group include substituted or unsubstituted sulfamoyl groups having 0 to 30 carbon atoms, such as N-ethylsulfamoyl, N-(3-dodecyloxypropyl)sulfamoyl, N,N-dimethylsulfamoyl, N-acetylsulfamoyl, N-benzoylsulfamoyl, and N—(N'-phenylcarbamoyl)sulfamoyl.

Examples of the alkoxycarbonyl group include substituted or unsubstituted alkoxycarbonyl groups having 2 to 30 carbon atoms, such as methoxycarbonyl, ethoxycarbonyl, tert-butoxycarbonyl, and n-octadecyloxycarbonyl.

When Z, $R_1$, $R_2$, and $Y_1$ to $Y_8$ may further contain a substituent, they may further contain any one of the substituents described below. Examples of the substituents include a straight or branched alkyl group having 1 to 12 carbon atoms, a straight or branched aralkyl group having 7 to 18 carbon atoms, a straight or branched alkenyl group having 2 to 12 carbon atoms, a straight or branched alkynyl group having 2 to 12 carbon atoms, a straight or branched cycloalkyl group having 3 to 12 carbon atoms, and a straight or branched cycloalkenyl group having 3 to 12 carbon atoms. From the viewpoint of solubility of the coloring material and stability of the ink, branched substituents are preferred, and substituents having an asymmetric carbon are particularly preferred.

Specific examples of the substituents include substituted or unsubstituted alkyl groups, such as methyl, ethyl, propyl, isopropyl, sec-butyl, tert-butyl, 2-ethylhexyl, 2-methylsulfonylethyl, 3-phenoxypropyl, trifluoromethyl, and cyclopentyl; halogen atoms, such as a chlorine atom and a bromine atom; aryl groups, such as phenyl, 4-tert-butylphenyl, and 2,4-di-tert-amylphenyl; heterocyclic groups, such as imidazolyl, pyrazolyl, triazolyl, 2-furyl, 2-thienyl, 2-pyrimidinyl, and 2-benzothiazolyl; a cyano group; a hydroxyl group; a nitro group; a carboxy group; an amino group; alkyloxy groups, such as methoxy, ethoxy, 2-methoxyethoxy, and 2-methanesulfonylethoxy; aryloxy groups, such as phenoxy, 2-methylphenoxy, 4-tert-butylphenoxy, 3-nitrophenoxy, 3-tert-butyloxycarbamoylphenoxy, and 3-methoxycarbamoyl; acylamino groups, such as acetamide, benzamide, and 4-(3-tert-butyl-4-hydroxyphenoxy)butaneamide; alkylamino groups, such as methylamino, butylamino, diethylamino, and methylbutylamino; aniline groups, such as phenylamino and 2-chloroanilino; ureido groups, such as phenylureido, methylureido, and N,N-dibutylureido; sulfamoylamino groups, such as N,N-dipropylsulfamoylamino; alkylthio groups, such as methylthio, octylthio, and 2-phenoxyethylthio; arylthio groups, such as phenylthio, 2-butoxy-5-tert-octylphenylthio, and 2-carboxyphenylthio; alkyloxycarbonylamino groups, such as methoxycarbonylamino; sulfonamide groups, such as methane sulfonamide, benzene sulfonamide, and p-toluene sulfonamide; carbamoyl groups, such as N-ethylcarbamoyl and N,N-dibutylcarbamoyl; sulfamoyl groups, such as N-ethylsulfamoyl, N,N-dipropylsulfamoyl, and N-phenylsulfamoyl; sulfonyl groups, such as methanesulfonyl, octanesulfonyl, benzenesulfonyl, and toluenesulfonyl; alkyloxycarbonyl groups, such as methoxycarbonyl and butyloxycarbonyl; heterocyclic oxy groups, such as 1-phenyltetrazole-5-oxy and 2-tetrahydropyranyloxy; azo groups, such as phenylazo, 4-methoxyphenylazo, 4-pivaloylaminophenylazo, and 2-hydroxy-4-propanoylphenylazo; acyloxy groups, such as acetoxy; carbamoyloxy groups, such as N-methylcarbamoyloxy and N-phenylcarbamoyloxy; silyloxy groups, such as trimethylsilyloxy and dibutylmethylsilyloxy; aryloxycarbonylamino groups, such as phenoxycarbonylamino; imide groups, such as N-succinimide and N-phthalimide; heterocyclic thio groups, such as 2-benzothiazolylthio, 2,4-di-phenoxy-1,3,5-triazole-6-thio, and 2-pyridylthio; sulfinyl groups, such as 3-phenoxypropylsulfinyl; phosphonyl groups, such as phenoxyphosphonyl, octyloxyphosphonyl, and phenylphosphonyl; aryloxycarbonyl groups, such as phenoxycarbonyl; acyl groups, such as acetyl, 3-phenylpropanoyl, and benzoyl; and ionic hydrophilic groups, such as a carboxyl group, a sulfo group, a phosphono group, and a quaternary ammonium group. In the general formula (2), the number of ionic hydrophilic groups is preferably at least 2 per molecule, and the number of sulfonic acid groups and/or carboxyl groups is more preferably at least two per molecule.

In the general formula (2), $a_1$, $a_2$, $a_3$, and $a_4$ represent the numbers of substituents of $X_1$, $X_2$, $X_3$, and $X_4$, respectively, and are each independently an integer of 1 or 2. When at least one of $a_1$, $a_2$, $a_3$, and $a_4$ is 2, there is a plurality of groups of at least one of $X_1$, $X_2$, $X_3$, and $X_4$. In this case, a plurality of groups may be the same or different. In the present invention, $a_1$, $a_2$, $a_3$, and $a_4$ are particularly preferably 1.

In the compound of the general formula (2), phthalocyanine ring (Pc) may form a dimer (Pc-Cu-L-Cu-Pc) or a trimer (Pc-Cu-L-Cu-L-Cu-Pc) through a divalent connecting group (L). The divalent connecting group L is preferably an oxy group (—O—), a thio group (—S—), a carbonyl group (—CO—), a sulfonyl group (—SO$_2$—), an imino group (—NH—), or a methylene group (—CH$_2$—), or a combination thereof.

In the present invention, preferably at least one of the substituents in the general formula (2) is any one of the above-described substituents, and more preferably, a large number of the substituents are the above-described substituents. In particular, preferably all substituents are the above-described substituents. Further, the compound of the general formula (2) preferably has water solubility. In this case, the substituents in the general formula (2) preferably include an ionic hydrophilic group. Examples of the ionic hydrophilic groups include a sulfonic acid group, a carboxyl group, a phosphono group, and a quaternary ammonium group. Among these groups, a carboxyl group, a phosphono group, or a sulfonic acid group is preferred, and a carboxyl group or a sulfonic acid group is particularly preferred. A carboxyl group, a phosphono group, and a sulfonic acid group may be in a salt form. Examples of a counter ion which forms a salt include alkali metal ions, ammonium ions, and organic cations. Examples of alkali metal ions include lithium ion, sodium ion, and potassium ion. Examples of organic cations include tetramethylammonium ion, tetramethylguanidinium ion, and tetramethylphosphonium. Among these, an alkali metal salt is preferred, and a lithium salt is particularly preferred from the viewpoint of solubility of the coloring material and stability of the ink.

In the present invention, the compound of the general formula (2) can be used in combination with the compound of the general formula (1). Therefore, the compound of the general formula (2) preferably has a site, for example, a hydroxyl group, that can form a hydrogen bond with the compound of the general formula (1) when mixed with the compound of general formula (1).

Further, in the compound of the general formula (2), at least one electron-withdrawing group, such as a sulfinyl group, a sulfonyl group, or a sulfamoyl group, is preferably introduced into each of the four benzene rings of the phthalocyanine skeleton. Further, the total of the Hammett substituent constant σp values of all electron-withdrawing groups introduced into the phthalocyanine skeleton in the general formula (2) is particularly preferably 1.60 or more.

Herein, the Hammett rule and Hammett substituent constant σp value (referred to as the "Hammett σp value" hereinafter) are described. The Hammett rule, the validity of which has been widely accepted, is the empirical rule proposed by L. P. Hammett in 1935 in order to quantitatively discuss the influences of substituents on reaction and equilibrium of benzene derivatives. The substituent constants according to the Hammett rule include a σp value and a σm value, and these values are described in many general books. For example, these values are described in detail in J. A. Dean, Lange's Handbook of Chemistry, 12th edition, 1979, McGraw-Hill and in Kagaku-no Ryoiki Zokan, No. 122, pp. 96-103, 1979, Nankodo.

In the present invention, each substituent is defined by the σp value. However, in the present invention, the substituents are not limited to those having σp values described in the above-mentioned documents. The present invention, of course, includes a substituent not having a σp value described in the above documents but that may be within the scope of the present invention when the σp value is calculated on the basis of the Hammett rule. Hereinafter, specific examples of substituents that can be used as the electron-withdrawing group having a positive Hammett σp value in the compound of the general formula (2) are described together with the Hammett σp values.

Examples of the electron-withdrawing group having a Hammett σp value of 0.60 or more include a cyano group, a nitro group, and an alkylsulfonyl group. Examples of the electron-withdrawing group having a Hammett σp value of 0.45 or more include these groups and an acyl group, an alkoxycarbonyl group, an aryloxycarbonyl group, an alkylsulfinyl group, an arylsulfinyl group, a sulfamoyl group, and a halogenated alkyl group. Examples of the electron-withdrawing group having a Hammett σp value of 0.30 or more include these groups and an acyloxy group, a carbamoyl group, a halogenated alkoxy group, a halogenated aryloxy group, a sulfonyloxy group, a halogenated alkylthio group, and a heterocyclic ring. Also, an aryl group substituted by two or more electron-withdrawing groups having a σp value of 0.15 or more is exemplified. Examples of the electron-withdrawing group having a Hammett σp value of 0.20 or more include the above-described groups and a halogen atom.

Herein, the α-position and β-position in a phthalocyanine compound are described with reference to the structural formula below. The α-position is the 1- and/or 4-position, 5- and/or 8-position, 9- and/or 12-position, or 13- and/or 16-position. A β-substituted phthalocyanine compound has a specific substituent in at least one of these positions. The β-position is the 2- and/or 3-position, 6- and/or 7-position, 10- and/or 11-position, or 14- and/or 15-position. A β-substituted phthalocyanine compound has a specific substituent in at least one of these positions. Namely, the compound of the general formula (2) is a phthalocyanine compound in which $X_1$, $X_2$, $X_3$, and $X_4$ are substituents at the α-positions, and $Y_1$ to $Y_8$ are substituents at the β-positions.

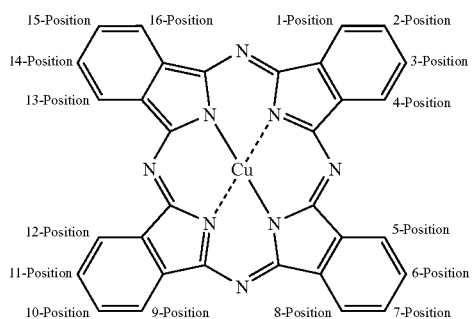

As described above, when a large number of electron-withdrawing groups such as sulfamoyl groups are introduced into the phthalocyanine skeleton, the oxidation potential is made more electropositive, and thus ozone resistance can be improved. However, the above-mentioned synthesis method inevitably causes mixing of a phthalocyanine compound having a small number of electron-withdrawing groups, i.e., a more electronegative oxidation potential. Therefore, in order to improve the ozone resistance, it is particularly preferred to use a synthesis method that suppresses the production of a phthalocyanine compound having a more electronegative oxidation potential.

The compound of the general formula (2) can be synthesized, for example, according to the two synthesis flows described below. Namely, a phthalonitrile derivative and/or a diiminoisoindoline derivative and a copper derivative are reacted to synthesize the compound (β-substituted) of the general formula (2). Also, the compound (β-substituted) of the general formula (2) can be synthesized from a tetrasulfophthalocyanine compound prepared by reaction between a 4-sulfophthalonitrile derivative and a copper derivative.

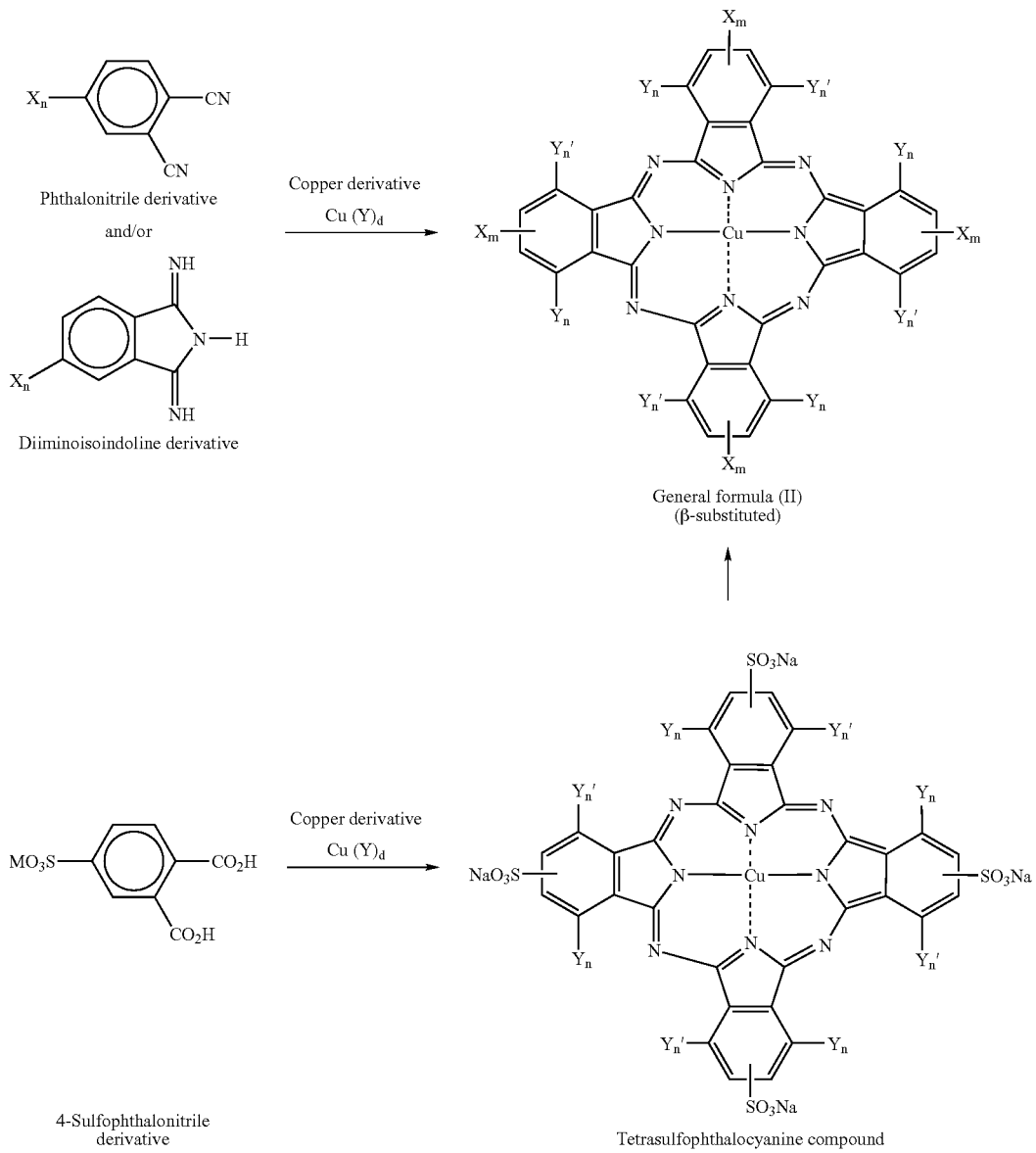

In the above synthesis flows, $X_m$ corresponds to $X_1$, $X_2$, $X_3$, or $X_4$ in the general formula (2), $Y_n$ corresponds to $Y_1$, $Y_3$, or $Y_5$, and $Y_{n'}$ corresponds to $Y_2$, $Y_4$, $Y_6$, or $Y_8$. In the 4-sulfophthalonitrile derivative, M represents a cation. Examples of the cation include alkali metal ions such as Li, Na, and K, and organic cations such as triethylammonium ion and pyridinium ion. In the copper derivative $(Cu(Y)_d)$, Y represents a monovalent or divalent ligand. Examples of the ligand include a halogen atom, an acetic acid anion, acetylacetonate, and oxygen, and d is an integer of 1 to 4.

According to the above-described synthesis flows, a desired number of desired substituents can be introduced into the copper phthalocyanine skeleton. In particular, as in the present invention, when a large number of electron-withdrawing groups is desired to be introduced into the copper phthalocyanine skeleton in order to achieve an electropositive oxidation potential, the synthesis flows are extremely effective.

Besides the methods described in the above patent documents, the compound of the general formula (2) can be synthesized by the methods described in Japanese Unexamined Patent Application Publication Nos. 2001-226275, 2001-96610, 2001-47013, and 2001-193638. In synthesis, the starting materials, intermediates, and synthesis flows are not limited to those described above.

Preferred examples of the compound of the general formula (2) includes Exemplified Compounds II-1 to II-102 described below. Of course, the compound is not limited to these exemplified compounds as long as they have the structure and definitions of the general formula (2). In the present invention, among the exemplified compounds, exemplified compounds having a hydroxyl group are preferably used, and Exemplified Compound II-66 is particularly preferably used. Exemplified Compounds II-13 to II-57 are shown in the table below in which the group of $X_m$ and the group of $(Y_n, Y_{n'})$ each denote substituents contained in the general formula shown below as an example of the general formula (2). The substituents in each group are not in order in the general formula below.

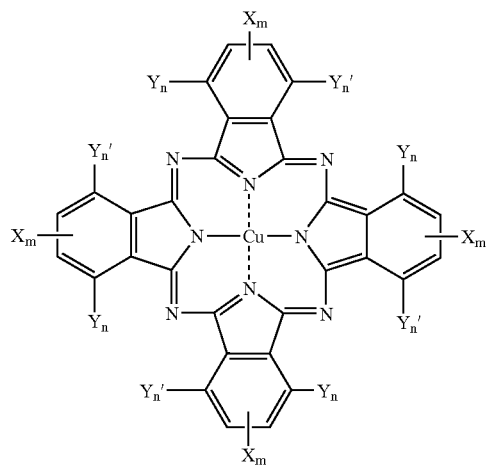

| Exemplified Compound | Group of Xm | | Group of Yn, Yn' | |
|---|---|---|---|---|
| II-13 | —SO₂—NH—CH₂—CH₂—SO₃Li | | —H | —H, —H |
| II-14 | —SO₂—NH—CH₂—CH(OH)—CO—NH—CH₂CH₂—SO₃Na | | —H | —Cl, —H |
| II-15 | —SO₂—NH—CH₂—CH₂—CH₂—SO₂NH—CH₂CH(OH)—SO₃Li | | —H | —H, —H |
| II-16 | —SO₂—NH—C₆H₄—SO₂NH—CH₂CH₂—SO₃Li | | —H | —H, —H |
| II-17 | —SO₂—NH—CH₂—CH₂—CO—NH—CH(CH₂—COONa)—COONa | | —H | —Cl, —H |
| II-18 | —SO₂—NH—CH₂—CH₂—SO₂—NH—CH₂—COONa | | —CN | —H, —H |
| II-19 | —SO₂—CH₂—CH₂—CH₂—SO₂—NH—CH(CH₂—OH)—COOLi | | —H | —H, —H |
| II-20 | —SO₂—CH₂—CH₂—CH₂—SO₃Li | | —H | —H, —H |
| II-21 | —SO₂—CH₂—CH₂—CH₂—SO₃K | | —H | —H, —H |
| II-22 | —SO₂—(CH₂)₃—CO₂K | | —H | —H, —H |

-continued

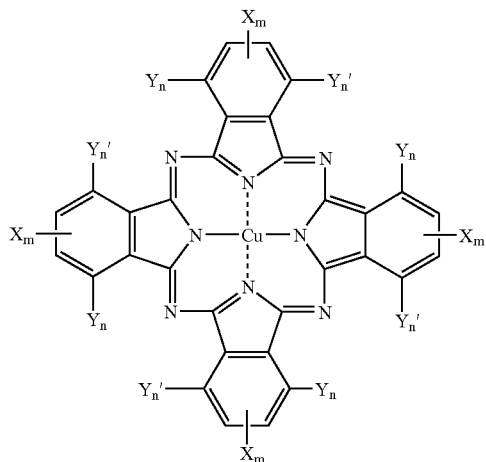

| Exemplified Compound | Group of Xm | | Group of Yn, Yn' | |
|---|---|---|---|---|
| II-23 | —SO$_2$—NH—CH$_2$—CH$_2$—CH$_2$—SO$_2$—NH—CH$_2$CH(OH)—CH$_2$—SO$_3$Li | | —H | —H, —H |
| II-24 | —SO$_2$—NH—CH$_2$—CH$_2$—CH$_2$—SO$_2$NH—CH$_2$CH(OH)—CH$_3$ | | —SO$_3$Li | —H, —H |
| II-25 | —SO$_2$—CH$_2$—CH(OH)—CH$_2$SO$_3$K | | —H | —H, —H |
| II-26 | —SO$_2$—CH$_2$—CH(OH)—CH$_3$ | | —SO$_3$Li | —H, —H |
| II-27 | —SO$_2$NH(CH$_2$)$_3$—N$^{\oplus}$(CH$_3$)(CH$_2$CH$_2$OH)$_2$   CH$_3$—C$_6$H$_4$—SO$_3^{\ominus}$ | | —H | —H, —H |
| II-28 | —CO—NH—CH$_2$—CH(OH)—CH$_2$SO$_3$K | | —H | —H, —H |
| II-29 | —CO—NH—CH(COOLi)—CH$_2$CH$_2$SO$_3$Li | | —H | —H, —H |
| II-30 | —SO$_2$CH$_2$CH$_2$CH(CH$_3$)(SO$_3$Li) | | —H | —H, —H |
| II-31 | —SO$_2$—CH$_2$—CH(OH)—CH$_2$—SO$_3$Na | | —H | —H, —H |
| II-32 | —SO$_2$—CH$_2$—CH$_2$—CH(CH$_3$)—COOLi | | —H | —H, —H |
| II-33 | —SO$_2$(CH$_2$)$_3$SO$_2$NHCH$_2$—CH(OH)—CH$_2$—SO$_3$Li | | —H | —H, —H |
| II-34 | —CO$_2$CH$_2$CH$_2$CH$_2$SO$_2$—NH—CH$_2$—CH(OH)—CH$_2$—SO$_3$Li | | —H | —H, —H |

-continued

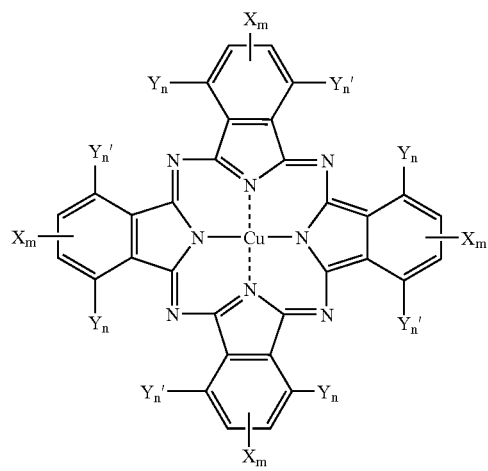

| Exemplified Compound | Group of Xm | | Group of Yn, Yn' |
|---|---|---|---|
| II-35 | —SO$_2$NH—C$_8$H$_{17}$(t) | —H | —H, —H |
| II-36 | —SO$_2$—NH—CH$_2$—CH(CH$_2$CH$_3$)—CH$_2$CHCH$_2$—CH$_3$ | —H | —H, —H |
| II-37 | —SO$_2$CH$_2$CH$_2$CH$_2$SO$_2$—NH—CH$_2$—CH(CH$_3$)—CH$_2$—CH$_3$ | —H | —H, —H |
| II-38 | —SO$_2$—CH$_2$—CH$_2$—CH$_2$—CO$_2$—CH(CH$_3$)—CH$_2$—O—CH$_3$ | —H | —H, —H |
| II-39 | —SO$_2$CH$_2$CH$_2$CH$_2$SO$_2$NHCH$_2$CH$_2$CH$_2$O—CH(CH$_3$)$_2$ | —H | —H, —H |
| II-40 | —SO$_2$—CH$_2$—CH(O—CH$_3$)—CH$_2$—O—CH$_2$ | —CN | —H, —H |
| II-41 | —CO—NH—CH$_2$—CH(CH$_2$CH$_3$)—CH$_2$—CH$_2$—CH$_2$CH$_3$ | —H | —Cl, —H |
| II-42 | —CO$_2$—CH(CH$_3$)—CH$_2$—O—C$_4$H$_9$(t) | —H | —H, —H |
| II-43 | —SO$_2$—CH$_2$—CH$_2$—CH(CH$_3$)—SO$_2$—NH—[2,5-(SO$_3$Li)$_2$C$_6$H$_3$] | —H | —H, —H |
| II-44 | —SO$_2$NH—[3,5-(CO$_2$C$_6$H$_{13}$(n))$_2$C$_6$H$_3$] | —H | —H, —H |

-continued
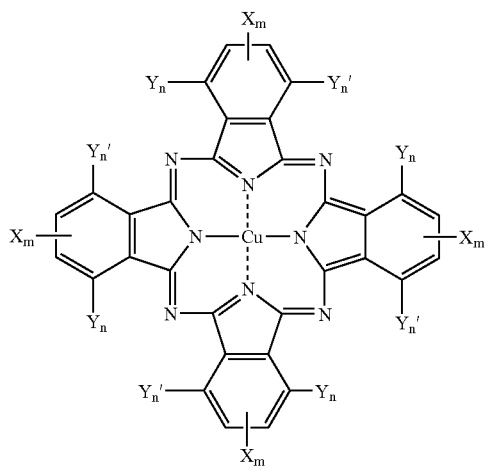
| Exemplified Compound | Group of Xm | | Group of Yn, Yn' |
|---|---|---|---|
| II-45 | —SO₂NH—⟨benzene ring with —OCH₂CH₂OCH₃ and —SO₂NHCH₂CH(C₂H₅)(C₄H₉)⟩ | —H | —H, —H |
| II-46 | —SO₂NH—⟨phenyl⟩—SO₂—NH—CH₂—CH(CH₂CH₃)—CH₂CH₂—CH₂—CH₃ | —H | —H, —H |
| II-47 | —SO₂—⟨phenyl with —CO₂Na⟩ | —H | —H, —H |
| II-48 | —SO₂—N(C₄H₉(n))(phenyl) | —H | —H, —H |
| II-49 | —SO₂—⟨benzothiazol-2-yl with —SO₃Li⟩ | —H | —H, —H |
| II-50 | —SO₂NH—⟨3-methylpyrazol-5-yl with N-phenyl bearing two SO₃Li groups⟩ | —H | —H, —H |

-continued

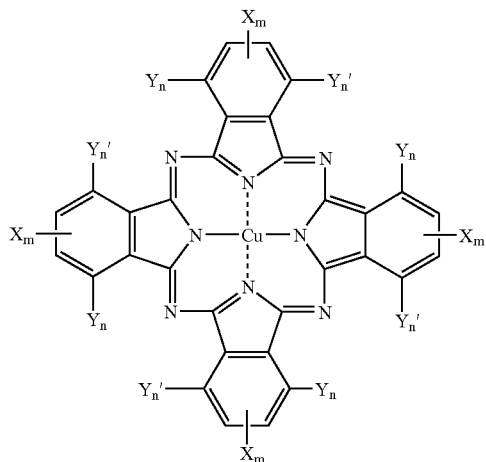

| Exemplified Compound | Group of Xm | | Group of Yn, Yn' |
|---|---|---|---|
| II-51 | —SO$_2$(CH$_2$)$_3$—NH—C(=O)—[phenyl with CO$_2$Li, CO$_2$Li] | —Cl | —H, —H |
| II-52 | —CO$_2$—CH$_2$CH$_2$CH$_2$—NH—[triazine with NH—CH$_2$—CH$_2$—CH(CH$_3$)—SO$_3$Li groups] | —H | —H, —H |
| II-53 | —SO$_2$NH—CH(COONa)—CH$_2$—CO—N(CH$_2$CH$_2$OH)$_2$ | —H | —H, —H |
| II-54 | —SO$_2$NH—[phenyl]—NHC(=O)—[phenyl-SO$_3$Li] | —H | —H, —H |
| II-55 | —CO—NH—CH$_2$—CH(OH)—CO—NH—CH(COOK)—CH$_2$CH$_2$—SO$_3$K | —H | —H, —H |
| II-56 | —SO$_2$—CH$_2$CH$_2$CH$_2$—NH—CO—[phenyl]—CO—NH—CH(COOLi)—CH$_2$—COOLi | —H | —H, —H |
| II-57 | —SO$_2$CH$_2$CH$_2$OCH$_2$CH$_2$OCH$_2$CH$_2$SO$_3$Li | —H | —H, —H |

Exemplified Compounds II-58 to II-102 of the general formula (2) are shown in the table below in which $X_{pr}$'s are each independently $P_1$ or $P_2$, the numbers of substituents $P_1$ and $P_2$ in the copper phthalocyanine skeleton are m and n, respectively, and $Y_q$ is a hydrogen atom. Each of the substituents $P_1$ and $P_2$ is at the β-position in the copper phthalocyanine skeleton, and the substituents at the β-position are not in order.

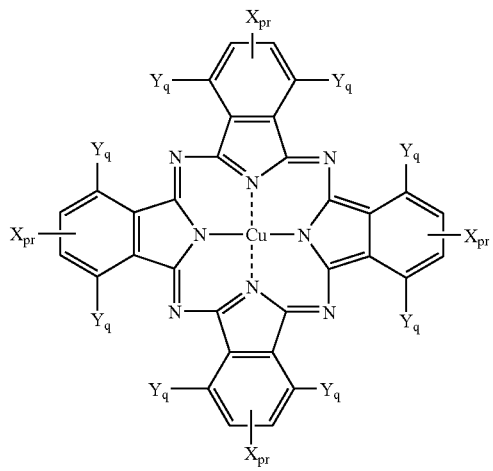

| Exemplified Compound | P₁ | m |
|---|---|---|
| II-58 | —SO₂—NH—CH₂—CH(CH₃)—SO₃Li | 3 |
| II-59 | —SO₂—NH—CH₂—CH₂SO₃Li | 3 |
| II-60 | —SO₂—NH—CH₂—CH(CH₃)—SO₃Li | 3 |
| II-61 | —SO₂—NH—CH₂—CH(CH₃)—SO₃Li | 2 |
| II-62 | —SO₂NH—CH₂—CH₂—SO₂—NH—CH₂CH₂—COONa | 3 |
| II-63 | —SO₂—NH—C₆H₄—SO₂NH—CH₂—CH(OH)—SO₃Li | 3 |
| II-64 | —SO₂—CH₂—CH₂—CH(CH₃)—SO₃Li | 2.5 |
| II-65 | —SO₂—CH₂—CH₂—CH(CH₃)—SO₃Na | 2 |
| II-66 | —SO₂—CH₂—CH₂—CH₂—SO₃Li | 3 |
| II-67 | —SO₂—CH₂—CH₂—CH₂—COOK | 2 |
| II-68 | —SO₂—CH₂—CH₂—CH₂—SO₃Li | 3 |
| II-69 | —SO₂—CH₂—CH₂—O—CH₂—CH₂—SO₃Li | 2 |
| II-70 | —SO₂—CH₂—CH(OH)—CH₂—SO₃Li | 3 |
| II-71 | —SO₂NHCH₂CH₂—SO₃Li | 3 |
| II-72 | —SO₂—CH₂—CH₂—O—CH₂—CH₂—O—CH₂—CH₂—SO₃Na | 3 |
| II-73 | —SO₂CH₂CH₂CH₂SO₃Li | 3 |
| II-74 | —SO₂CH₂CH₂CH₂SO₃Li | 2 |
| II-75 | —SO₂CH₂CH₂CH₂SO₃K | 3 |
| II-76 | —SO₂CH₂CH₂CH₂SO₃Li | 2 |
| II-77 | —CO—NH—CH₂—CH₂—SO₃K | 3 |
| II-78 | —CO—NH—CH₂—CH₂—SO₂—NH—CH₂—CH₂—COONa | 3 |
| II-79 | —SO₂(CH₂)₃SO₂NHCH₃—CH(OH)—CH₂CO₂Li | 2.5 |

-continued

| | | |
|---|---|---|
| II-80 | —CO$_2$—CH$_2$—CH$_2$—CH(CH$_3$)—SO$_3$Na | 2 |
| II-81 | —CO$_2$—CH$_2$—CH$_2$—CH$_2$—SO$_3$Li | 3 |
| II-82 | —CO$_2$—CH$_2$—CH$_2$—CH$_2$COOK | 2 |
| II-83 | —CO$_2$—CH$_2$—CH$_2$—O—CH$_2$—CH$_2$—O—CH$_2$—CH$_2$—SO$_3$Na | 3 |
| II-84 | —SO$_2$CH$_2$CH$_2$OCH$_2$CH$_2$O—CH$_2$CH$_2$SO$_3$K | 2 |
| II-85 | —SO$_2$(CH$_2$)$_3$SO$_2$NHCH$_2$CH(OH)CH$_2$OH | 2 |
| II-86 | —SO$_2$(CH$_2$)$_3$SO$_2$NHCH$_2$—CH(OH)—CH$_2$SO$_3$K | 3 |
| II-87 | —SO$_2$(CH$_2$)$_3$SO$_2$NH(CH$_2$)$_2$N(CH$_2$CH$_2$OH)$_2$ | 2 |
| II-88 | —SO$_2$—CH$_2$—CH$_2$—CH$_2$—SO$_2$—NH—CH$_2$—CH(OH)—CH$_3$ | 3 |
| II-89 | —SO$_2$—CH$_2$—CH$_2$—O—CH$_2$—CH$_2$—O—CH$_3$ | 2 |
| II-90 | —SO$_2$—CH$_2$—CH$_2$—O—CH$_2$—CH$_2$—O—CH$_2$—CH$_2$—OH | 2 |
| II-91 | —SO$_2$—CH$_2$—CH(CH$_2$CH$_3$)—CH$_2$CH$_2$—CH$_2$CH$_3$ | 2 |
| II-92 | —SO$_2$—CH$_2$—CH$_2$—CH$_2$—SO$_2$—NH—CH$_2$—CH(O—CH$_3$)—CH$_3$ | 3 |
| II-93 | —SO$_2$—CH$_2$—CH$_2$—CH$_2$—CO$_2$—NH—CH$_2$—CH(CH$_3$)—CH$_2$—CH$_3$ | 3 |
| II-94 | —SO$_2$—CH$_2$—CH$_2$—CH$_2$—SO$_2$NH—CH$_2$—CH(OH)—CH$_3$ | 2.5 |
| II-95 | —SO$_2$—CH$_2$—CH$_2$—CH$_2$—CO$_2$—NH—CH(CH$_3$)—CH$_2$—CH$_3$ | 2 |
| II-96 | —SO$_2$—CH$_2$—CH$_2$—CH$_2$—SO$_2$—NH—CH$_2$—CH(OH)—CH$_3$ | 3 |
| II-97 | —SO$_2$—CH$_2$—CH$_2$—CH$_2$—SO$_2$—NH—CH$_2$—CH(OH)—CH$_3$ | 3 |
| II-98 | —SO$_2$—CH$_2$—CH$_2$—CH$_2$—CO$_2$—NH—CH(CH$_3$)—CH$_2$—CH$_3$ | 3 |
| II-99 | —SO$_2$—CH$_2$—CH$_2$—CH$_2$—SO$_2$—NH—CH(CH$_3$)$_2$ | 3 |
| II-100 | —CO$_2$—CH$_2$—CH$_2$—CH$_2$—CO$_2$—NH—CH(CH$_3$)—CH$_2$—CH$_3$ | 3 |
| II-101 | —CO—NH—CH$_2$—CH$_2$—SO$_2$—NH—CH(CH$_3$)$_2$ | 3 |
| II-102 | —CO—NH—CH$_2$—CH(CH$_2$CH$_3$)—CH$_2$—CH$_2$—CH$_2$CH$_3$ | 3 |

-continued

| Exemplified Compound | P₂ | n |
|---|---|---|
| II-58 | —SO₂—NH—CH₂—CH(OH)—CH₃ | 1 |
| II-59 | —SO₂—NH—CH₂—CH₂—CH₂—SO₂—NH—CH₂—CH(OH)—CH₃ | 1 |
| II-60 | —SO₂NH—CH₂—CH₂—CH₂—SO₂—NH—CH₂—CH₂—O—CH₂—CH₂—OH | 1 |
| II-61 | —SO₂—NH—CH₂—CH₂—CH₂—CO—N(CH₂—CH₂—OH)₂ | 2 |
| II-62 | —SO₂NH—CH(CH₃)—CH₂OH | 1 |
| II-63 | —SO₂NH—CH₂—CH₂—O—CH₂—CH₂—OH | 1 |
| II-64 | —SO₂—CH₂—CH₂—O—CH₂—CH₂—OH | 1.5 |
| II-65 | —SO₂—CH₂—CH₂—CH₂—CO—N(CH₂—CH₂—OH)₂ | 2 |
| II-66 | —SO₂—CH₂—CH₂—CH₂—SO₂—NH—CH₂—CH(OH)—CH₃ | 1 |
| II-67 | —SO₂—CH₂—CH₂—CH₂—SO₂—NH—CH₂—CH(OH)—CH₂—COOK | 2 |
| II-68 | —SO₂—CH₂—CH(OH)—CH₂—SO₃Li | 1 |
| II-69 | —SO₂—CH₂—CH₂—CH₂—CO₂—CH₂—CH₂—CH(OH)—CH₂—COOK | 2 |
| II-70 | —SO₂—CH₂—C₆H₄—SO₂NH—CH₂—CH(OH)—CH₂—OH | 1 |
| II-71 | —SO₂—CH₂—CH₂—CH₂—SO₂—NH—CH₂—CH(OH)—CH₃ | 1 |
| II-72 | —SO₂—CH₂—CH₂—CH₂—CO—N(CH₂—CH₂—COONa)(CH₂—COONa) | 1 |
| II-73 | —SO₂CH₂CH₂CH₂SO₂NHCH₂—CH(OH)—CH₂SO₃Li | 1 |
| II-74 | —SO₂CH₂CH₂OCH₂CH₂OCH₂CH₂OH | 2 |
| II-75 | —SO₂CH₂CH₂CH₂SO₂NH—CH(CH₃)—CH₂—OH | 1 |
| II-76 | —SO₂CH₂CH₂CH₂SO₂N(CH₂CH₂OH)₂ | 2 |
| II-77 | —CO—NH—CH₂—CH₂—O—CH₂—CH₂—OH | 1 |
| II-78 | —CO—NH—CH₂—CH(OH)—CH₃ | 1 |
| II-79 | —CO—NH—CH₂—CH₂—CH₂—CO—N(CH₂—CH₂—OH)₂ | 1.5 |
| II-80 | —CO—CH₂—CH₂—CH₂—CO—N(CH₂—CH₂—OH)₂ | 2 |

| | | |
|---|---|---|
| II-81 | —CO$_2$—CH$_2$—CH$_2$—CH$_2$—SO$_2$—NH—CH$_2$—CH(OH)—CH$_3$ | 1 |
| II-82 | —CO$_2$—CH$_2$—CH$_2$—CH$_2$—SO$_2$—NH—CH$_2$—CH(OH)—CH$_2$—COOK | 2 |
| II-83 | —CO$_2$—CH$_2$—C$_6$H$_4$—SO$_2$NH—CH$_2$—CH(OH)—CH$_2$—OH | 1 |
| II-84 | —CO$_2$—CH$_2$—CH$_2$—CH$_2$—CO$_2$—CH$_2$—CH(OH)—CH$_2$—COOK | 2 |
| II-85 | —CO$_2$—CH$_2$—CH(OH)—CH$_2$—SO$_3$Li | 2 |
| II-86 | —CO$_2$—CH$_2$—CH$_2$—CH$_2$—SO$_2$—NH—CH$_2$—CH(OH)—CH$_3$ | 1 |
| II-87 | —CO$_2$—CH$_2$—CH$_2$—CH$_2$—CO—N(CH$_2$CH$_2$COOLi)(CH$_2$COOLi) | 2 |
| II-88 | —SO$_2$—CH$_2$—CH$_2$—CH$_2$—SO$_2$—NH—CH$_2$—CH(CH$_2$CH$_3$)—CH$_2$CH$_2$—CH$_2$CH$_3$ | 1 |
| II-89 | —SO$_2$—CH$_2$—CH$_2$—CH$_2$—SO$_2$—NH—CH$_2$—CH(OH)—CH$_3$ | 1 |
| II-90 | —SO$_2$—CH$_2$—CH$_2$—CH$_2$—CO$_2$—CH$_2$—CH(CH$_2$CH$_3$)—CH$_2$CH$_2$—CH$_2$CH$_3$ | 1 |
| II-91 | —SO$_2$—CH$_2$—CH$_2$—CH$_2$—SO$_2$—NH—CH$_2$—CH(O—CH$_3$)—CH$_3$ | 2 |
| II-92 | —SO$_2$NH—CH$_2$—CH$_2$—SO$_2$NH—CH$_2$—CH$_2$—O—CH$_2$—CH$_2$—OH | 1 |
| II-93 | —SO$_2$—CH$_2$—CH$_2$—CH$_2$—SO$_2$—NH—CH—(CH$_3$)$_2$ | 1 |
| II-94 | —SO$_2$—CH$_2$—CH$_2$—CH$_2$—CO$_2$—NH—CH(CH$_3$)—CH$_2$—CH$_3$ | 1.5 |
| II-95 | —SO$_2$—CH$_2$—CH$_2$—CH$_2$—SO$_2$—NH—(CH$_2$)$_3$—CH$_2$—O—CH$_2$CH$_2$—OH | 2 |
| II-96 | —SO$_2$—CH$_2$—CH$_2$—O—CH$_2$—CH$_2$—O—CH$_3$ | 1 |
| II-97 | —SO$_2$—CH$_2$—CH$_2$—O—CH$_2$—CH$_2$—O—CH$_2$—CH$_2$—O—CH$_3$ | 1 |
| II-98 | —SO$_2$—CH$_2$—CH$_2$—O—CH$_2$—CH$_2$—O—CH$_2$—CH$_2$—OH | 1 |

| | | |
|---|---|---|
| II-99 | —CO$_2$—CH$_2$—CH(CH$_2$CH$_3$)—CH$_2$—CH$_2$—CH$_2$CH$_3$ | 1 |
| II-100 | —CO$_2$—CH$_2$—CH$_2$—O—CH$_2$—CH$_2$—O—CH$_3$ | 1 |
| II-101 | —SO$_2$—NH—CH$_2$—CH(CH$_2$CH$_3$)—CH$_2$—CH$_2$—CH$_2$—CH$_3$ | 1 |
| II-102 | —CO—NH—CH$_2$—CH$_2$—O—CH$_2$—CH$_2$—O—CH$_3$ | 1 |

General Formula (3)

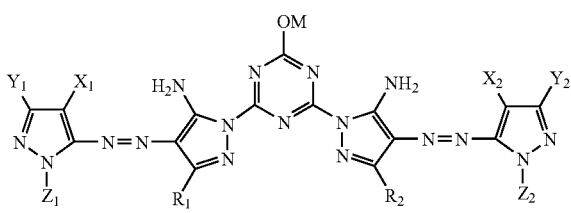

wherein $R_1$, $R_2$, $Y_1$, and $Y_2$ are each independently a monovalent group, $X_1$ and $X_2$ are each independently an electron-withdrawing group having a Hammett σp value of 0.20 or more, $Z_1$ and $Z_2$ are each independently a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, and M is a hydrogen atom, an alkali metal, ammonium, or organic ammonium.

Preferred examples of a compound of the general formula (3) include Exemplified Compounds 3-1 to 3-14 below. The exemplified compounds are described in the form of a free acid. Of course, in the present invention, the compound of the general formula (3) is not limited to the exemplified compounds as long as they have the structure and definitions of the general formula (3). Among the exemplified compounds below, Exemplified Compounds 3-5, 3-6, 3-7, 3-8, and 3-10 are preferably used.

Exemplified Compound 3-1

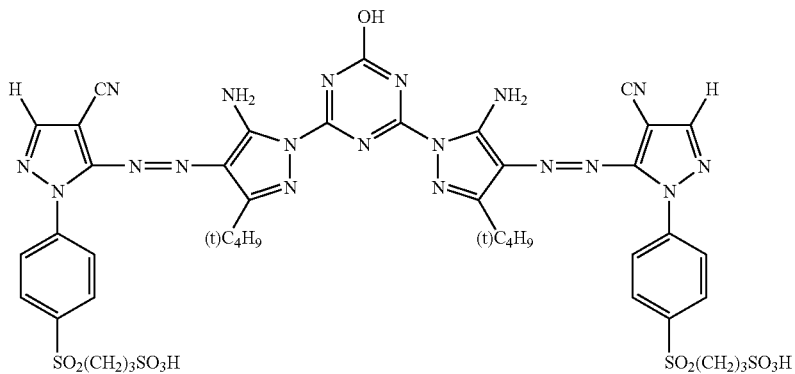

Exemplified Compound 3-2

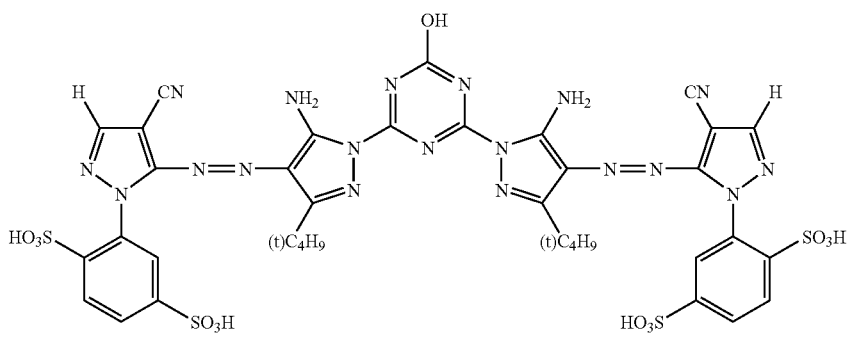

Exemplified Compound 3-3
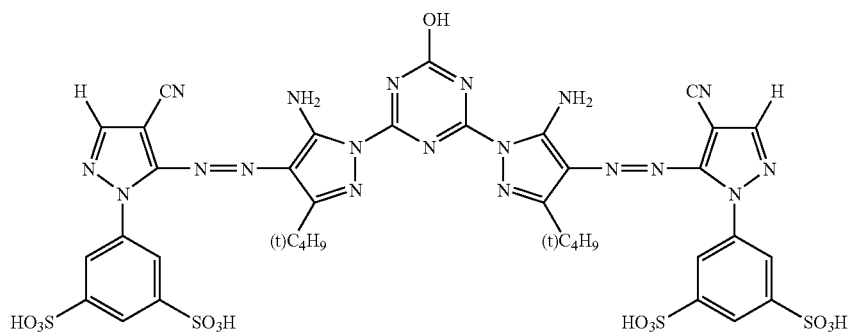
Exemplified Compound 3-4
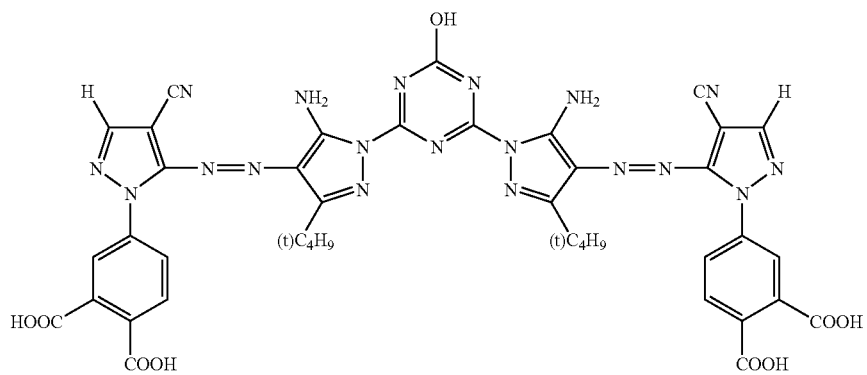
Exemplified Compound 3-5
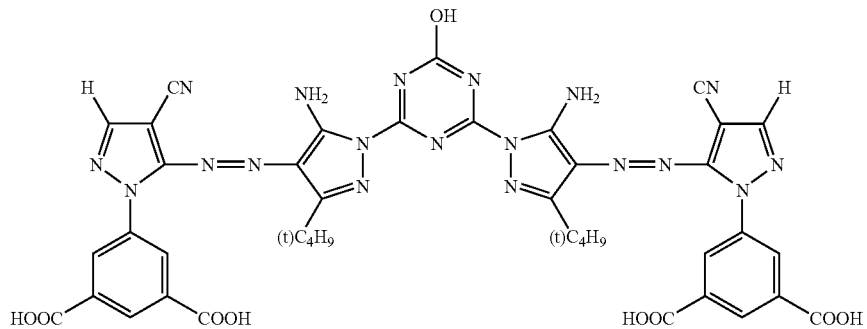
Exemplified Compound 3-6
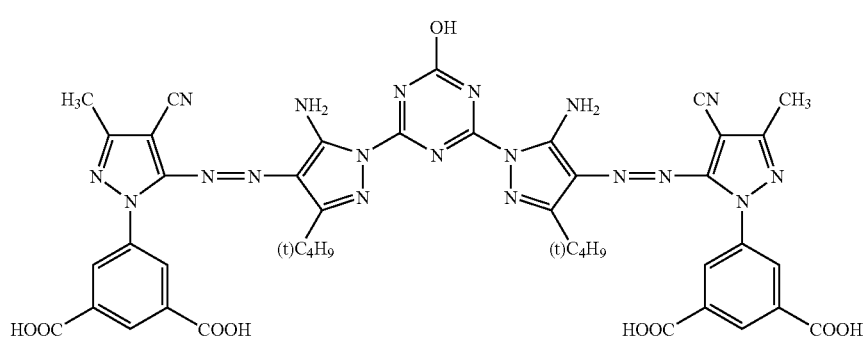

-continued
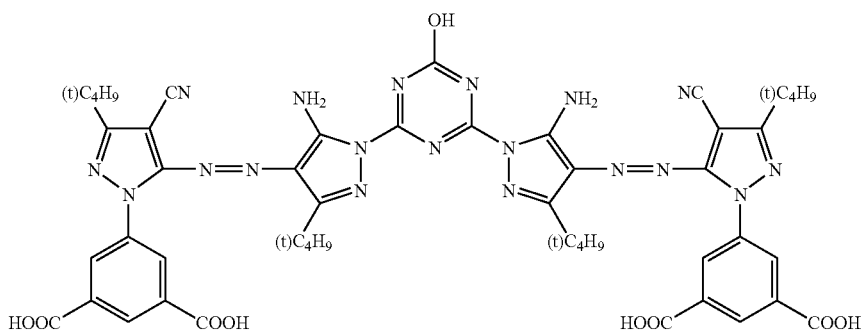
Exemplified Compound 3-7
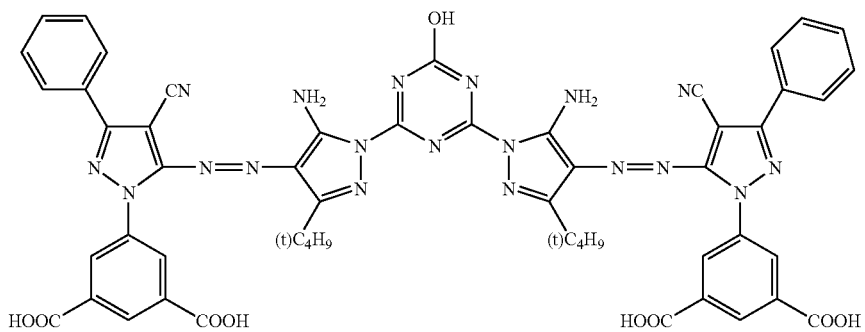
Exemplified Compound 3-8
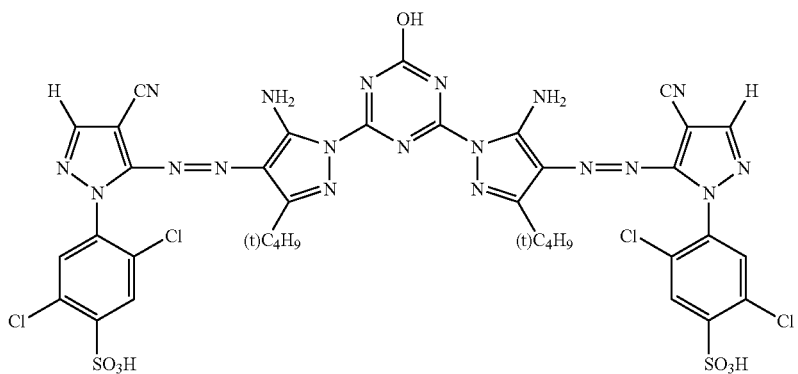
Exemplified Compound 3-9
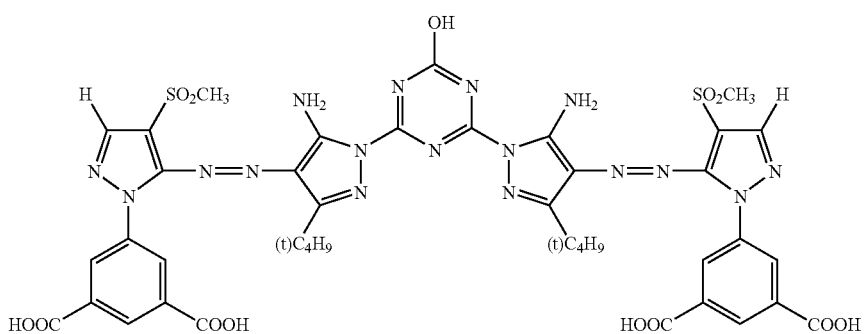
Exemplified Compound 3-10

-continued
Exemplified Compound 3-11
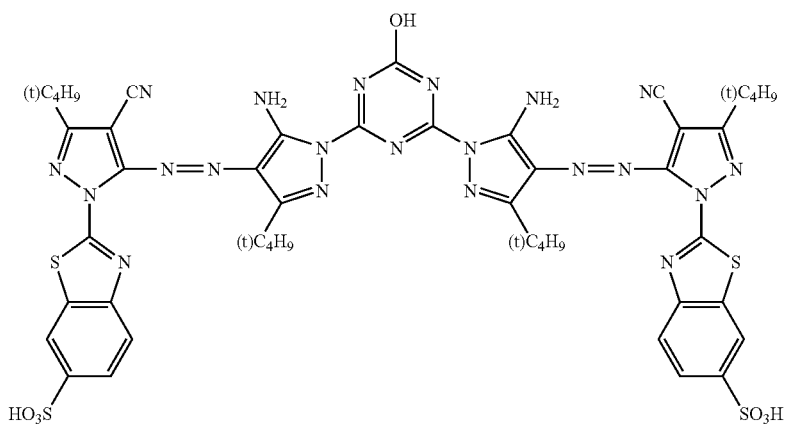
Exemplified Compound 3-12
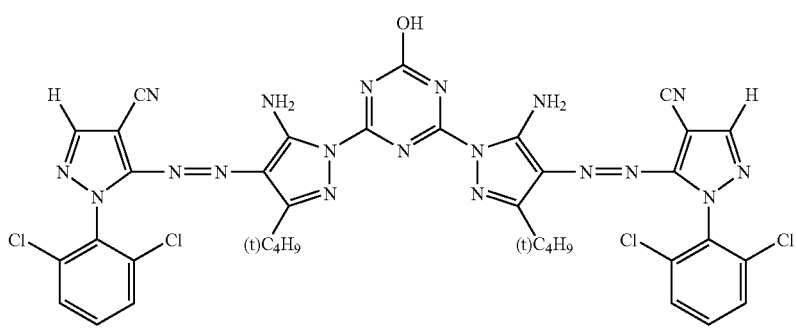
Exemplified Compound 3-13
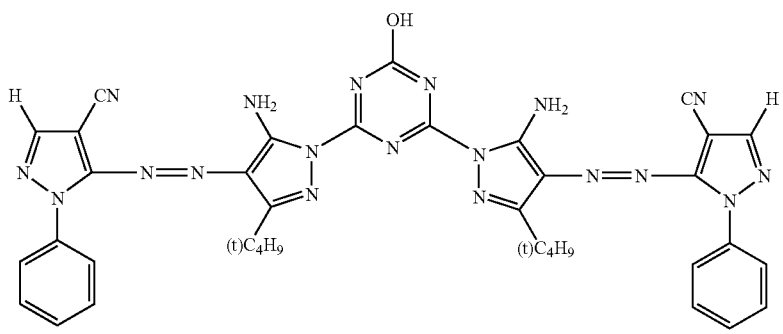
Exemplified Compound 3-14
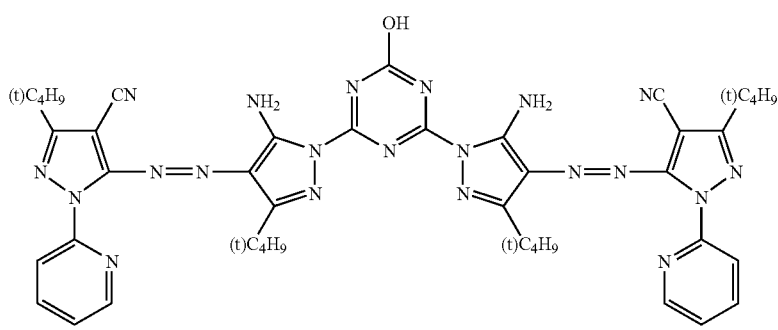

General formula (4)

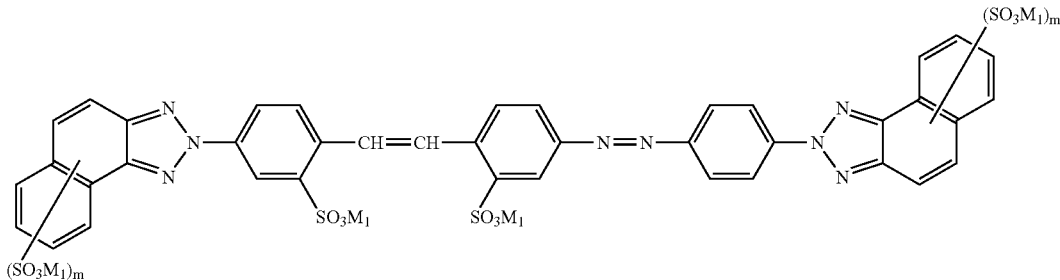

wherein each m independently represents 1 or 2, and each $M_1$ independently represents a hydrogen atom, an alkali metal, an alkaline-earth metal, or a cation or ammonium ion of an organic amine.

Preferred examples of the structure of the coloring material represented by the general formula (4) include, but are not particularly limited to, such structures as shown in Table 1 below. For convenience, cyclic structures at both ends of the general formula (4) are referred to as an A ring and a B ring, and substitution positions 1, 2, 3, 4, 5, and 6 in each of the A ring and the B ring are identified in the following general formula (5). Numbers shown in Table 1 below each represent the substitution position of a sulfonic acid group in each of Exemplified Compounds Y1 to Y4.

General Formula (5)

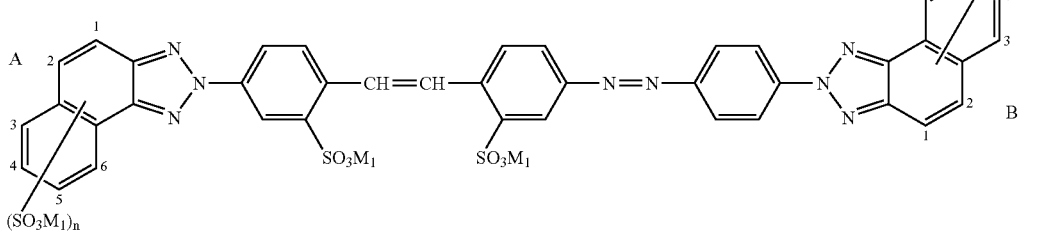

wherein each m independently represents 1 or 2, and each $M_1$ independently represents a hydrogen atom, an alkali metal, an alkaline-earth metal, or a cation or ammonium ion of an organic amine.

TABLE 1

Exemplified Compounds Y1 to Y4

| No. | Position of substituent of A ring | Position of substituent of B ring |
|---|---|---|
| Y1 | 2 | 4 |
| Y2 | 4 | 4 |
| Y3 | 2 | 4, 6 |
| Y4 | 4, 6 | 4 |

Specific preferred examples of the coloring material represented by the general formula (5) include, but are not particularly limited to, Exemplified Compound Y1 shown by the following formula:

Exemplified Compound Y1

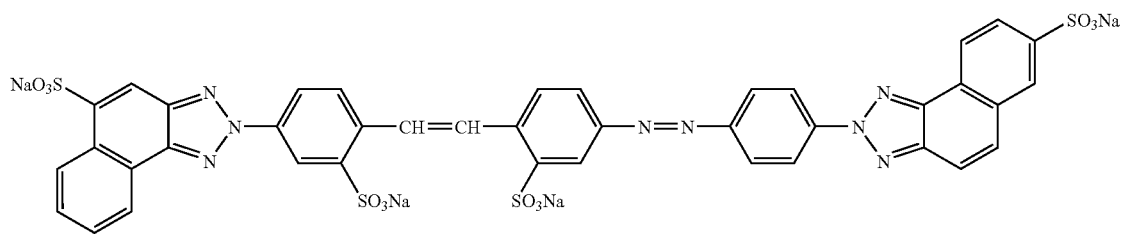

Other examples of a yellow coloring material include compounds having the structures described in International Publication Nos. WO 99/43754 and WO 02/081580.

General Formula (6)

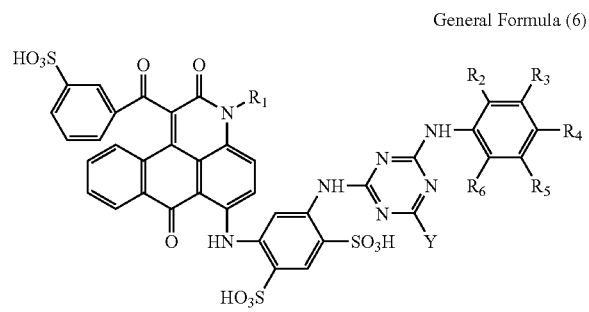

wherein $R_1$ represents any one of a hydrogen atom, an alkyl group, a hydroxy lower alkyl group, a cyclohexyl group, a mono- or di-alkylaminoalkyl group, and a cyano lower alkyl group, Y represents any one of a chlorine atom, a hydroxyl group, an amino group, and a mono- or di-alkylamino group (in which the alkyl group may have a substituent selected from the group consisting of a sulfonic acid group, a carboxyl group, and a hydroxyl group), and $R_2$, $R_3$, $R_4$, $R_5$, and $R_6$ each independently represent any one of a hydrogen atom, an alkyl group having 1 to 8 carbon atoms, and a carboxyl group provided that $R_2$, $R_3$, $R_4$, $R_5$, and $R_6$ do not all simultaneously represent hydrogen atoms.

Preferable examples of the coloring material represented by the general formula (6) include Exemplified Compounds M1 to M7 having the following structures in a free acid form. In the present invention, Exemplified Compound M7 among these compounds is particularly preferably used.

Exemplified Compound M1

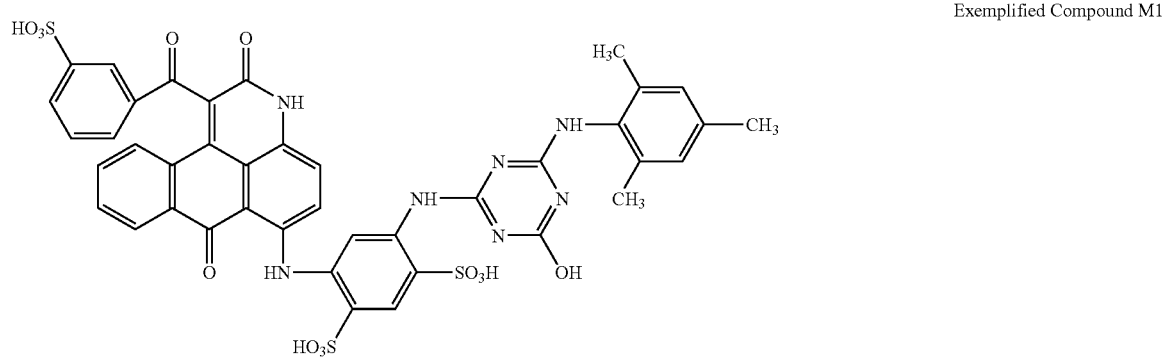

Exemplified Compound M2

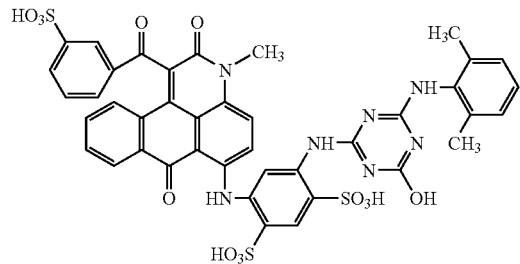

Exemplified Compound M3

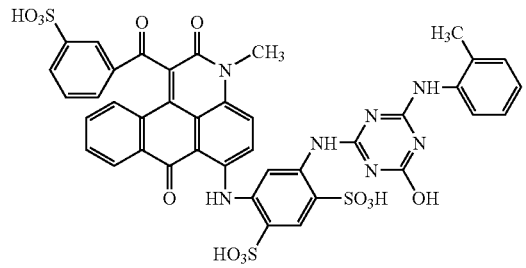

Exemplified Compound M4

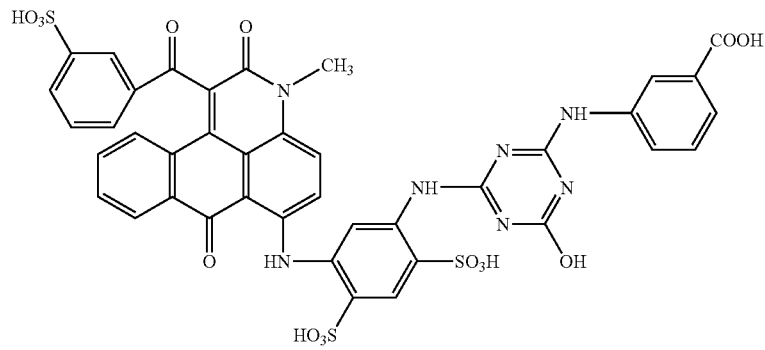

Exemplified Compound M5

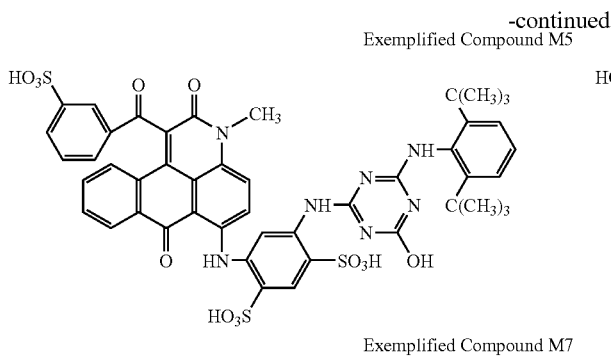

Exemplified Compound M6

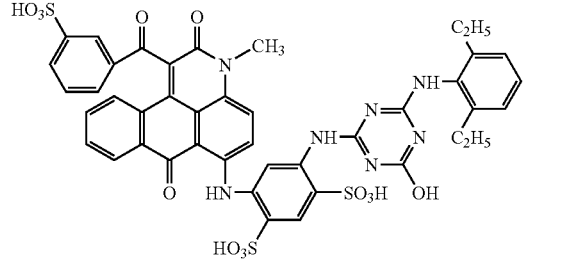

Exemplified Compound M7

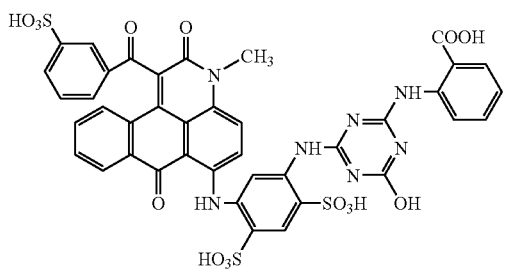

General Formula (7)

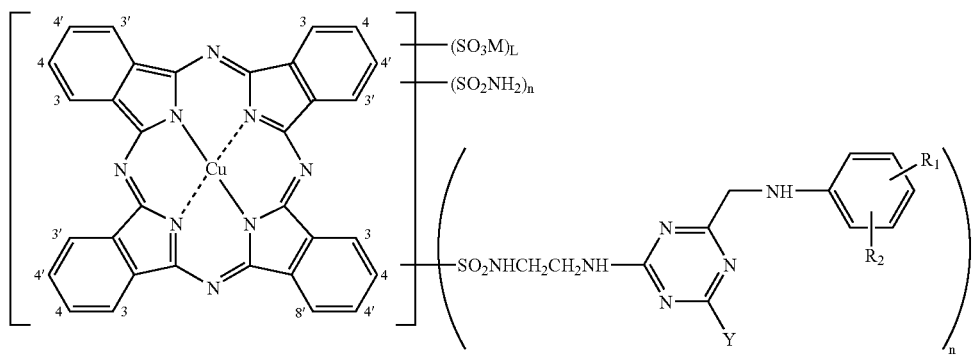

wherein l=0 to 2, m=1 to 3, and n=1 to 3 provided that l+m+n=3 or 4, the substitution position of a substituent is the 4- or 4'-position, M represents an alkali metal or ammonium, $R_1$ and $R_2$ each independently represent any one of a hydrogen atom, a sulfonic acid group, and a carboxyl group provided that $R_1$ and $R_2$ do not simultaneously represent hydrogen atoms, and Y represents any one of a chlorine atom, a hydroxyl group, an amino group, and a mono-di-alkylamino group.

Among the coloring materials each represented by the general formula (7), a phthalocyanine compound is preferably used, the phthalocyanine compound being obtained using, as a raw material, a 4-sulfophthalic acid derivative or a phthalocyanine compound, which is obtained by causing a 4-sulfophthalic acid derivative and a phthalic acid derivative (or a phthalic anhydride derivative) to react with each other in the presence of a metal compound; converting a sulfonic group to a chlorosulfone group; and then causing the raw material to react with an aminating agent in the presence of an organic amine. That is, it has been found that ink using a phthalocyanine compound obtained by introducing an unsubstituted sulfamoyl group ($-SO_2NH_2$) and a substituted sulfamoyl group [the following general formula (8)] into only the 4- and 4'-positions in the formula (7) is extremely excellent in environmental gas resistance:

General Formula (8)

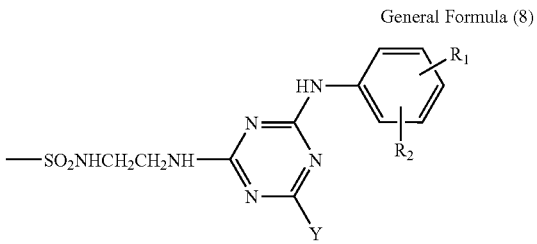

wherein $R_1$ and $R_2$ each independently represent any one of a hydrogen atom, a sulfonic acid group, and a carboxyl group provided that $R_1$ and $R_2$ do not simultaneously represent hydrogen atoms, and Y represents any one of a chlorine atom, a hydroxyl group, an amino group, and a mono- or di-alkylamino group.

Preferable specific examples of the group represented by the general formula (8) include groups having the following structures in a free acid form. Among these, Exemplified Compound C1 is particularly preferably used:

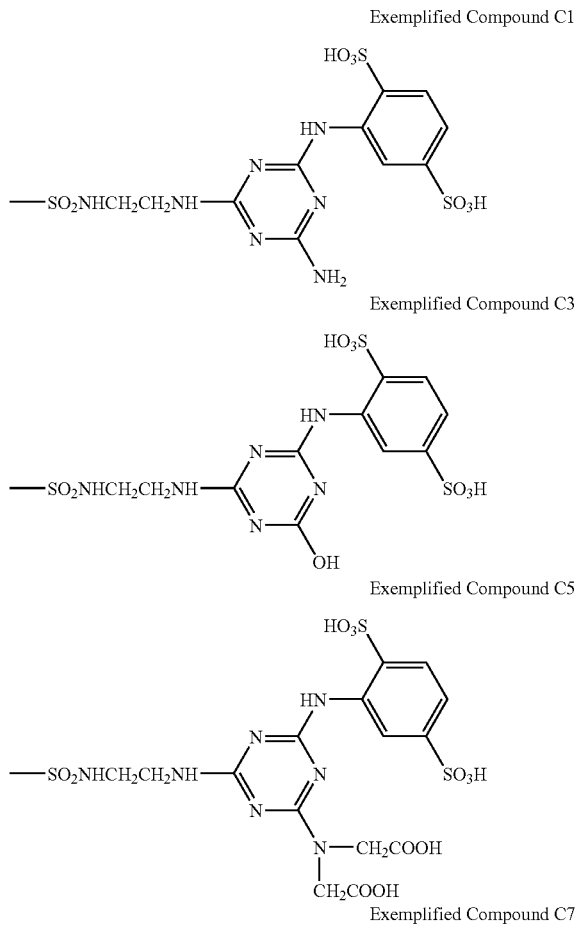
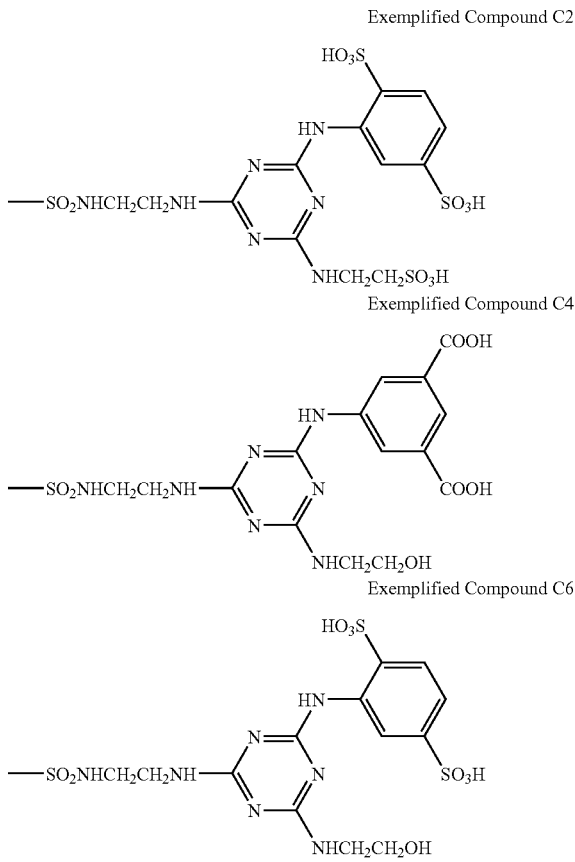

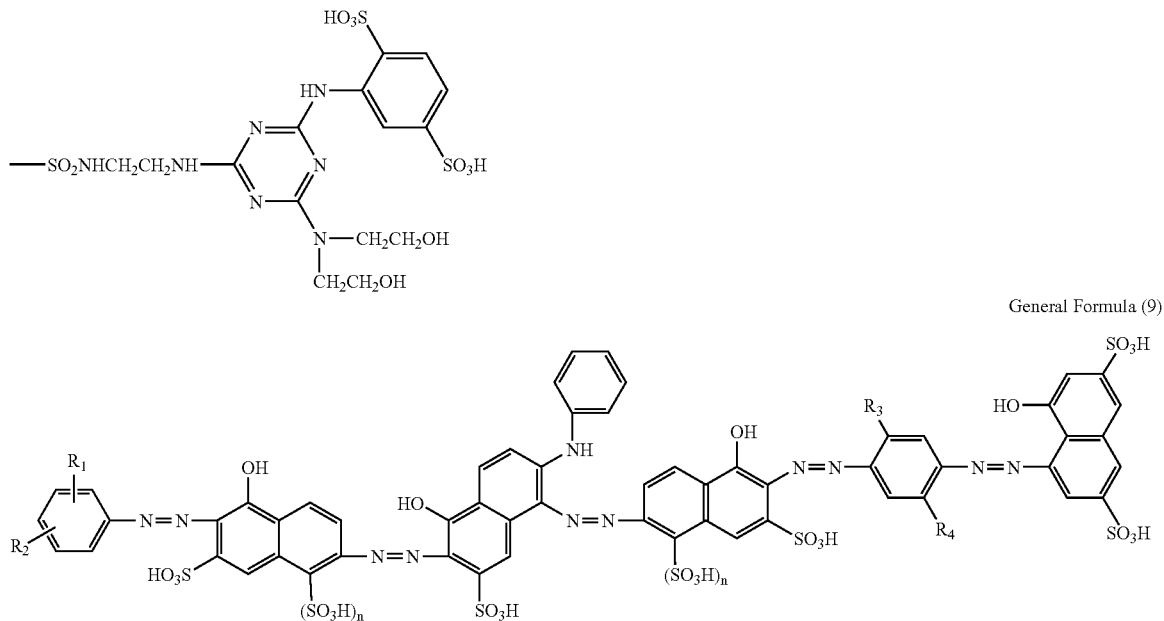

wherein $R_1$ and $R_2$ each independently represent a hydrogen atom, a hydroxyl group, an amino group, a carboxyl group, a sulfonic acid group, an alkyl group having 1 to 4 carbon atoms, or an alkoxy group having 1 to 4 carbon atoms, $R_3$ and $R_4$ each independently represent a hydrogen atom, an alkyl group having 1 to 4 carbon atoms, an alkoxy group having 1 to 4 carbon atoms, a hydroxyl group, an alkyl group which has 1 to 4 carbon atoms and which may be substituted by a hydroxyl group or an alkoxy group having 1 to 4 carbon atoms, an alkoxy group which has 1 to 4 carbon atoms and which may be substituted by a hydroxyl group, an alkoxy group having 1 to 4 carbon atoms, a sulfonic acid group, or a carboxyl group, or an amino group substituted by an alkyl group or an acyl group, and n represents 0 or 1.

General Formula (10)

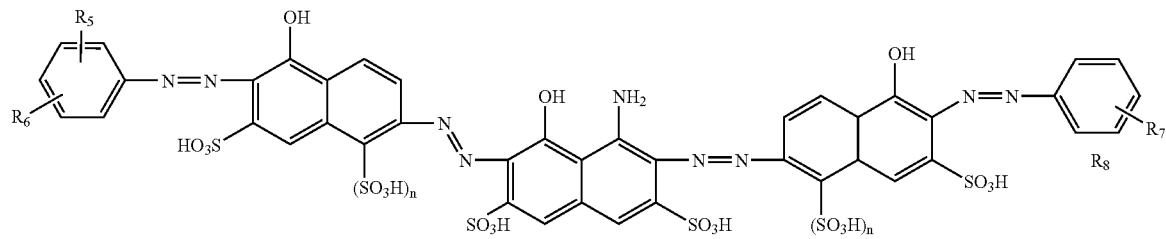

wherein $R_5$, $R_6$, $R_7$, and $R_8$ each independently represent a hydrogen atom, a hydroxyl group, an amino group, a carboxyl group, a sulfonic acid group, an alkyl group having 1 to 4 carbon atoms, an alkoxy group having 1 to 4 carbon atoms, an alkoxy group substituted by a hydroxyl group, an alkoxy group having 1 to 4 carbon atoms, a sulfonic acid group, or a carboxyl group, an alkoxy group which has 1 to 4 carbon atoms and which may be further substituted by a carboxyl group or a sulfonic acid group, or an amino group substituted by a phenyl group, an alkyl group, or an acyl group, and n represents 0 or 1.

Exemplified Compounds Bk1 to Bk3 are shown below in a free acid form as preferable specific examples of the coloring material represented by the formula (9), and Exemplified Compounds Bk4 to Bk6 are shown below in a free acid form as preferable specific examples of the coloring material represented by the formula (10). However, the coloring material used in the present invention is not limited to these compounds. In addition, two or more kinds of such coloring materials as shown below may be simultaneously used. It is particularly preferable to simultaneously use Exemplified Compound Bk3 and Exemplified Compound Bk4 among the above-mentioned compounds.

Exemplified Compound Bk1

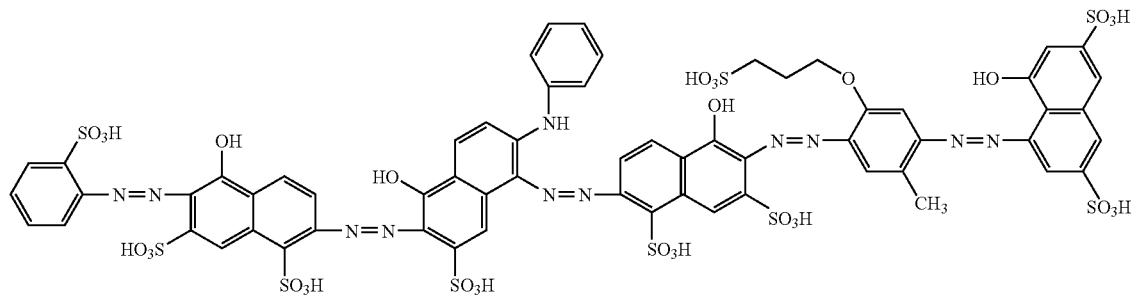

Exemplified Compound Bk2

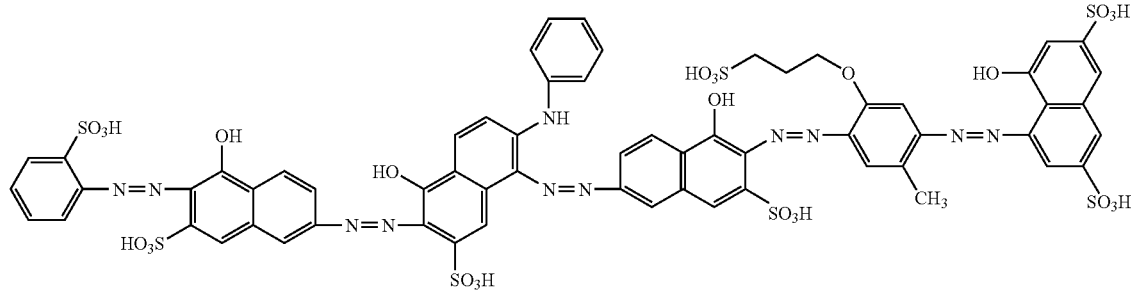

Exemplified Compound Bk3

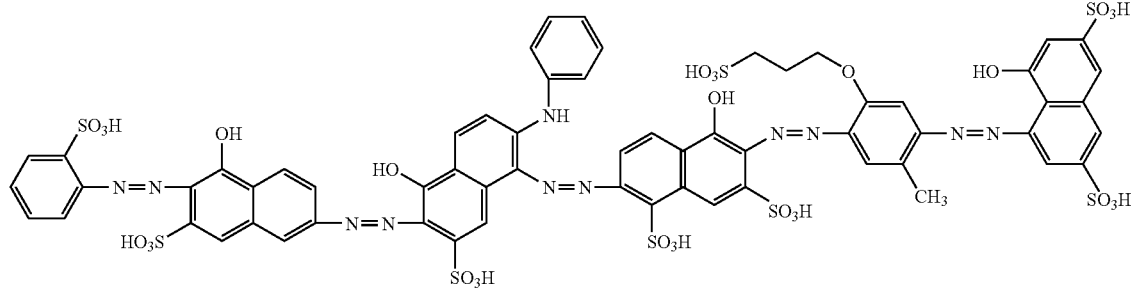

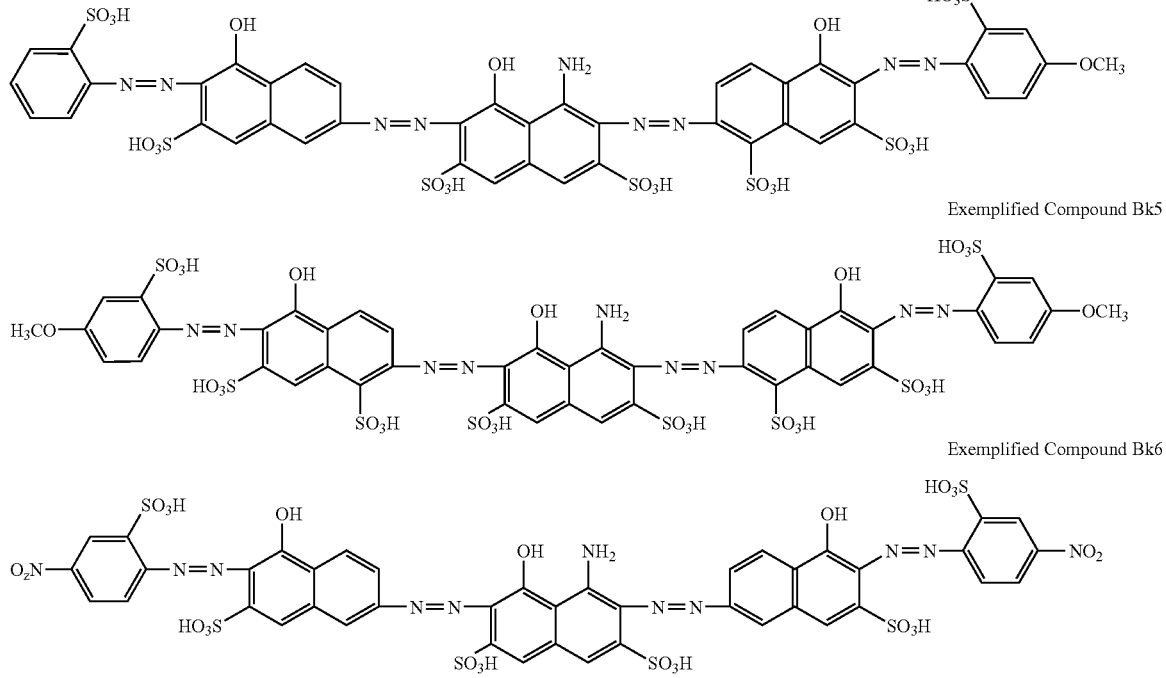

Exemplified Compound Bk4

Exemplified Compound Bk5

Exemplified Compound Bk6

<Water-Soluble Organic Solvent and Additive>

The ink according to the present invention is prepared by dissolving or dispersing a substance that dissolves the protective layer, a compound represented by the general formula (1), and any one of the above-mentioned coloring materials in an aqueous medium. A mixed medium of water and a water-soluble organic solvent is preferably used as the aqueous medium. In this case, the type of the water-soluble organic solvent used is not particularly limited. Any one of various water-soluble organic solvents can be used. The water-soluble organic solvent is not particularly limited as long as it is water-soluble, and examples thereof include an alcohol, a polyhydric alcohol, a polyglycol, a glycol ether, a nitrogen-containing polar solvent, and a sulfur-containing polar solvent. Examples of the water-soluble organic solvent that can be used for the ink of the present invention are shown below, but the present invention is not limited to these water-soluble organic solvents.

Specific examples of the water-soluble organic solvents include alkyl alcohols each having 1 to 4 carbon atoms, such as methyl alcohol, ethyl alcohol, n-propyl alcohol, isopropyl alcohol, n-butyl alcohol, sec-butyl alcohol, and tert-butyl alcohol; amides, such as dimethylformamide and dimethylacetamide; ketones or keto alcohols, such as acetone and diacetone alcohol; ethers, such as tetrahydrofuran and dioxane; polyalkylene glycols, such as polyethylene glycol and polypropylene glycol; alkylene glycols in each of which an alkylene group has 2 to 6 carbon atoms, such as ethylene glycol, propylene glycol, butylene glycol, triethylene glycol, 1,2,6-hexane triol, thiodiglycol, hexylene glycol, and diethylene glycol; lower alkyl ether acetates, such as polyethylene glycol monomethyl ether acetate; lower alkyl ethers of polyhydric alcohols, such as ethylene glycol monomethyl (or ethyl)ether, diethylene glycol methyl (or ethyl)ether, and triethylene glycol monomethyl (or ethyl)ether; polyhydric alcohols, such as trimethylolpropane and trimethylolethane; glycerin; N-methyl-2-pyrrolidone; 2-pyrrolidone; and 1,3-dimethyl-2-imidazolidinone. The water-soluble organic solvents as described above may be used alone, or two or more of them may be used as a mixture.

In addition, if required, the ink may contain various additives, such as a surfactant, a pH adjustor, an anti-rust agent, an antiseptic, a mildew-proofing agent, an antioxidant, an anti-reducing agent, an evaporation accelerator, a chelating agent, and a water-soluble polymer.

(Ink Set)

An ink set of the present invention is preferably a combination of plural inks in the same ink tank. The combination of ink colors is not particularly limited, and inks having the same color may be combined, or inks different from each other in hue may be combined. Specific examples of the ink set include an ink set including three basic colors, that is, cyan, magenta, and yellow colors; an ink set including a black ink, a light cyan ink, and a light magenta ink (so-called pale cyan ink and pale magenta ink) and suitable for outputting a photographic image; an ink set including spot colors, that is, red, green, and blue colors; and an ink set including a black ink, a light black ink, and a lighter black ink (so-called gray ink and light gray ink). However, the present invention is not particularly limited to these ink sets.

As a result of intensive studies on the above-mentioned problem, the inventors have found that when the concentration of a compound that forms a chelate compound with silicon in each of plural inks is set to fall within a specific range, the dissolution of a silicon nitride, silicon oxide, or silicon carbide which constitutes the protective layer of the head heating portion can be suppressed, good discharge properties can be secured even after long-term storage, and an image can be stably formed. In particular, when the dissolution rate of the protective layer varies largely, depending on the types of inks to be combined in the same ink tank, the resistance of the heating portion of a nozzle from which each ink is discharged fluctuates, so it becomes difficult to control an electrical pulse signal that will be applied to the heating portion. In addition, even when an electrical pulse signal is controlled in order to cope with a fluctuation in resistance due to the dissolution of the protective layer, there arises a need for controlling the electrical pulse signal for each color. Consequently, the driving of an electrical pulse becomes complicated, thereby undesirably causing an increase in cost of the head or a printer main body. On the other hand, even when a pulse is not controlled according to the dissolution rate of the protective layer, variation occurs in foaming energy that will be applied to the inks, and thus variation occurs in the amount of ink droplets discharged and the discharge rate set at an initial stage. As a result, deviation in the amount or landing position of each ink droplet applied to a recording medium tends to become pronounced as compared to when only one kind of ink is used, thereby leading to a problem in that image deterioration easily occurs.

Therefore, in the present invention, the dissolution rate of the protective layer in contact with each ink is preferably controlled to fall within a certain range. Specifically, it is preferable that each of the inks contains a substance that dissolves the protective layer and a compound represented by the general formula (1), and the content X (% by mass) of the compound represented by the general formula (1) in the ink satisfies the relationship of $1 \leq X \leq 30$. Further, it is more preferable that each of the inks contains a polycarboxylic acid or a salt thereof, and the content Y (mmol/l) of the polycarboxylic acid and the salt thereof in the ink satisfies the relationship of $0.001 \leq Y \leq 0.02X + 0.09$. In particular, the maximum difference between the contents of the compound represented by the general formula (1) in the inks is preferably 8% by mass or less.

(Ink Cartridge)

Next, an embodiment of the present invention will be described with reference to the drawings. It should be noted that the attached drawings, which are incorporated herein and form a part hereof, show several aspects of the present invention, and are subject to explanation of the rule and principle of the present invention in combination with the description. FIGS. 1 to 6 are each a view illustrating a recording head suitable for carrying out or applying the present invention. Hereinafter, each component will be described with reference to these drawings.

Figure 2:
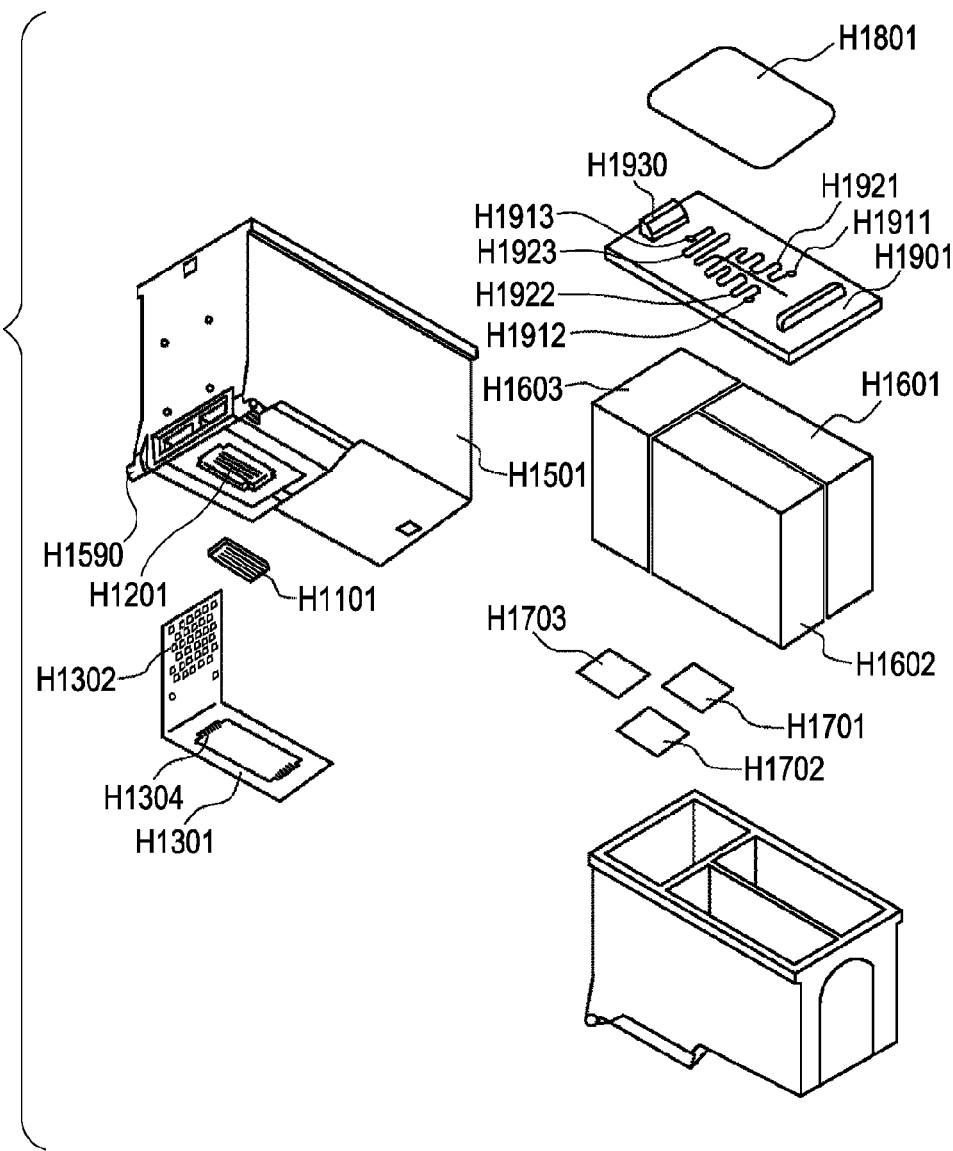
FIG. 2 is an exploded view of a recording head (ink cartridge).

As shown in each of FIGS. 1 and 2, a recording head (ink cartridge) of the present invention is constructed to be integrated with an ink tank. A recording head (ink cartridge) H1001 shown in FIGS. 1 and 2 is provided with three color inks, i.e., a cyan ink, a magenta ink, and a yellow ink. The recording head H1001 is fixed and supported by a device for positioning a carriage mounted on the main body of an ink-jet recording apparatus and by an electrical contact, and is detachable from the carriage. Each of the inks mounted is exchanged after having been consumed.

Next, the respective components that constitute the recording head (ink cartridge) will be sequentially described in further detail.

(Recording Head (Ink Cartridge))

The recording head (i.e., ink cartridge) H1001 in this embodiment is a recording head of a bubble jet (registered trademark) type using an electrothermal transducer that generates thermal energy for causing film boiling in ink according to an electrical signal. The recording head is a so-called side-shooter type recording head in which an electrothermal transducer and an ink ejection orifice are arranged opposite to each other. In the present invention, the head preferably has a nozzle row in which 150 or more nozzles are arranged at a pitch interval of 300 dpi or more and the amount of ink discharged from each nozzle is 30 pl or less, from the viewpoints of output of a high-quality image to plain paper and high-speed printing. Further, from the viewpoint of compatibility between photographic quality and high-speed printing, the head preferably has a nozzle row in which 100 or more nozzles from each of which ink is discharged in an amount of 6 pl or less are arranged at a pitch interval of 600 dpi or more.

(1-1) Recording Head (Ink Cartridge)

The recording head (ink cartridge) H1001 is used for discharging the three color inks, that is, the cyan, magenta, and yellow inks. As shown in the exploded perspective view of FIG. 2, the head H1001 includes a recording element substrate H1101, an electric wiring tape H1301, and an ink supplying/holding member H1501. The head H1001 further includes filters H1701, H1702, and H1703, ink absorbers H1601, H1602, and H1603, a cover member H1901, and a sealing member H1801.

(1-1-1) Recording Element Substrate

Figure 3:
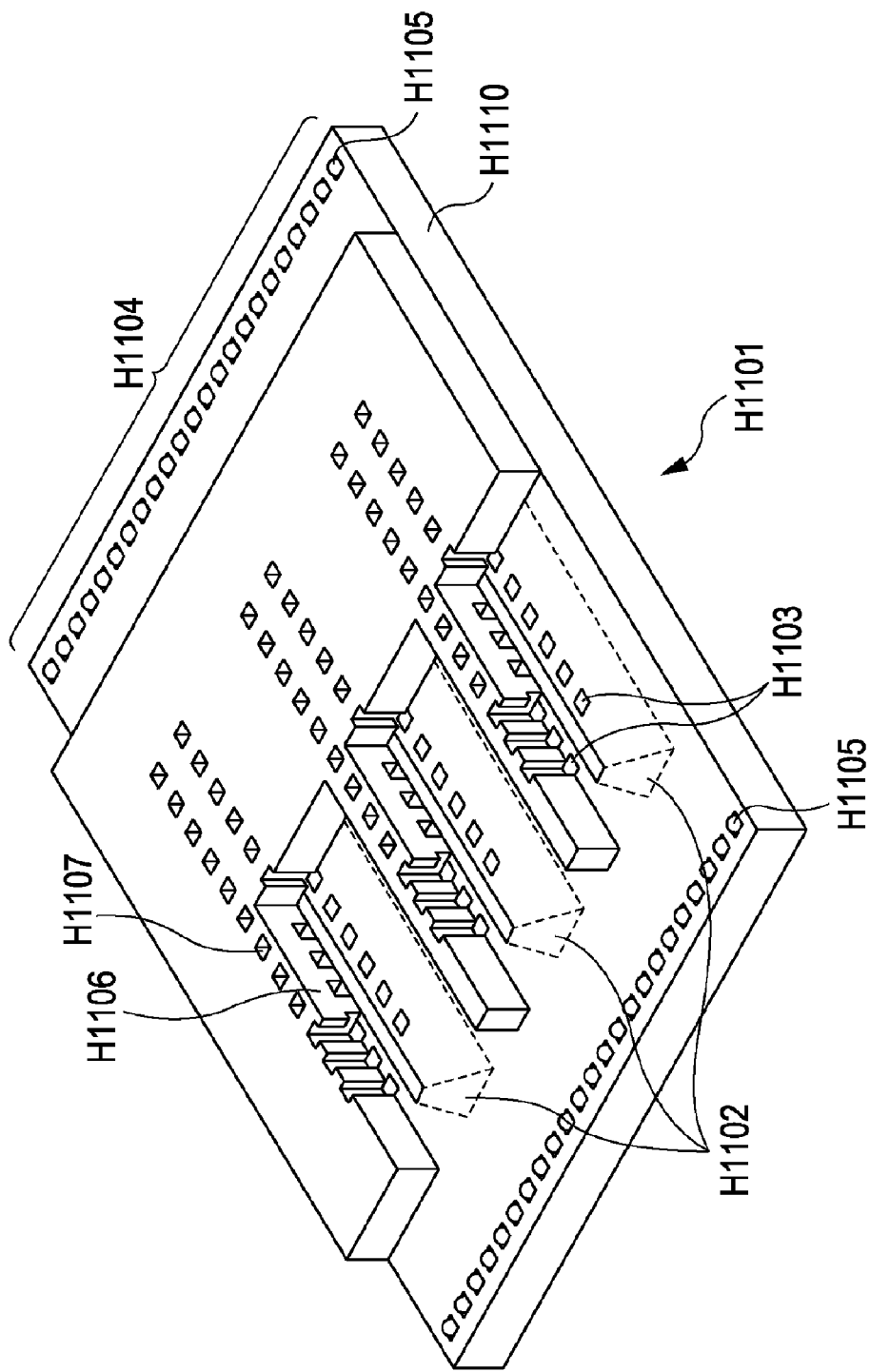
FIG. 3 is a partially cut-away perspective view of a recording element substrate.

FIG. 3 is a partially cut-away perspective view for explaining the constitution of the recording element substrate H1101. Three ink supply ports H1102 for the three inks, that is, cyan, magenta, and yellow inks, are formed in parallel with each other. Electrothermal transducers H1103 disposed in a line and ejection orifices H1107 disposed in a line are formed to be arranged in a staggered form on both sides of each of the ink supply ports H1102. In addition, electric wiring, a fuse, electrode portions H1104, and the like are formed on a silicon substrate H1110. Further, ink passage walls H1106 and the ejection orifices H1107 are formed on the silicon substrate H1110 by a photolithography technique using a resin material. Bumps H1105 composed of Au or the like are formed in the electrode portions H1104 for supplying electric power to the electric wiring.

(1-1-2) Nozzle Structure

Figure 4A:
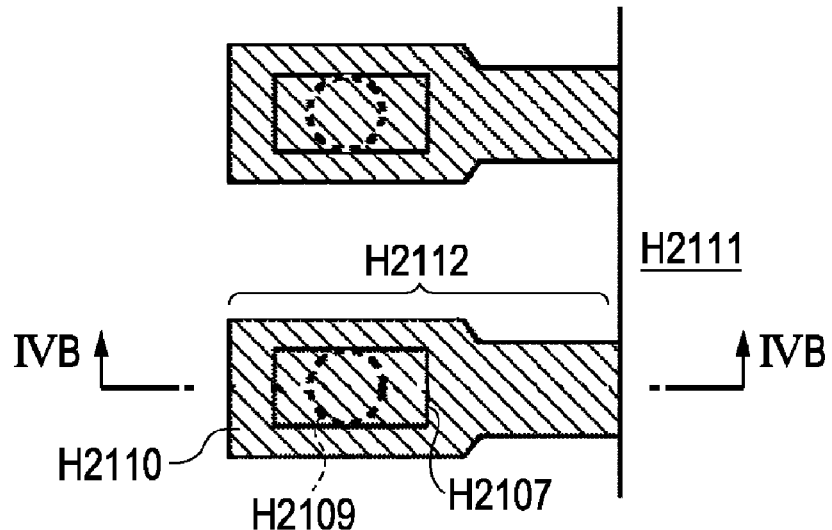
FIGS. 4A and 4B are views each schematically showing the nozzle structure of a thermal ink-jet head.
Figure 4B:
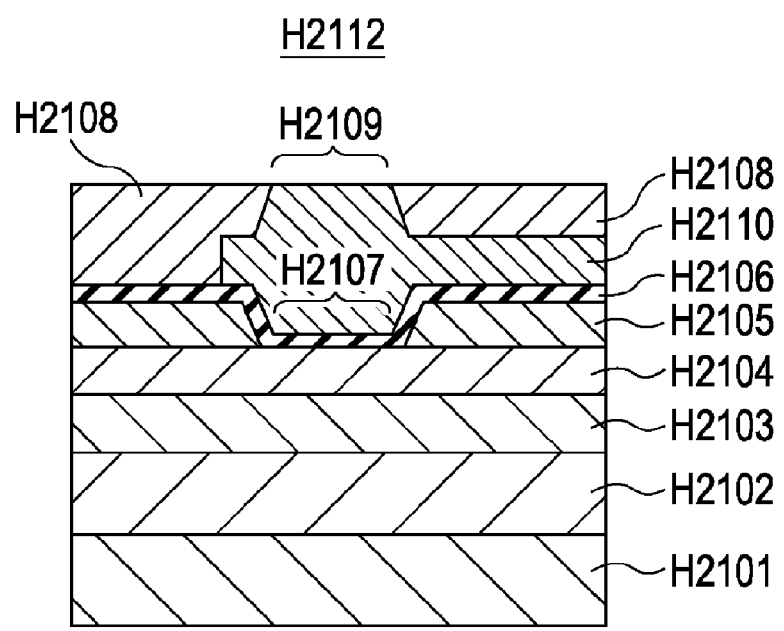
Figure 5:
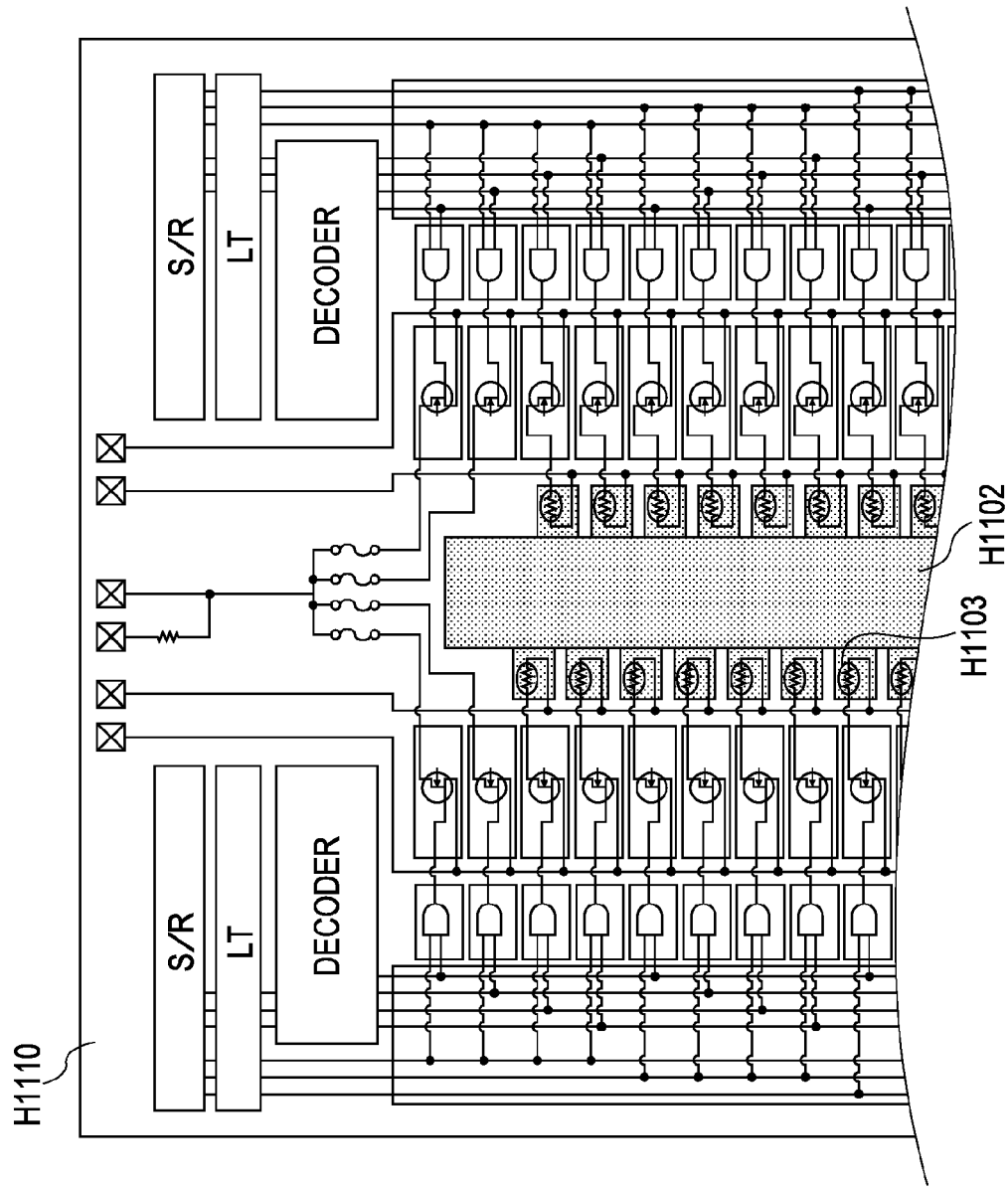
FIG. 5 is a view schematically showing an Si substrate.
Figure 6:
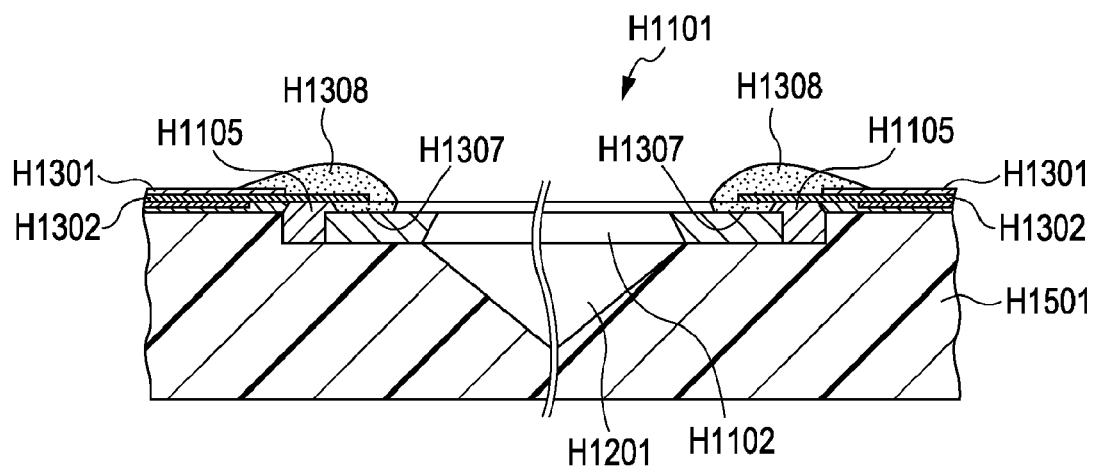
FIG. 6 is a partial sectional view of a recording head (ink cartridge).

FIGS. 4A and 4B are views schematically showing a nozzle portion provided on an ink-jet head to which the ink according to the present invention is applied. FIG. 4A is a view showing the shape of a nozzle H2112, as viewed from its ejection orifice side. FIG. 4B is a cross-sectional view taken along a broken line IVB-IVB in FIG. 4A. In FIG. 4B, reference numeral H2101 denotes a silicon substrate and reference numeral H2102 denotes a heat accumulation layer composed of a thermal oxide layer. In addition, reference numeral H2103 denotes an interlayer layer which also functions to accumulate heat and is composed of a silicon oxide layer or a silicon nitride layer, reference numeral H2104 denotes a heating resistor layer, and reference numeral H2105 denotes a metal wiring layer as wiring composed of a metal material such as Al, Al—Si, or Al—Cu. In addition, reference numeral H2106 denotes a protective layer which is composed of a silicon oxide layer, a silicon nitride layer, or a silicon carbide layer and also functions as an insulating layer. In particular, since the protective layer H2106 directly contacts the ink, the protective layer is required to be chemically stable against an alkali and to have sufficient resistance against a physical shock, and there is a great necessity for the layer to be provided with electrical insulating properties. Accordingly, a silicon nitride layer or a silicon carbide layer can be particularly suitably used as a material for forming the layer. In addition, reference numeral H2107 denotes a heating portion in which heat generated in the heating resistor of the heating resistor layer H2104 acts on the ink.

The heating portion H2107 in the ink-jet head is exposed to a high temperature owing to the heat generated in the heating resistor and mainly receives a cavitation impact and a chemical action of the ink in association with foaming of the ink and foam contraction after the foaming. Therefore, the heating portion H2107 is provided with the protective layer H2106 for protecting the electrothermal transducer from the cavitation impact and the chemical action of the ink. The thickness of the protective layer H2106 is preferably in the range of 50 nm to 500 nm, from the viewpoint of thermal conversion efficiency which is important in the efficient conversion of an electrical pulse applied to the heating resistor, and from the viewpoint of protection from a physical shock and chemical corrosion caused by the ink in association with a foaming phenomenon.

That is, when the thickness is less than 50 nm, the discharge durability of the heating portion may be insufficient, or a fluctuation in energy to be input may be sensitively susceptible to a change in thickness due to the dissolution of the protective layer due to storage. On the other hand, when the thickness exceeds 500 nm, foaming requires large energy, and, in the case where nozzles are arranged at a high density to increase the discharge frequency of ink, the temperature of the nozzles tends to be increased. Further, in the present invention, the thickness of the protective layer is particularly preferably in the range of 100 nm to 450 nm in order to increase the number of nozzles, the density, and the discharge durability. A discharge element provided with an ejection orifice H2109 for discharging ink is formed using a passage forming member H2108 on the protective layer H2106.

An oblique line portion H2110 shown in FIGS. 4A and 4B is a liquid chamber part of a nozzle portion which is filled with ink. The ink is supplied from a common liquid chamber H2111 disposed on the right side of the nozzle portion. After foaming in the heating portion H2107, the ink is extruded from the ejection orifice H2109 and discharged as an ink droplet.

In addition, the relationship between the volume of the nozzle liquid chamber denoted by reference numeral H2110 and the area of the protective layer H2106 in contact with the ink is important in the present invention. When an ink cartridge in which an ink-jet head and an ink tank are integrated with each other is stored for a long period of time in physical distribution, in order to suppress drying of the ink, the ejection orifice H2109 is generally covered with a sealing unit such as sealing tape or a hot-melt adhesive. Therefore, the ink in the nozzle liquid chamber H2110 is stayed in the nozzle liquid chamber for a long period of time. As a result, the ink in the liquid chamber continuously contacts the protective layer H2106, and thus the protective layer is possibly dissolved in the ink gradually.

Investigation conducted by the inventors of the present invention has revealed that during storage in such a state, the ink present in the nozzle liquid chamber H2110 is minimally fluidized, and when the concentration of dissolved silicon reaches saturation, the dissolution of the protective layer reaches equilibrium and hardly progresses thereafter. Therefore, it has been found that the dissolution of the protective layer H2106 can be suppressed to some degree by controlling, within a certain range, a ratio of the volume of the nozzle liquid chamber H2110 to the surface area of the protective layer H2106 as the outermost surface in contact with the ink in the nozzle liquid chamber H2110. Specifically, a ratio of the volume of the nozzle liquid chamber H2110 of each nozzle to the surface area of a portion of the protective layer H2106 in contact with ink in each nozzle portion is preferably controlled to be 50 $\mu m^3/\mu m^2$ or less because the dissolution of the protective layer is suppressed when the protective layer continuously contacts the ink for a long period of time in physical distribution storage.

In addition, in order to drive the head at a high frequency of 10 kHz or more, the nozzle structure is limited, and thus the ratio is more preferably in the range of 5 $\mu m^3/\mu m^2$ to 40 $\mu m^3/\mu m^2$ from the viewpoint of discharge properties. It should be noted that the volume of the ink liquid chamber of each nozzle (volume of the nozzle liquid chamber) defined herein refers to a portion corresponding to reference numeral H2110 in FIGS. 4A and 4B, and is the volume of an ink passage part branching from the common liquid chamber H2111 and reaching the ejection orifice H2109. Further, in the present invention, the term "the surface area of a portion of the protective layer of each nozzle part in contact with ink" corresponds to the surface area of a portion of the protective layer H2106 as the outermost surface of a nozzle portion in contact with the ink, more specifically, the surface area of the protective layer in contact with the ink in the liquid chamber H2110.

In addition, in the so-called side-shooter type recording head in which an electrothermal transducer and an ink ejection orifice are arranged opposite to each other as shown in the drawings, the nozzles are arranged on both ends of a common liquid chamber so as to be opposite to each other, and thus an ink passage has a bent structure, not a straight structure. Consequently, little convection of ink occurs between each nozzle and the common ink liquid chamber in long-term storage, and the dissolution of a silicon compound as a component which constitutes a protective layer easily reaches a saturation level in a nozzle, thereby suppressing a reduction in thickness of the protective layer.

(1-1-3) Electric Wiring Tape

The electric wiring tape H1301 forms an electrical signal path for applying, to the recording element substrate H1101, an electrical signal for discharging ink, and an opening for incorporating the recording element substrate therein is formed in the tape. Electrode terminals H1304 to be connected to the electrode portions H1104 of the recording element substrate are formed near the edges of the opening. In addition, external signal input terminals H1302 for receiving electrical signals from the main body of the apparatus are formed in the electric wiring tape H1301. The electrode terminals H1304 and the external signal input terminals H1302 are connected by a continuous copper foil wiring pattern.

The electric wiring tape H1301 and a second recording element substrate H1101 are electrically connected by electrically bonding the bumps H1105 and the electrode terminals H1304 by a thermal ultrasonic contact bonding method. The bumps H1105 are formed on the electrode portions H1104 of the second recording element substrate H1101, and the electrode terminals H1304 are formed on the electric wiring tape H1301 corresponding to the electrode portions H1104 of the second recording element substrate H1101.

(1-1-4) Ink Supplying/Holding Member

The ink supplying/holding member H1501 is formed by molding a resin, and a thermoplastic resin material that can be molded by, for example, injection molding, compression molding, or thermoforming can be suitably used as a material for forming the member. Preferable examples of an appropriate thermoplastic resin include, but are not limited to, polyester, polycarbonate, polypropylene, polyethylene, polystyrene, and polyphenylene ether, and mixtures and modified products thereof. Of these resins, polyphenylene ether is preferable, and an alloy of polyphenylene ether and a styrene-based material is particularly preferable. A thermoplastic resin material mixed with 5 to 40% by mass of a filler is preferably used as the resin material from the viewpoints of an improvement in shape rigidity and the suppression of gas permeability. Preferred examples of the filler include, but are not limited to, inorganic substances such as glass, silica, and graphite (black lead). High levels of ink resistance and weldability are required, and, when a recording head is directly mounted on the ink supplying/holding member as it is in this embodiment, high levels of adhesiveness with an adhesive and thermal linear expansibility are also required. From the viewpoint of a balance among these required properties, a resin material prepared by mixing an alloy of polyphenylene ether and a styrene-based material with a filler is particularly preferable.

As shown in FIG. 2, the ink supplying/holding member H1501 has a space for holding independently each of the absorbers H1601, H1602, and H1603 for generating negative pressures for holding the cyan, magenta, and yellow inks therein. The ink supplying/holding member H1501 is further provided with an ink supplying function of forming independent ink passages for guiding inks to the respective ink supply ports H1102 of the recording element substrate H1101. Each of the ink absorbers H1601, H1602, and H1603 is preferably formed by compressing polypropylene (PP) fibers but may be formed by compressing urethane fibers. Further, the filters H1701, H1702, and H1703 are bonded by welding to boundary portions between the upstream portions of the respective ink passages and the ink absorbers H1601, H1602, and H1603, in order to prevent dust from entering the recording element substrate H1101. Each of the filters H1701, H1702, and H1703 may be of an SUS metal mesh type but is preferably of an SUS metal fiber sintered type.

The ink supply ports H1201 for supplying the respective inks, that is, the cyan, magenta, and yellow inks, to the recording element substrate H1101 are formed in the downstream portions of the ink passages. The recording element substrate H1101 is bonded and fixed to the ink supplying/holding member H1501 with high positional accuracy so that each of the ink supply ports H1102 of the recording element substrate H1101 communicate with the respective ink supply ports H1201 of the ink supplying/holding member H1501. A first adhesive used for bonding preferably has a low viscosity and a low curing temperature, is cured within a short time, has relatively high hardness after curing, and has ink resistance. For example, a thermosetting adhesive composed of an epoxy resin as a main component is used as the first adhesive, and the thickness of an adhesive layer is preferably about 50 µm.

A portion of the rear surface of the electric wiring tape H1301 is bonded and fixed to the flat surface around the ink supply ports H1201 using a second adhesive. The portion of electric connection between the second recording element substrate H1101 and the electric wiring tape H1301 is sealed with a first sealing agent H1307 and a second sealing agent H1308 (see FIG. 6) so that the portion of electric connection is protected from corrosion by ink and an external impact. The first sealing agent H1307 seals mainly the rear surface side of the portion of connection between the external signal input terminals H1302 of the electric wiring tape H1301 and the bumps H1105 of the recording element substrate and the outer periphery of the recording element substrate. The second sealing agent H1308 seals the front surface side of the above-mentioned portion of connection. Further, an unbonded portion of the electric wiring tape H1301 is bent and the electric wiring tape H1301 is fixed to the side surface substantially perpendicular to the surface of the ink supplying/holding member H1501 having the ink supply ports H1201 by heat caulking or bonding.

(1-1-5) Cover Member

The cover member H1901 is welded to the upper opening of the ink supplying/holding member H1501, whereby the independent spaces inside the ink supplying/holding member H1501 are closed. It should be noted that the cover member H1901 has fine openings H1911, H1912, and H1913 for removing pressure fluctuations of the respective chambers inside the ink supplying/holding member H1501, and fine grooves H1921, H1922, and H1923 communicating with the respective openings. The other ends of the fine grooves H1921 and H1922 are jointed to the fine groove H1923 at an intermediate point thereof. Further, the sealing member H1801 covers the fine openings H1911, H1912, and H1913, the fine grooves H1921 and H1922, and most of the fine groove H1923, and the other end portion of the fine groove H1923 is left uncovered to form an air communicating hole. Such an air communicating hole with a labyrinth structure is preferable because the evaporation of a volatile component of ink from the air communicating hole can be effectively suppressed. In addition, the cover member H1901 has an engaging portion H1930 for fixing the recording head to an ink-jet recording apparatus.

A resin material mixed with a filler similar to that of the ink supplying/holding member can be suitably used for the cover member. Even when the above-mentioned resin material is used in each of the ink supplying/holding member and the cover member, moisture permeation through the resin material itself cannot be avoided. Accordingly, ink is evaporated to some extent even when the above-mentioned air communicating hole with a labyrinth structure is provided.

(1-2) Mounting of Recording Head (Ink Cartridge) on Ink-Jet Recording Apparatus

As shown in FIG. 1, the recording head H1001 includes a mounting guide H1560 for guiding the head to the position at which the head is mounted on the carriage of the main body of the ink-jet recording apparatus, and the engaging portion H1930 for mounting and fixing the head on the carriage using a head set lever. The head further includes an abutting portion H1570 in an X direction (carriage scan direction), an abutting portion H1580 in a Y direction (recording medium conveying direction), and an abutting portion H1590 in a Z direction (ink discharge direction), for positioning the head at the predetermined mounting position on the carriage. The head is positioned by the above-mentioned abutting portions, whereby the external signal input terminals H1302 on the electric wiring tape H1301 electrically contact, with high accuracy, contact pins of electrical connection portions provided in the carriage.

(1-3) Method of Driving Recording Head

When a pulse-like electrical signal is applied to the metal wiring layer H2105 of the head shown in FIGS. 4A and 4B, the heating portion H2107 of the heating element substrate H2104 abruptly generates heat, and bubbles are generated in ink in contact with the surface of the heating portion. The pressure of the bubbles causes a meniscus to protrude. Then, the ink is discharged through the ejection orifice H2109 of the head to become an ink droplet which flies onto a recording medium.

Next, a γ value will be described. The γ value is a factor representing a ratio of actually input energy to critical energy just enough for a bubble jet head to discharge ink. That is, input energy E is represented by the following equation (A) wherein P represents the width of a pulse to be applied to the bubble jet head (when plural pulses are applied dividedly, P represents the total width of the pulses), V represents a voltage to be applied, and R represents the resistance of a heater.

$$E = P \times V^2 / R \qquad (A)$$

In this case, the γ value is given by the following equation (B) wherein Eth represents the minimum required energy of the heater just enough for the bubble jet head to discharge ink and Eop represents energy to be input for actually driving the head.

$$\gamma = Eop/Eth \qquad (B)$$

In addition, the following method is a practical method of determining the γ value from the driving conditions of the bubble jet head.

First, an appropriate pulse width for the bubble jet head to discharge ink at a given voltage is found before the head is driven. Next, the pulse width is gradually shortened, and the pulse width with which discharge is stopped is found. The minimum pulse width for discharge immediately before the found pulse width is represented by Pth. The γ value is determined from the following equation (C) wherein Pop represents a pulse width to be actually used for driving the head.

$$\gamma = Pop/Pth \qquad (C)$$

In order to stably discharge ink, the head is preferably driven under such a condition that the γ value defined as described above is in the range of 1.10 to 1.50. Such a driving condition can further prevent kogation to the heater and hence can further lengthen the lifetime of the recording head. In addition, a change in heating resistance of the heating portion before and after long-term storage can be examined by measuring the minimum pulse width Pth0 immediately after the production of an ink tank and the minimum pulse width Pth1 after long-term storage, and determining a rate of change in the minimum pulse according to the following equation (D):

$$\alpha(\%) = 100 \times (Pth1 - Pth0)/Pth0 \qquad (D)$$

The rate α of change in Pth is preferably less than 30% in order to satisfy various discharge properties, such as a fluctuation in amount of the ink discharged concerning stable ink discharge, in particular, the stability of a foaming state, refill properties for supplying the ink to a nozzle, heat accumulation properties due to continuous discharge concerning a fluctuation in energy applied to the heating portion, and discharge durability. In particular, even when a photographic image is intended to be output, α is preferably less than 20% because there arises a need for controlling the stable discharge of the ink with high accuracy in order that the amount of the ink discharged per nozzle is in the preferable range of 6 pl or less.

[Ink-Jet Recording Apparatus]

Figure 7:
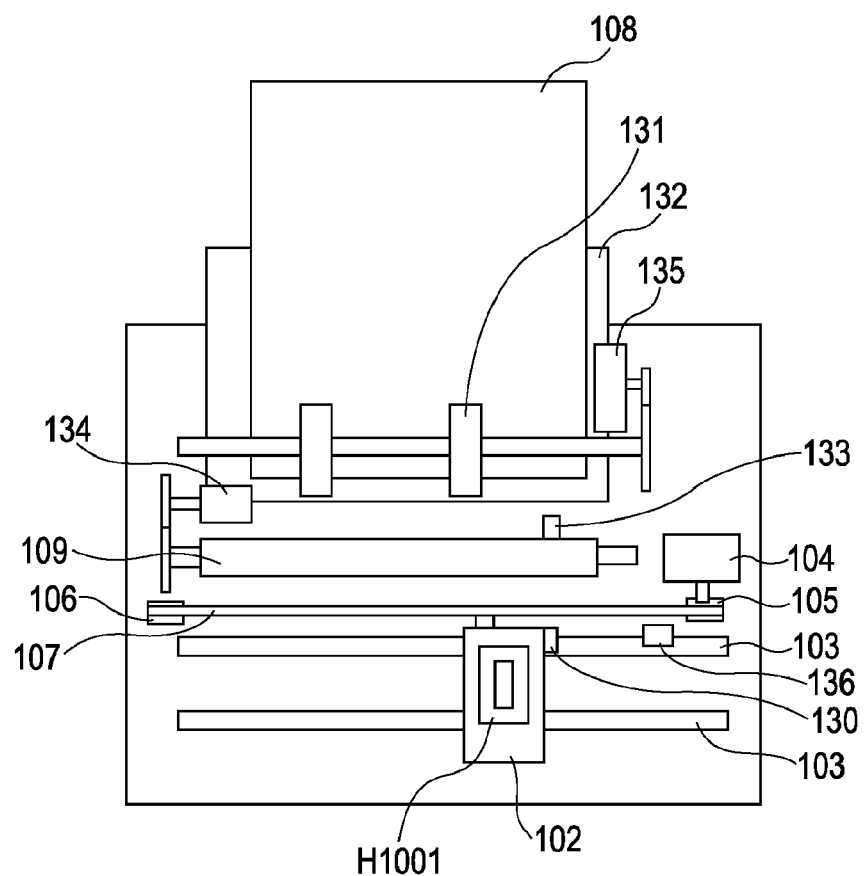
FIG. 7 is a view showing an ink-jet recording apparatus.

Next, a liquid discharge recording apparatus on which the above-described cartridge type recording head can be mounted will be described. FIG. 7 is a view illustrating an example of a recording apparatus on which the liquid discharge recording head of the present invention can be mounted. In the recording apparatus shown in FIG. 7, the recording head H1001 shown in FIG. 1 is positioned and detachably mounted on a carriage 102. The carriage 102 is provided with electrical connection portions for transmitting a drive signal and the like to the respective ejection orifices through the external signal input terminals on the recording head H1001.

The carriage 102 is guided and supported so that it can be reciprocated along a guide shaft 103 installed on the apparatus main body to extend in a main scanning direction. In addition, the carriage 102 is driven by a main scan motor 104 via driving mechanisms such as a motor pulley 105, a driven pulley 106, and a timing belt 107, and, at the same time, its position and movement are controlled. Further, the carriage 102 is provided with a home position sensor 130. Therefore, the position of the carriage can be known when the home position sensor 130 on the carriage 102 passes through the position of a shielding plate 136.

Recording media 108 such as printing paper and plastic thin sheets are separately fed one by one from an automatic sheet feeder (ASF) 132 by rotating a pickup roller 131 from a sheet feeding motor 135 via a gear. Further, each of the media is conveyed (sub-scanned) through a position (print portion) opposite to the ejection orifice surface of the recording head H1001 by the rotation of a convey roller 109. The convey roller 109 is rotated by the rotation of an LF motor 134 via a gear. In this case, a decision as to whether a medium is fed and the determination of a heading position upon sheet feeding are made at the time when each of the recording media 108 passes through a paper end sensor 133. Further, the paper end sensor 133 is used for finding the actual position of the trailing end of each of the recording media 108 and finally identifying the current recording position from the actual trailing end.

It should be noted that the rear surface of each of the recording media 108 is supported by a platen (not shown) in order to form a flat print surface in the print portion. In this case, the recording head H1001 mounted on the carriage 102 is held in such a manner that its ejection orifice surface protrudes downward from the carriage 102 and is in parallel with each of the recording media 108 between the two pairs of convey rollers. The recording head H1001 is mounted on the carriage 102 in such a manner that the arrangement direction of the ejection orifices in each ejection orifice intersects the above-mentioned scanning direction of the carriage 102, such that recording is performed by discharging a liquid from these ejection orifice rows.

EXAMPLES

Hereinafter, the present invention will be described in further detail with reference to examples and comparative examples. However, the present invention is not limited to these examples within the scope of the gist of the present invention. It should be noted that in the description below, the terms "parts" and "%" represent "parts by mass" and "% by mass", respectively, unless otherwise stated.

<Preparation of Coloring Material>

(Cyan Dye 1)

Sulfolane, monosodium 4-sulfophthalate, ammonium chloride, urea, ammonium molybdate, and copper(II) chloride were stirred and washed with methanol. Then, water was added to the resultant mixture, and the pH of the resultant solution was adjusted to 11 with an aqueous solution of sodium hydroxide. Next, an aqueous solution of hydrochloric acid was added to the solution under stirring, and then sodium chloride was gradually added to the resulting mixture. Then, a precipitated crystal was filtered out and washed with a 20% aqueous solution of sodium chloride. Subsequently, methanol was added, and the precipitated crystal was separated by filtration. Further, the crystal was washed with a 70% aqueous solution of methanol and then dried to obtain a copper phthalocyanine tetrasulfonic acid tetrasodium salt as a blue crystal.

Next, the resulting copper phthalocyanine tetrasulfonic acid tetrasodium salt was gradually added to chlorosulfonic acid, and thionyl chloride was added dropwise to the resulting mixture. The reaction solution was cooled and a precipitated crystal was filtered off to obtain a desired wet cake of copper phthalocyanine tetrasulfonic acid chloride. The wet cake was suspended by stirring, and ammonia water and a compound of the formula (α) below were added to the resulting suspension. Further, water and sodium chloride were added to the mixture to precipitate a crystal. The precipitated crystal was filtered off and washed with an aqueous solution of sodium chloride. The crystal was filtered off, washed again, and then dried to obtain cyan dye 1 as a coloring material to be used in the examples.

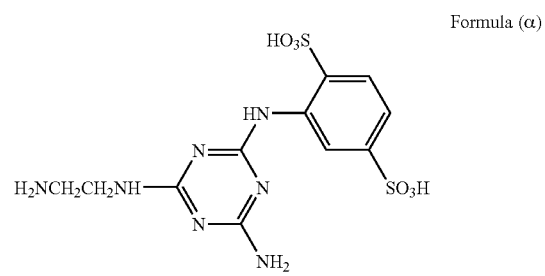

Formula (α)

The compound represented by the formula (α) was synthesized as described below. Lipal OH, cyanuric chloride, and an aniline-2,5-disulfonic acid monosodium salt were charged in ice water, and then an aqueous solution of sodium hydroxide was added to the resulting mixture. Next, an aqueous solution of sodium hydroxide was added to the reaction solution to adjust pH to 10.0. Further, 28% ammonia water and ethylenediamine were added to the reaction solution. Then, sodium chloride and concentrated hydrochloric acid were added dropwise to the resultant mixture to precipitate a crystal. The precipitated crystal was separated by filtration and washed with a 20% aqueous solution of sodium chloride to obtain a wet cake. Then, methanol and water were added to the resultant wet cake, followed by filtration, washing with methanol, and drying to obtain the compound represented by the formula (α).

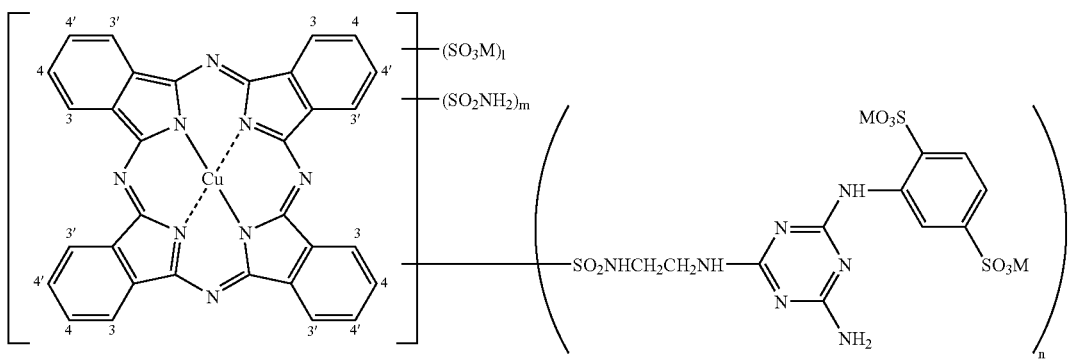

Cyan Dye 1 wherein l=0 to 2, m=1 to 3, and n=1 to 3 provided that l+m+n=3 or 4 and m≧1, the substitution position of a substituent is the 4- or 4'-position, and M represents Na.

(Cyan Dye 2)

Exemplified Compound II-66 described above was used as the cyan dye 2.

(Magenta Dye 1)

A compound represented by the formula (γ) below, sodium carbonate, and ethyl benzoylacetate were reacted in xylene, and the reaction product was filtered off and washed. Then, meta-aminoacetanilide, copper acetate, and sodium carbonate were charged in order into N,N-dimethylformamide to be reacted with the reaction product, followed by filtration and washing. Further, the reaction product was sulfonated in fuming sulfuric acid, filtered, and washed. The resultant product was subjected to a condensation reaction with cyanuric chloride in the presence of sodium hydroxide. Then, anthranilic acid was added to the reaction solution, followed by a condensation reaction in the presence of sodium hydroxide. The resultant product was filtered and washed to obtain magenta dye 1 represented by the following formula and used as a coloring material in the examples.

Formula (γ)

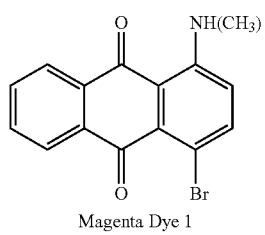

Magenta Dye 1

-continued

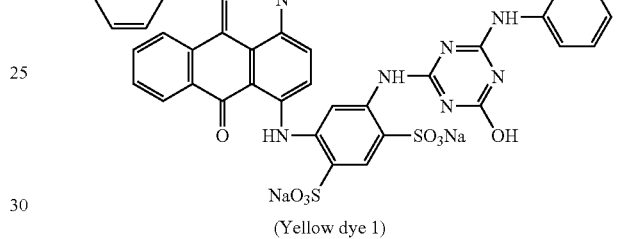

(Yellow dye 1)

Exemplified Compound 3-5 (potassium salt) described below was used as a yellow dye.

Exemplified Compound 3-5 (Potassium Salt)

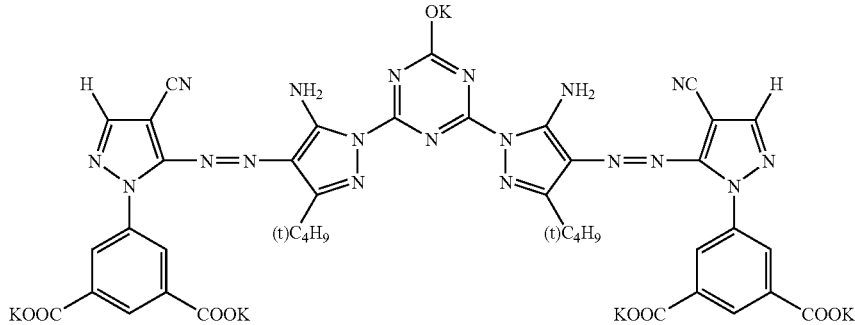

Example 1 and Comparative Example 1

First, 54 parts (50 mmol/l in terms of a dye pure content) of a 10% aqueous solution of Magenta Dye 1 and 46 parts of water were mixed to prepare a mixed solution. Then, 30 g of the solution containing the Magenta Dye 1 prepared as described above and a sample (11 mm long by 5 mm wide) including an SiN layer having a thickness of 400 nm and formed on a silicon wafer were placed in a closed vessel. The sample was immersed in the liquid and stored at a temperature of 60° C. for 1 week. After the storage, the sample was taken out, washed with pure water, and dried, and then the thickness of the SiN layer was measured with a non-contact type thickness measuring apparatus (trade name: NANOSPEC/AFT Model 210, manufactured by Nanometorics Japan, Ltd.). As result of the measurement, it was confirmed that Magenta Dye 1 is a substance that dissolves the SiN layer serving as a protective layer because the thickness of the SiN layer was reduced by 5% or more after the storage.

Next, various components shown in Table 2 below were added in the predetermined amounts shown in the table, and the total amount was controlled to 100 parts using water. These components were mixed and sufficiently stirred to form a solution. Then, the resultant solution was filtered through a microfilter having a pore size of 0.2 μm (manufactured by Fuji Photo Film Co., Ltd.) under pressure to prepare each of Magenta Ink M1 and Magenta Ink M2.

TABLE 2

| Composition of magenta ink (unit: parts) | | |
|---|---|---|
|  | M1 | M2 |
| Glycerin | 4 | 4 |
| Ethylene glycol | 8 | 8 |
| Bis(2-hydroxyethyl) sulfone | 10 | — |
| 1,5-pentanediol | 5 | 5 |
| Acetylenol E100 | 0.8 | 0.8 |
| Magenta Dye 1 | 6 | 6 |
| Water | Balance | Balance |

Table 3 shows magenta inks corresponding to Example 1 and Comparative Example 1, and the amount of bis(2-hydroxyethyl) sulfone contained in each ink as a substance that suppresses the dissolution of the protective layer. Hereinafter, bis(2-hydroxyethyl) sulfone is abbreviated as "BHES".

TABLE 3

| Amount of BHES in inks of Example 1 and Comparative Example 1 | | |
|---|---|---|
|  | Example 1 | Comparative Example 1 |
| Ink | M1 | M2 |
| Amount of BHES (% by mass) | 10 | 0 |

Magenta ink M1 and magenta ink M2 corresponding to Example 1 and Comparative Example 1, respectively, were stored one by one in the ink cartridge shown in FIG. 1, and the driving pulse which permitted ink discharge using the recording apparatus shown in FIG. 7 was measured. The measured driving pulse was defined as a driving pulse Pth0 in initial printing. Then, the surface of the ink cartridge in which ejection orifices were arranged was sealed with sealing tape. Then, the ink cartridge was hermetically stored in the physical distribution container of a blister pack and was kept in a constant-temperature bath at a temperature of 60° C. for 30 days. The head of the ink cartridge used in each of the examples and the comparative example included a nozzle row in which 192 nozzles H2112 each discharging 5 pl of ink per dot were arranged in a line at an interval of 600 dpi for each color. The head further included a nozzle row in which 192 nozzles H2112 each discharging 2 pl of ink per dot were arranged in a line at an interval of 600 dpi. In the head used, these nozzle rows were arranged in parallel with each other for each of the three colors, the nozzle rows being arranged on both ends of the common liquid chamber H2111 so as to be opposite to each other. In this case, the ratio of the volume of the ink liquid chamber of each nozzle to the surface area of a part of the protective layer of each nozzle in contact with ink was 14 μm$^3$/μm$^2$ for any one of the nozzle types of 5 pl and 2 pl. The above-mentioned protective layer of the head was made of a material mainly composed of silicon nitride, and had a thickness of 300 nm. In addition, a material for the ink supplying/holding member H1501 was an alloy of a styrene-based material and polyphenylene ether, and a material for the ink absorbers H1601, H1602, and H1603 was polypropylene. After the head had been stored (i.e., kept), the driving pulse which permitted ink discharge was measured, and the measured driving pulse was represented by Pth1. The rate α of change in driving pulse before and after the storage described above was calculated and judged on the basis of the criteria described below. The results are summarized in Table 4.

The rate α of change in driving pulse was determined according to the following equation (D), and the resultant value for the rate α of change was judged on the basis of the following criteria.

$$\alpha(\%) = 100 \times (Pth1 - Pth0)/Pth0 \quad (D)$$

AA: The rate α of change before and after storage was less than 10%.

A: The rate α of change before and after storage was 10% to less than 20%.

B: The rate α of change before and after storage was 20% to less than 30%.

C: The rate α of change before and after storage was 30% or more.

TABLE 4

| Results of evaluation for change in driving pulse | | |
|---|---|---|
|  | Example 1 | Comparative example 1 |
| Change in driving pulse | A | B |

Both Magenta Ink M1 of Example 1 and Magenta Ink M2 of Comparative Example 1 contain Magenta Dye 1 at the same concentration. As a result of the above-mentioned test, it was confirmed that Magenta Dye 1 is a substance that dissolves an SiN layer. The SiN layer was used as the protective layer of the head used in the above-mentioned printing test. In addition, Magenta Ink M1 of Example 1 and Comparative Example 1 are different from each other in whether the composition contains BHES corresponding to a compound represented by the general formula (1). Therefore, it has been confirmed from the results as shown in Table 4 that, when ink contains a substance that dissolves a protective layer, a change in driving pulse is decreased by incorporating a compound represented by the general formula (1) into the ink.

Examples 2 to 20 and Comparative Examples 2 to 7

First, 0.013 parts (50 mmol/l) of trisodium citrate, which is a sodium salt of a polycarboxylic acid, and 99.987 parts of water were mixed to prepare a mixed solution. Then, 30 g of the thus-prepared solution containing trisodium citrate and a sample (11 mm long by 5 mm wide) including an SiN layer having a thickness of 400 nm and formed on a silicon wafer were charged in a closed vessel. The sample was immersed in the liquid and stored at a temperature of 60° C. for 1 week. After the storage, the sample was taken out, washed with pure water, and dried, and then the thickness of the SiN layer was measured with a non-contact type thickness measuring apparatus (trade name: NANOSPEC/AFT Model 210, manufactured by Nanometorics Japan, Ltd.). The result of the measurement confirmed that trisodium citrate is a substance that dissolves the SiN layer serving as a protective layer because the thickness was reduced by 5% or more after the storage.

Next, various components shown in Tables 5-1 to 5-5 were added in predetermined amounts shown in the tables, and water was mixed so that the total amount was 100 parts. Then, each of the resultant mixtures was sufficiently stirred for dissolution. Then, the resultant solution was filtered through a microfilter having a pore size of 0.2 μm (manufactured by Fuji Photo Film Co., Ltd.) under pressure to prepare each of Cyan Inks C1 to C25.

TABLE 5-1

Compositions of Cyan Inks C1 to C5 (unit: parts)

|  | C1 | C2 | C3 | C4 | C5 |
|---|---|---|---|---|---|
| Glycerin | 4 | 4 | 4 | 4 | 4 |
| Ethylene glycol | 8 | 8 | 8 | 8 | 8 |
| BHES | 9 | 3 | 3 | 15 | 25 |
| 1,5-pentanediol | 5 | 5 | 5 | 5 | 5 |
| Acetylenol E100 | 0.8 | 0.8 | 0.8 | 0.8 | 0.8 |
| Cyan Dye 1 | 6 | 6 | 6 | 6 | 6 |
| Trisodium citrate | 0.0008 | 0.00026 | 0.0034 | 0.0065 | 0.009 |
| Water | Balance | Balance | Balance | Balance | Balance |

TABLE 5-2

Compositions of Cyan Inks C6 to C10 (unit: parts)

|  | C6 | C7 | C8 | C9 | C10 |
|---|---|---|---|---|---|
| Glycerin | 4 | 4 | 4 | 4 | 4 |
| Ethylene glycol | 8 | 8 | 8 | 8 | 8 |
| BHES | 25 | 15 | 2 | 15 | 25 |
| 1,5-pentanediol | 5 | 5 | 5 | 5 | 5 |
| Acetylenol E100 | 0.8 | 0.8 | 0.8 | 0.8 | 0.8 |
| Cyan Dye 1 | 6 | 6 | 6 | 6 | 6 |
| Trisodium citrate | 0.00039 | 0.00039 | 0.00003 | 0.0067 | 0.0093 |
| Water | Balance | Balance | Balance | Balance | Balance |

TABLE 5-3

Compositions of Cyan Inks C11 to C15 (unit: parts)

|  | C11 | C12 | C13 | C14 | C15 |
|---|---|---|---|---|---|
| Glycerin | 4 | 4 | 4 | 4 | 4 |
| Ethylene glycol | 8 | 8 | 8 | 8 | 8 |
| BHES | 26 | 25 | 15 | 3 | 20.5 |
| 1,5-pentanediol | 5 | 5 | 5 | 5 | 5 |
| Acetylenol E100 | 0.8 | 0.8 | 0.8 | 0.8 | 0.8 |
| Cyan Dye 1 | 6 | 6 | 6 | 6 | 6 |
| Trisodium citrate | 0.00026 | 0.00023 | 0.00003 | 0.00003 | 0.013 |
| Water | Balance | Balance | Balance | Balance | Balance |

TABLE 5-4

Compositions of Cyan Inks C16 to C20 (unit: parts)

|  | C16 | C17 | C18 | C19 | C20 |
|---|---|---|---|---|---|
| Glycerin | 4 | 4 | 4 | 4 | 4 |
| Ethylene glycol | 8 | 8 | 8 | 8 | 8 |
| BHES | 30 | 30 | 20.5 | 30 | 0 |
| 1,5-pentanediol | 5 | 5 | 5 | 5 | 5 |
| Acetylenol E100 | 0.8 | 0.8 | 0.8 | 0.8 | 0.8 |
| Cyan Dye 1 | 6 | 6 | 6 | 6 | 6 |
| Trisodium citrate | 0.0178 | 0.00003 | 0.0132 | 0.018 | 0 |
| Water | Balance | Balance | Balance | Balance | Balance |

TABLE 5-5

Compositions of Cyan Inks C21 to C25 (unit: parts)

|  | C21 | C22 | C23 | C24 | C25 |
|---|---|---|---|---|---|
| Glycerin | 4 | 4 | 4 | 4 | 4 |
| Ethylene glycol | 8 | 8 | 8 | 8 | 8 |
| BHES | 31 | 31 | 25 | 15 | 3 |
| 1,5-pentanediol | 5 | 5 | 5 | 5 | 5 |
| Acetylenol E100 | 0.8 | 0.8 | 0.8 | 0.8 | 0.8 |
| Cyan Dye 1 | 6 | 6 | 6 | 6 | 6 |
| Trisodium citrate | 0.0178 | 0 | 0 | 0 | 0 |
| Water | Balance | Balance | Balance | Balance | Balance |

Tables 6-1 to 6-5 show cyan inks corresponding to Examples 2 to 20 and Comparative Examples 2 to 7, the amount of a compound (i.e., BHES) contained in each ink and suppressing the dissolution of the protective layer, and the amount of trisodium citrate as a polycarboxylic acid. It should be noted that in each of Comparative Examples 4 to 7, ink was free of a substance that dissolved a protective layer.

TABLE 6-1

Amounts of BHES and trisodium citrate in inks of Examples 2 to 6

|  | Example 2 | Example 3 | Example 4 | Example 5 | Example 6 |
|---|---|---|---|---|---|
| Ink | C1 | C2 | C3 | C4 | C5 |
| Amount of BHES (% by mass) | 9 | 3 | 3 | 15 | 25 |
| Amount of trisodium citrate (mmol/l) | 0.031 | 0.010 | 0.13 | 0.25 | 0.35 |

TABLE 6-2

Amounts of BHES and trisodium citrate in inks of Examples 7 to 11

|  | Example 7 | Example 8 | Example 9 | Example 10 | Example 11 |
|---|---|---|---|---|---|
| Ink | C6 | C7 | C8 | C9 | C10 |
| Amount of BHES (% by mass) | 25 | 15 | 2 | 15 | 25 |
| Amount of trisodium citrate (mmol/l) | 0.015 | 0.015 | 0.0012 | 0.26 | 0.36 |

TABLE 6-3

Amounts of BHES and trisodium citrate in inks of Examples 12 to 16

|  | Example 12 | Example 13 | Example 14 | Example 15 | Example 16 |
|---|---|---|---|---|---|
| Ink | C11 | C12 | C13 | C14 | C15 |
| Amount of BHES (% by mass) | 26 | 25 | 15 | 3 | 20.5 |
| Amount of trisodium citrate (mmol/l) | 0.010 | 0.0089 | 0.0012 | 0.0012 | 0.50 |

TABLE 6-4

Amounts of BHES and trisodium citrate in inks of
Examples 17 to 20 and Comparative Example 2

|  | Example 17 | Example 18 | Example 19 | Example 20 | Comparative Example 2 |
|---|---|---|---|---|---|
| Ink | C16 | C17 | C18 | C19 | C20 |
| Amount of BHES (% by mass) | 30 | 30 | 20.5 | 30 | 0 |
| Amount of trisodium citrate (mmol/l) | 0.69 | 0.0012 | 0.51 | 0.70 | 0 |

TABLE 6-5

Amounts of BHES and trisodium citrate in inks of
Comparative Examples 3 to 7

|  | Comparative example 3 | Comparative example 4 | Comparative example 5 | Comparative example 6 | Comparative example 7 |
|---|---|---|---|---|---|
| Ink | C21 | C22 | C23 | C24 | C25 |
| Amount of BHES (% by mass) | 31 | 31 | 25 | 15 | 3 |
| Amount of trisodium citrate (mmol/l) | 0.69 | 0 | 0 | 0 | 0 |

The inks of Examples 2 to 20 and Comparative Examples 2 to 7 were stored one by one in the ink cartridge shown in FIG. 1, and the driving pulse which permitted ink discharge using the recording apparatus shown in FIG. 7 was measured. The measured driving pulse was defined as a driving pulse Pth0. Pulses were set so that a driving pulse Pop having a pulse width 1.2 times as large as that of the driving pulse Pth0 was applied to each nozzle, and then an initial nozzle check pattern was printed. Then, a surface in which ejection orifices were arranged was sealed with sealing tape. Then, the ink cartridge was hermetically stored in the physical distribution container of a blister pack, and was kept in a constant-temperature bath at a temperature of 60° C. for 30 days. The head of each of the ink cartridges used in Examples 2 to 20 and Comparative Examples 2 to 7 included a nozzle row in which 192 nozzles H2112 each discharging 5 pl of ink per dot were arranged in a straight line at an interval of 600 dpi for one color. The head further included a nozzle row in which 192 nozzles H2112 each discharging 2 pl of ink per dot were arranged in a straight line at an interval of 600 dpi. In the head used, the nozzle rows were arranged in parallel with each other for each of the three colors, the nozzle rows each being arranged on both ends of the common liquid chamber H2111 opposite to each other. In this case, the ratio of the volume of the ink liquid chamber of each nozzle to the surface area of a portion of the protective layer in contact with ink in each nozzle part was 14 μm³/μm² for any one of the nozzle types of 5 pl and 2 pl.

The protective layer of the head used as described above was made of a material mainly composed of silicon nitride, and had a thickness of 300 nm. In addition, a material for the ink supplying/holding member H1501 was an alloy of a styrene-based material and polyphenylene ether, and a material for the ink absorbers H1601, H1602, and H1603 was polypropylene.

After keeping (storage), the driving pulse which permitted ink discharge was similarly measured, and the measured driving pulse was represented by Pth1. Then, pulses were set in such a manner that the driving pulse Pop was applied to each nozzle, and then a nozzle check pattern after storage was printed and examined for printing misalignment as compared to the initial print. Further, images each having a duty of 7.5% were continuously printed until ink in an ink tank was used up under the same driving conditions. In this case, the check patterns of all nozzles were printed every time 100 images were printed, and judgment was made as to whether printing blurring or printing misalignment occurred until the ink in the tank was used up.

In addition, fixing recoverability and intermittent printing properties were examined using the ink tank stored under the same conditions. The fixing recoverability was examined as described below. After the ink tank stored under the above-mentioned conditions had been mounted on the main body of the apparatus, check patterns of all nozzles were printed. Further, the ink tank was kept in an uncapped state in a constant-temperature bath at 35° C. for 14 days. After keeping (storage), the ink tank was mounted, and check patterns of all nozzles were printed. When there was a nozzle not discharging ink, a nozzle suction recovery operation of the main body of the apparatus was performed, and then check patterns of all nozzles were printed again. The operation was repeated until no nozzle failed to discharge ink. The intermittent printing properties were examined as described below. After a printer had been left under the conditions of a temperature of 15° C. and a relative humidity of 10% for 5 hours or more, ink droplets were discharged under the environment and then nozzles were not used for 5 seconds. Next, ink droplets were discharged from the nozzles to perform printing on a recording medium (trade name: HR-101; manufactured by Canon Kabushiki Kaisha), and the resultant recorded product was visually evaluated for its quality level. The printing misalignment, printing durability, and discharge reliability after the storage described above were judged on the basis of the following criteria. The results are summarized in Tables 7-1 to 7-3.

(Printing Misalignment after Storage)

Judgment was made on the basis of the following criteria:

A: Substantially no printing misalignment was observed as compared to the initial print.

B: Slight printing misalignment was observed as compared to the initial print.

C: Printing misalignment occurred as compared to the initial print.

(Printing Durability [Printing Blurring])

Judgment was made on the basis of the following criteria:

A: No printing blurring occurred until the ink in the ink tank was used up.

C: Printing blurring occurred before the ink in the ink tank was used up.

(Printing Durability [Printing Misalignment])

Judgment was made on the basis of the following criteria:

A: No printing misalignment occurred until the ink in the ink tank was used up.

B: Slight printing misalignment occurred until the ink in the ink tank was used up.

C: Printing misalignment occurred before the ink in the ink tank was used up.

(Reliability [Fixing Recoverability])

Judgment was made on the basis of the following criteria:

A: After the ink tank had been mounted, no nozzle failed to discharge ink by three recovery operations or less of the main body.

C: After the ink tank had been mounted, not all discharge nozzles were recovered by three recovery operations or less of the main body.

(Reliability [Intermittent Printing Property])

Judgment was made on the basis of the following criteria:

A: Normal printing was possible.

B: Slight disturbance of a letter was observed.

C: A nozzle not discharging ink was present, or the disturbance of printing was observed.

TABLE 7-1

Results of evaluation of Examples 2 to 11

| | | Example | | | | | | | | | |
|---|---|---|---|---|---|---|---|---|---|---|---|
| | | 2 | 3 | 4 | 5 | 6 | 7 | 8 | 9 | 10 | 11 |
| Change in driving pulse | | AA | AA | AA | AA | AA | AA | AA | AA | A | A |
| Printing misalignment after storage | | A | A | A | A | A | A | A | B | A | A |
| Printing durability | Printing blurring | A | A | A | A | A | A | A | A | A | A |
| | Printing misalignment | A | A | A | A | A | A | A | B | A | A |
| Discharge reliability | Fixing property | A | A | A | A | A | A | A | A | A | A |
| | Intermittent discharge property | A | A | A | A | A | A | A | A | A | A |

TABLE 7-2

Results of evaluation of Examples 12 to 20

| | | Example | | | | | | | | |
|---|---|---|---|---|---|---|---|---|---|---|
| | | 12 | 13 | 14 | 15 | 16 | 17 | 18 | 19 | 20 |
| Change in driving pulse | | AA | AA | AA | AA | A | A | AA | B | B |
| Printing misalignment after storage | | A | B | B | B | A | A | B | A | A |
| Printing durability | Printing blurring | A | A | A | A | A | A | A | A | A |
| | Printing misalignment | A | B | B | B | A | A | B | A | A |
| Discharge reliability | Fixing property | A | A | A | A | A | A | A | A | A |
| | Intermittent discharge property | B | A | A | A | A | B | B | A | B |

TABLE 7-3

Results of evaluation of Comparative Examples 2 to 7

| | | Comparative example | | | | | |
|---|---|---|---|---|---|---|---|
| | | 2 | 3 | 4 | 5 | 6 | 7 |
| Change in driving pulse | | AA | A | AA | AA | AA | AA |
| Printing misalignment after storage | | C | A | C | C | C | C |
| Printing durability | Printing blurring | A | A | A | A | A | A |
| | Printing misalignment | C | A | C | C | C | C |
| Discharge reliability | Fixing property | C | A | A | A | A | A |
| | Intermittent discharge property | C | C | C | A | A | A |

The results of Tables 7-1 to 7-3 confirmed that when ink contains a polycarboxylic acid (that is, trisodium citrate) as a substance that dissolves a protective layer, it is possible to obtain ink having preferable performance by having the ink contain predetermined amounts of a compound (i.e., BHES) and the polycarboxylic acid.

Examples 21 to 23

Various components shown in Table 8 below were added in predetermined amounts shown in the table, and water was mixed to adjust the total amount to 100 parts. Each of the resultant mixtures was sufficiently stirred for dissolution. Then, the resultant solution was filtered through a microfilter having a pore size of 0.2 μm (manufactured by Fuji Photo Film Co., Ltd.) under pressure to prepare each of Cyan Inks C26 to C28, Magenta Ink M3, and Yellow Ink Y1.

TABLE 8

Compositions of Cyan Inks C26 to C28, Magenta Ink M3, and Yellow Ink Y1 (unit: parts)

|  | C26 | C27 | C28 | M3 | Y1 |
|---|---|---|---|---|---|
| Glycerin | 5 | 5 | 5 | 4 | 8 |
| Ethylene glycol | 7 | 7 | 7 | 88 | |
| BHES | 21 | 22 | 24 | 25 | 30 |
| 1,5-pentanediol | 5 | 5 | 5 | 5 | — |
| Acetylenol E100 | 0.8 | 0.8 | 0.8 | 0.8 | 0.8 |
| Cyan Dye 1 | 6 | 6 | 6 | — | — |
| Magenta Dye 1 | — | — | — | 6 | — |
| C.I. Direct Yellow 132 | — | — | — | — | 3 |
| Trisodium citrate | 0.0132 | 0.0132 | 0.0132 | 0.0132 | 0.0132 |
| Water | Balance | Balance | Balance | Balance | Balance |

Cyan Inks C26 to C28, Magenta Ink M3, and Yellow Ink Y1 prepared as described above were combined as shown in Table 9 to obtain ink sets. Table 9 shows ink sets corresponding to Examples 21 to 23, the amount of the compound (i.e., BHES) suppressing the dissolution of the protective layer and contained in each of the inks which constituted these ink sets, the amount of trisodium citrate as a polycarboxylic acid, and the maximum difference in amount of the compound (i.e., BHES) suppressing the dissolution of the protective layer in each ink set.

TABLE 9

Amounts of BHES and trisodium citrate in ink sets of Examples 21 to 23

|  | Example 21 | | | Example 22 | | | Example 23 | | |
|---|---|---|---|---|---|---|---|---|---|
| Ink | C26 | M3 | Y1 | C27 | M3 | Y1 | C28 | M3 | Y1 |
| Amount of BHES (% by mass) | 21 | 25 | 30 | 22 | 25 | 30 | 24 | 25 | 30 |
| Amount of trisodium citrate (mmol/l) | 0.51 | 0.51 | 0.51 | 0.51 | 0.51 | 0.51 | 0.51 | 0.51 | 0.51 |
| Largest difference in amount of BHES (%) | | 9 | | | 8 | | | 6 | |

The inks which constituted the ink sets of Examples 21 to 23 were contained one by one in the ink cartridge shown in FIG. 1, and a driving pulse which permitted ink discharge using the recording apparatus shown in FIG. 7 was measured. The measured driving pulse was defined as a driving pulse Pth0 in initial printing. Then, pulses were set in such a manner that a driving pulse Pop having a pulse width 1.2 times as large as that of the driving pulse Pth0 was applied to each nozzle, and a CMY gray scale according to process Bk was printed and defined as an initial print. Thereafter, a surface in which ejection orifices were arranged was sealed with sealing tape. Then, the ink cartridge was hermetically stored in the physical distribution container of a blister pack and was kept in a constant-temperature bath at a temperature of 60° C. for 30 days. The head of each of the ink cartridges used in the examples included a nozzle row in which 192 nozzles H2112 each discharging 5 pl of ink per dot were arranged in a straight line at an interval of 600 dpi for one color. The head further included a nozzle row in which 192 nozzles H2112 each discharging 2 pl of ink per dot were arranged in a straight line at an interval of 600 dpi. In the head used, the nozzle rows were arranged in parallel with each other for each of the three colors, the nozzle rows being arranged on both ends of the common liquid chamber H2111 opposite to each other. In this case, the ratio of the volume of the ink liquid chamber of each nozzle to the surface area of a portion of the protective layer in contact with ink in each nozzle portion was 14 $\mu m^3/\mu m^2$ for any one of the nozzle types of 5 pl and 2 pl.

The protective layer of the above-mentioned head was made of a material mainly composed of silicon nitride, and had a thickness of 300 nm. In addition, a material for the ink supplying/holding member H1501 was an alloy of a styrene-based material and polyphenylene ether, and a material for the ink absorbers H1601, H1602, and H1603 was polypropylene.

After keeping (storage), a nozzle check pattern was printed with the same driving pulse Pop as that in the initial stage, and the pattern was examined with respect to printing misalignment as compared to the initial print. Further, a CMY gray scale according to process Bk was printed under the same driving conditions and was defined as a print after storage. Then, the driving pulse which permitted ink discharge was similarly measured, and the measured driving pulse was represented by Pth1. Images each having a duty of 7.5% for each color were continuously printed with the driving pulse Pop until ink in an ink tank was used up. In this case, check patterns of all nozzles were printed every time 100 images were printed, and judgment was made as to whether printing blurring or printing misalignment occurred until the ink in the tank was used up.

In addition, fixing recoverability and intermittent printing properties were examined using the ink tank stored under the same conditions. The fixing recoverability was examined as described below. After the above-mentioned stored ink tank had been mounted on the main body of the apparatus, check patterns of all nozzles were printed and the ink tank was kept in an uncapped state in a constant-temperature bath at 35° C. for 14 days. After keeping (storage), the ink tank was mounted, and check patterns of all nozzles were printed. When there was a nozzle not discharging ink, a nozzle suction recovery operation of the main body of the apparatus was performed, and then check patterns of all nozzles were printed again. The operation was repeated until no nozzle failed to discharge ink. The intermittent printing properties were examined as described below. After a printer had been left under the conditions of a temperature of 15° C. and a relative humidity of 10% for 5 hours or more, ink droplets were discharged under the environment and then the nozzles were not used for 5 seconds. Next, ink droplets were discharged from the nozzles to perform printing on a recording medium (trade name: HR-101; manufactured by Canon Kabushiki Kaisha), and the resultant recorded product was visually evaluated for quality level. The change in driving pulse after the storage, and the printing misalignment, printing durability, and discharge reliability after the storage described above were judged on the basis of the above-mentioned criteria. A change in color developability was judged on the basis of the following criteria. The results are summarized in Table 10.

(Change in Color Developability)

Judgment was made on the basis of the following criteria:

A: Substantially no change in gray scale occurred before and after storage.

B: A slight change in gray scale occurred before and after storage.

C: A change in gray scale occurred before and after storage.

TABLE 10

Results of evaluation of Examples 21 to 23

|  |  | Example 21 | | | Example 22 | | | Example 23 | | |
| --- | --- | --- | --- | --- | --- | --- | --- | --- | --- | --- |
| Ink | | C26 | M3B | Y1 | C27 | M3A | Y1 | C28 | M3A | Y1 |
| Change in color developability | | | | | | | | | | |
| Change in driving pulse | | A | A | A | A | A | A | A | A | A |
| Printing misalignment after storage | | A | A | A | A | A | A | A | A | A |
| Printing durability | Printing blurring | A | A | A | A | A | A | A | A | A |
| | Printing misalignment | A | A | A | A | A | A | A | A | A |
| Discharge reliability | Fixing property | A | A | A | A | A | A | A | A | A |
| | Intermittent discharge property | B | B | B | B | B | B | B | B | B |

Table 10 confirmed that when the maximum difference between the amounts of the compound represented by the general formula (1) in inks in each ink set is 8 or less, an ink set showing no change in color developability and having preferable performance can be obtained.

Examples 24 to 26 and Comparative Example 8

Various components shown in Table 11 below were added in predetermined amounts shown in the table, and water was mixed to adjust the total amount to 100 parts. Each of the resultant mixtures was sufficiently stirred for dissolution. Then, the resultant solution was filtered through a microfilter having a pore size of 0.2 μm (manufactured by Fuji Photo Film Co., Ltd.) under pressure to prepare each of Magenta Inks M4 to M6.

TABLE 11

Compositions of Magenta Inks (unit: parts)

| | M4 | M5 | M6 |
| --- | --- | --- | --- |
| Glycerin | 4 | 4 | 4 |
| Ethylene glycol | 8 | 8 | 8 |
| Dimethyl sulfoxide | 10 | — | — |
| Thiodiglycol | — | 10 | — |
| BHES | — | — | 10 |
| 1,5-Pentanediol | 5 | 5 | 5 |
| Acetylenol E100 | 0.8 | 0.8 | 0.8 |
| Magenta dye 1 | 6 | 6 | 6 |
| Water | Balance | Balance | Balance |

Table 12 shows the amounts of dimethyl sulfoxide, thiodiglycol, and BHES contained in each of the magenta inks corresponding to Examples 24 to 26 and Comparative Example 8. The results of the above-mentioned characteristic test indicate that Magenta dye 1 is a substance that dissolves the SiN layer.

TABLE 12

Amounts of dimethyl sulfoxide, thiodiglycol, and BHES in ink sets of Examples 24 to 26

| | Example 24 | Example 25 | Example 25 | Comparative Example 8 |
| --- | --- | --- | --- | --- |
| Ink | M4 | M5 | M6 | M3 |
| Amount of dimethyl sulfoxide (% by mass) | 0 | 0 | 10 | 0 |
| Amount of thiodiglycol (% by mass) | 0 | 10 | 0 | 0 |
| Amount of BHES (% by mass) | 10 | 0 | 0 | 0 |

A sample (11 mm long by 5 mm wide) including an SiN layer having a thickness of 400 nm and formed on a silicon wafer and 30 g of each of the magenta inks corresponding to Examples 24 to 26 and Comparative Example 8, respectively, were placed in a closed vessel. The sample was immersed in the solution and stored at a temperature of 60° C. for 1 week. After the storage, the sample was taken out, washed with pure water, and dried, and then the thickness of the SiN layer was measured using a non-contact type thickness measuring apparatus (trade name: NANOSPEC/AFT Model 210, manufactured by Nanometorics Japan, Ltd.). The residual ratios of thickness after the storage were judged according to the criteria below. The results are summarized in Table 13.

(Thickness Residual Ratio)

The residual ratios were calculated by the following equation and evaluated on the basis of the following criteria:

Thickness residual ratio=(thickness after storage/thickness before storage)×100

AA: The thickness residual ratio was 90% or more.
A: The thickness residual ratio was 85% to less than 90%.
B: The thickness residual ratio was 80% to less than 85%.
C: The thickness residual ratio was less than 80%.

TABLE 13

Evaluation results of residual ratio of SiN film thickness

| | Example 24 | Example 25 | Example 25 | Comparative Example 8 |
| --- | --- | --- | --- | --- |
| Thickness residual ratio | AA | A | B | C |

It was confirmed from the results as shown in Table 13 that a compound represented by the general formula (1) has a dissolution suppressing ability, and when $R_1$ and $R_2$ are each a hydroxyalkyl group, the dissolution suppressing ability is increased, and when $R_1$ and $R_2$ are each a hydroxyethyl group, the dissolution suppressing ability is particularly increased.

Examples 27 and 28 and Comparative Examples 9 and 10

First, 40 parts (50 mmol/l in terms of a dye pure content) of a 12% aqueous solution of the cyan dye 2 and 60 parts of water were mixed to prepare a solution. Also, 40 parts (50 mmol/l in terms of a dye pure content) of a 12% aqueous solution of the yellow dye 1 and 60 parts of water were mixed to prepare a solution. Then, 30 g of each of the thus-prepared solutions and a sample (11 mm long by 5 mm wide) including an SiN layer having a thickness of 400 nm and formed on a silicon wafer were charged in a closed vessel. The sample was immersed in the liquid and stored at a temperature of 60° C. for 1 week. After the storage, the sample was taken out, washed with pure water, and dried, and then the thickness of the SiN layer was measured with a non-contact type thickness measuring apparatus (trade name: NANOSPEC/AFT Model 210, manufactured by Nanometorics Japan, Ltd.). The result of the measurement confirmed that each of the cyan dye 2 and the yellow dye 1 is a substance that dissolves the SiN layer serving as a protective layer because the thickness was reduced by 5% or more after the storage.

Next, various components shown in Table 14 were added in predetermined amounts shown in the table, and water was mixed so that the total amount was 100 parts. Then, each of the resultant mixtures was sufficiently stirred for dissolution. Then, the resultant solution was filtered through a microfilter having a pore size of 0.2 μm (manufactured by Fuji Photo Film Co., Ltd.) under pressure to prepare each of Cyan Inks C29 and C30 and Yellow Inks Y2 and Y3.

TABLE 14

Compositions of cyan inks and yellow inks (unit: parts)

|  | C29 | C30 | Y2 | Y3 |
| --- | --- | --- | --- | --- |
| Glycerin | 4 | 4 | 4 | 4 |
| Ethylene glycol | 8 | 8 | 8 | 8 |
| BHES | 10 | 0 | 10 | 0 |
| 1,5-pentanediol | 5 | 5 | 5 | 5 |
| Acetylenol E100 | 0.8 | 0.8 | 0.8 | 0.8 |
| Cyan Dye 2 | 5 | 5 |  |  |
| Exemplified Compound 3-5 |  |  | 5 | 5 |
| Water | Balance | Balance | Balance | Balance |

Table 15 shows cyan inks and yellow inks corresponding to Examples 27 and 28 and Comparative Examples 9 and 10, and the amount of BHES contained in each ink and suppressing the dissolution of the protective layer.

TABLE 15

Amount of BHES in inks of Examples 27 and 28 and Comparative Examples 9 and 10

|  | Example 27 | Example 28 | Comparative Example 9 | Comparative Example 10 |
| --- | --- | --- | --- | --- |
| Ink | C29 | Y2 | C30 | Y3 |
| Amount of BHES (% by mass) | 10 | 10 | 0 | 0 |

Cyan inks C29 and C30 and yellow inks Y2 and Y3 corresponding to Examples 27 and 28 and Comparative Examples 9 and 10 were stored one by one in the ink cartridge shown in FIG. 1, and the driving pulse which permitted ink discharge using the recording apparatus shown in FIG. 7 was measured. The measured driving pulse was defined as a driving pulse Pth0 in initial printing. Then, the surface of the ink cartridge in which ejection orifices were arranged was sealed with sealing tape. Then, the ink cartridge was hermetically stored in the physical distribution container of a blister pack and was kept in a constant-temperature bath at a temperature of 60° C. for 30 days. The head of the ink cartridge used in each of the examples and the comparative example included a nozzle row in which 192 nozzles H2112 each discharging 5 pl of ink per dot were arranged in a line at an interval of 600 dpi for each color. The head further included a nozzle row in which 192 nozzles H2112 each discharging 2 pl of ink per dot were arranged in a line at an interval of 600 dpi. In the head used, these nozzle rows were arranged in parallel with each other for each of the three colors, the nozzle rows being arranged on both ends of the common liquid chamber H2111 so as to be opposite to each other. In this case, the ratio of the volume of the ink liquid chamber of each nozzle to the surface area of a part of the protective layer of each nozzle in contact with ink was 14 μm³/μm² for any one of the nozzle types of 5 pl and 2 pl. The above-mentioned protective layer of the head was made of a material mainly composed of silicon nitride, and had a thickness of 300 nm. In addition, a material for the ink supplying/holding member H1501 was an alloy of a styrene-based material and polyphenylene ether, and a material for the ink absorbers H1601, H1602, and H1603 was polypropylene. After the head had been stored (i.e., kept), the driving pulse which permitted ink discharge was measured, and the measured driving pulse was represented by Pth1. The rate α of change in driving pulse before and after the storage described above was calculated and judged on the basis of the criteria described below. The results are summarized in Table 16.

The rate α of change in driving pulse was determined according to the following equation (D), and the resultant value for the rate α of change was judged on the basis of the following criteria.

$$\alpha(\%) = 100 \times (Pth1 - Pth0)/Pth0 \quad \text{(D)}$$

AA: The rate α of change before and after storage was less than 10%.

A: The rate α of change before and after storage was 10% to less than 20%.

B: The rate α of change before and after storage was 20% to less than 30%.

C: The rate α of change before and after storage was 30% or more.

TABLE 16

Results of evaluation for change in driving pulse

|  | Example 27 | Example 28 | Comparative Example 9 | Comparative Example 10 |
| --- | --- | --- | --- | --- |
| Change in driving pulse | A | A | C | C |

Both Cyan Ink C29 of Example 27 and Cyan Ink C30 of Comparative Example 9 contain Cyan Dye 2 at the same concentration. As a result of the above-mentioned test, it was confirmed that Cyan Dye 2 is a substance that dissolves an SiN layer. Both Yellow Ink Y2 of Example 28 and Yellow Ink Y3 of Comparative Example 10 contain Yellow dye 1 at the same concentration. As a result of the above-mentioned test, it was confirmed that Yellow dye 1 is a substance that dissolves an SiN layer. The SiN layer was used as the protective layer of the head used in the above-mentioned printing test. In addition, Cyan Inks C29 and C30 of Example 27 and Comparative Example 9 are different from each other in whether the composition contains BHES corresponding to a compound represented by the general formula (1). Similarly, Yellow Inks Y2 and Y3 of Example 28 and Comparative Example 10 are different from each other in whether the composition contains BHES corresponding to a compound represented by the general formula (1). Therefore, it has been confirmed from the results as shown in Table 16 that when ink contains a substance that dissolves a protective layer, a change in driving pulse is decreased by incorporating a compound represented by the general formula (1) into the ink.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims the benefit of Japanese Application No. 2006-346189, filed Dec. 22, 2006, which is hereby incorporated by reference herein in its entirety.

What is claimed is:

1. An ink cartridge for storing ink comprising:

a thermal ink-jet head provided with a heating portion that generates thermal energy for discharging ink from an ejection orifice, wherein the heating portion has, on its surface in contact with the ink, a protective layer containing at least one selected from the group consisting of a silicon oxide, a silicon nitride, and a silicon carbide, wherein the ink contains a substance that dissolves the protective layer, wherein the ink contains a compound represented by the following general formula (1), wherein the content X (% by mass) in the ink of the compound represented by the general formula (1) satisfies the relationship of $1 \leq X \leq 30$, and wherein the substance that dissolves the protective layer contains at least one selected from the group consisting of compounds represented by the following general formulae (2) and (3):

$$R_1\text{-}A\text{-}R_2 \quad \text{General Formula (1)}$$

wherein A represents one selected from the group consisting of —S—, —S(=O)—, and —S(=O)$_2$—, and $R_1$ and $R_2$ each independently represent a group selected from the group consisting of a hydrogen atom, a hydroxyl group, an alkyl group, a hydroxyalkyl group, an alkenyl group, an acyl group, a carbamoyl group, a carboxyl group, and a sulfonyl group;

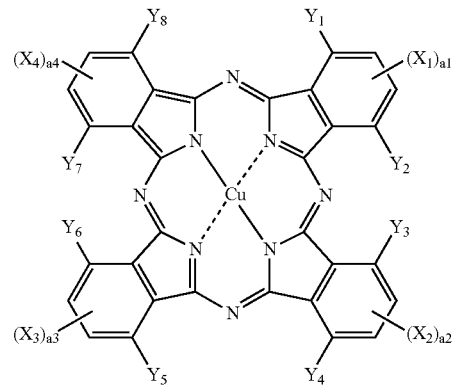

General Formula (2)

wherein $X_1$, $X_2$, $X_3$, and $X_4$ each independently represent —SO—Z, —SO$_2$—Z, —SO$_2$NR$_1$R$_2$, a sulfonic acid group, —CONR$_2$R$_2$, or —CO$_2$R$_1$, wherein Z is a substituted or unsubstituted alkyl group, a substituted or unsubstituted cycloalkyl group, a substituted or unsubstituted alkenyl group, a substituted or unsubstituted aralkyl group, a substituted or unsubstituted aryl, or a substituted or unsubstituted heterocyclic group, and $R_1$ and $R_2$ are each independently a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl, or a substituted or unsubstituted heterocyclic group; $Y_1$, $Y_2$, $Y_3$, $Y_4$, $Y_5$, $Y_6$, $Y_7$, and $Y_8$ are each independently a hydrogen atom, a halogen atom, a substituted or unsubstituted alkyl group, a substituted or unsubstituted aryl group, a cyano group, a substituted or unsubstituted alkoxy group, an amide group, an ureido group, a sulfonamide group, a substituted or unsubstituted carbamoyl group, a substituted or unsubstituted sulfamoyl group, a substituted or unsubstituted alkoxycarbonyl group, a carboxyl group, or a sulfonic acid group; and $a_1$, $a_2$, $a_3$, and $a_4$ represent the numbers of substituents of $X_1$, $X_2$, $X_3$, and $X_4$, respectively, and are each independently 1 or 2;

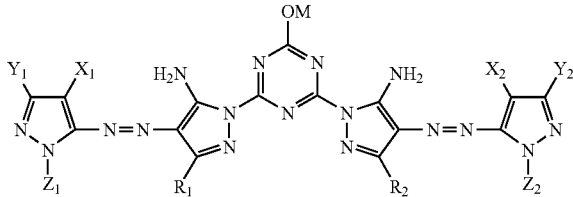

General Formula (3)

wherein $R_1$, $R_2$, $Y_1$ and $Y_2$ are each independently a monovalent group, $X_1$ and $X_2$ each independently an electron-withdrawing group having a Hammett σp value of 0.20 or more, $Z_1$ and $Z_2$ are each independently a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, and M is a hydrogen atom, an alkali metal, ammonium, or organic ammonium, and wherein the ejection orifice and the heating portion are disposed opposite to each other.

2. The ink cartridge according to claim 1, wherein in general formula (1), $R_1$ and $R_2$ are each independently a hydroxyalkyl group.

3. The ink cartridge according to claim 2, wherein in general formula (1), $R_1$ and $R_2$ are each independently a hydroxyethyl group.

4. The ink cartridge according to claim 1, wherein the thickness of the protective layer is 50 nm to 500 nm.

5. The ink cartridge according to claim 1, wherein the thermal ink jet head has an ink liquid chamber, and the ratio of the volume of the ink liquid chamber to the surface area of a portion of the protective layer in contact with the ink is 50 $\mu m^3/\mu m^2$ or less.

6. The ink cartridge according to claim 1, wherein the substance that dissolves the protective layer comprises a compound represented by general formulae (3).

7. The ink cartridge according to claim 1, wherein the substance that dissolves the protective layer comprises the following compound II-66:

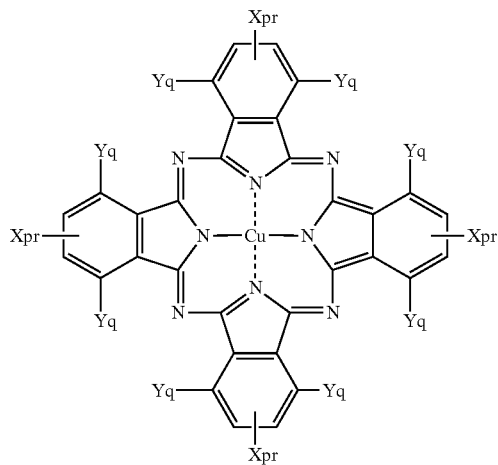

wherein $X_{pr}$'s are each independently $P_1$ or $P_2$, the numbers of substituents $P_1$ and $P_2$ in the copper phthalocyanine skeleton are m and n, respectively, and $Y_q$ is a hydrogen atom, and each of the substituents $P_1$ and $P_2$ is at the β-position in the copper phthalocyanine skeleton, and the substituents at the β-position are not in order, wherein $P_1$, m, $P_2$, and n are as follows:

| | $P_1$ | m | $P_2$ | n |
|---|---|---|---|---|
| II - 66 | —SO$_2$—CH$_2$—CH$_2$—CH$_3$—SO$_2$Li | 3 | —SO$_2$—CH$_2$—CH$_2$—CH$_2$—SO$_2$—NH—CH$_2$—CH(OH)—CH$_2$ | 1. |

8. An ink for a thermal ink-jet head provided with a heating portion that generates thermal energy for discharging the ink from an ejection orifice, the heating portion having, on its surface in contact with the ink, a protective layer containing at least one selected from the group consisting of a silicon oxide, a silicon nitride, and a silicon carbide, the ink comprising:
 a substance that dissolves the protective layer; and
 a compound represented by the following general formula (1),
 wherein the content X (% by mass) in the ink of the compound represented by the general formula (1) satisfies the relationship of 1≦X≦30, and wherein the substance that dissolves the protective layer contains at least one selected from the group consisting of compounds represented by the following general formulae (2) and (3):

$$R_1\text{-}A\text{-}R_2 \qquad \text{General Formula (1)}$$

wherein A represents one selected from the group consisting of —S—, —S(=O)—, and —S(=O)$_2$—, and $R_1$ and $R_2$ each independently represent a group selected from the group consisting of a hydrogen atom, a hydroxyl group, an alkyl group, a hydroxyalkyl group, an alkenyl group, an acyl group, a carbamoyl group, a carboxyl group, and a sulfonyl group;

General Formula (2)

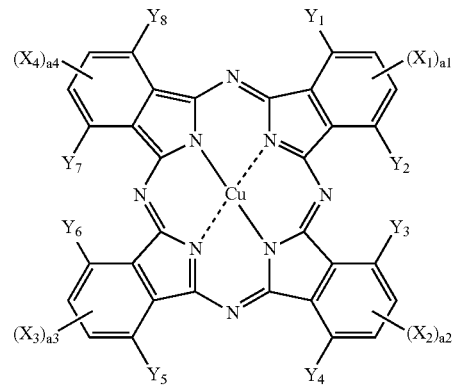

wherein $X_1$, $X_2$, $X_3$, and $X_4$ each independently represent —SO—Z, —SO$_2$NR$_1$R$_2$, a sulfonic acid group, —CONR$_2$R$_2$, or —CO$_2$R$_1$, wherein Z is a substituted or unsubstituted alkyl group, a substituted or unsubstituted cycloalkyl group, a substituted or unsubstituted alkenyl group, a substituted or unsubstituted aralkyl group, a substituted or unsubstituted aryl, or a substituted or unsubstituted heterocyclic group, and $R_1$ and $R_2$ are each independently a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl, or a substituted or unsubstituted heterocyclic group; $Y_1$, $Y_2$, $Y_3$, $Y_4$, $Y_5$, $Y_6$, $Y_7$, and $Y_8$ are each independently a hydrogen atom, a halogen atom, a substituted or unsubstituted alkyl group, a substituted or unsubstituted aryl group, a cyano group, a substituted or unsubstituted alkoxy group, an amide group, an ureido group, a sulfonamide group, a substituted or unsubstituted carbamoyl group, a substituted or unsubstituted sulfamoyl group, a substituted or unsubstituted alkoxycarbonyl group, a carboxyl group, or a sulfonic acid group; and $a_1$, $a_2$, $a_3$, and $a_4$ represent the numbers of substituents of $X_1$, $X_2$, $X_3$, and $X_4$, respectively, and are each independently 1 or 2;

General Formula (3)

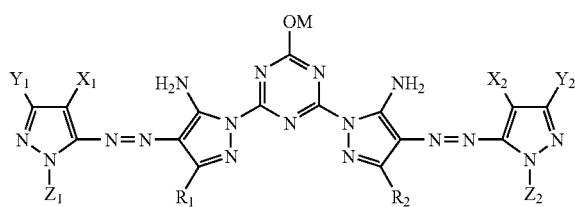

wherein $R_1$, $R_2$, $Y_1$ and $Y_2$ are each independently a monovalent group, $X_1$ and $X_2$ each independently an electron-withdrawing group having a Hammett σp value of 0.20 or more, $Z_1$ and $Z_2$ are each independently a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, and M is a hydrogen atom, an alkali metal, ammonium, or organic ammonium, and wherein the ejection orifice and the heating portion are disposed opposite to each other.

9. The ink according to claim 8, wherein in general formula (1), $R_1$ and $R_2$ are each independently a hydroxyalkyl group.

10. The ink according to claim 9, wherein in general formula (1), $R_1$ and $R_2$ are each independently a hydroxyethyl group.

* * * * *